United States Patent
Kanaya

(10) Patent No.: US 11,032,443 B2
(45) Date of Patent: Jun. 8, 2021

(54) IMAGE READING APPARATUS FOR DETECTING A DIRT SUBSTANCE FROM A WHITE REFERENCE IMAGE AND A DOCUMENT IMAGE

(71) Applicant: PFU LIMITED, Kahoku (JP)

(72) Inventor: Shingo Kanaya, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 16/124,119

(22) Filed: Sep. 6, 2018

(65) Prior Publication Data

US 2019/0281186 A1 Sep. 12, 2019

(30) Foreign Application Priority Data

Mar. 12, 2018 (JP) .............................. JP2018-044777

(51) Int. Cl.
| | |
|---|---|
| H04N 1/00 | (2006.01) |
| H04N 1/407 | (2006.01) |
| H04N 1/409 | (2006.01) |
| H04N 1/60 | (2006.01) |

(52) U.S. Cl.
CPC ....... H04N 1/4076 (2013.01); H04N 1/00045 (2013.01); H04N 1/60 (2013.01)

(58) Field of Classification Search
None
See application file for complete search history.

(56) References Cited

U.S. PATENT DOCUMENTS

| | | | | |
|---|---|---|---|---|
| 6,292,269 B1 * | 9/2001 | Kawai | .................. | H04N 1/4076 |
| | | | | 358/1.9 |
| 7,817,317 B2 * | 10/2010 | Ito | ........................ | H04N 1/4076 |
| | | | | 358/1.9 |
| 8,548,204 B2 * | 10/2013 | Ikubo | ...................... | G06K 9/03 |
| | | | | 358/453 |

(Continued)

FOREIGN PATENT DOCUMENTS

| | | |
|---|---|---|
| JP | 5-292317 A | 11/1993 |
| JP | H11-122490 A | 4/1999 |

(Continued)

OTHER PUBLICATIONS

Office Action dated Apr. 26, 2019 corresponding to related U.S. Appl. No. 16/124,091 (15 pages).

(Continued)

*Primary Examiner* — Beniyam Menberu
(74) *Attorney, Agent, or Firm* — Lewis Roca Rothgerber Christie LLP

(57) ABSTRACT

An image reading apparatus includes an imaging device for generating a white reference image of a white reference member and a document image of a document and a periphery of the document, and a processor for performing first processing for detecting a dirt substance from the white reference image, generating data for shading correction based on the white reference image, correcting the document image using the data for shading correction to generate a correction image, and performing second processing for detecting a dirt substance from the correction image. One of the first processing or the second processing is performed using a dirt substance detection result of the other one of the first processing or the second processing.

7 Claims, 30 Drawing Sheets

(56) References Cited

U.S. PATENT DOCUMENTS

| | | | |
|---|---|---|---|
| 2003/0053140 A1* | 3/2003 | Kakutani | H04N 1/00002 358/302 |
| 2004/0046972 A1 | 3/2004 | Shibao | |
| 2004/0233467 A1* | 11/2004 | Namizuka | G06T 3/4023 358/1.13 |
| 2005/0275909 A1* | 12/2005 | Takayama | H04N 1/40056 358/509 |
| 2006/0061830 A1* | 3/2006 | Sakakibara | H04N 1/4097 358/448 |
| 2006/0209367 A1* | 9/2006 | Misaka | H04N 1/401 358/500 |
| 2007/0159551 A1* | 7/2007 | Kotani | H04N 1/4097 348/349 |
| 2007/0171294 A1* | 7/2007 | Watanabe | H04N 5/2171 348/340 |
| 2008/0137107 A1* | 6/2008 | Futami | H04N 1/121 358/1.4 |
| 2010/0157386 A1 | 6/2010 | Okumura | |
| 2011/0181919 A1 | 7/2011 | Okutsu | |
| 2013/0136315 A1 | 5/2013 | Kawamoto | |
| 2013/0278955 A1* | 10/2013 | Shimatani | H04N 1/4097 358/1.13 |
| 2017/0064095 A1* | 3/2017 | Matsuzaki | H04N 1/00037 |
| 2017/0180580 A1* | 6/2017 | Tanaka | H04N 1/00803 |
| 2017/0257495 A1 | 9/2017 | Kanaya | |
| 2017/0353611 A1* | 12/2017 | Koyama | H04N 1/401 |
| 2017/0353612 A1 | 12/2017 | Morikawa | |
| 2019/0281170 A1* | 9/2019 | Yokogawa | G06K 9/00442 |
| 2019/0281173 A1* | 9/2019 | Umi | H04N 1/00074 |

FOREIGN PATENT DOCUMENTS

| | | | | |
|---|---|---|---|---|
| JP | 2004-266522 A | | 9/2004 | |
| JP | 2005277752 | * | 10/2005 | H04N 1/401 |
| JP | 2008-154129 A | | 7/2008 | |
| JP | 2008311963 | * | 12/2008 | H04N 1/401 |
| JP | 2010-63091 A | | 3/2010 | |
| JP | 2010-74530 A | | 4/2010 | |
| JP | 2010-153975 A | | 7/2010 | |
| JP | 2012-204972 A | | 10/2012 | |
| JP | 2013-065949 A | | 4/2013 | |
| JP | 2013-70178 A | | 4/2013 | |
| JP | 2013-132042 A | | 7/2013 | |
| JP | 2016-66836 A | | 4/2016 | |
| JP | 2017-46342 A | | 3/2017 | |
| JP | 2017-158094 A | | 9/2017 | |
| JP | 2017-200027 A | | 11/2017 | |
| JP | 2017-201755 | | 11/2017 | |
| JP | 2017-216621 A | | 12/2017 | |
| JP | 2018-029231 | | 2/2018 | |
| KR | 20060033370 | * | 4/2006 | H04N 1/00005 |

OTHER PUBLICATIONS

Office Action dated Jun. 12, 2019 corresponding to related U.S. Appl. No. 16/124,155 (20 pages).

Japanese Office Action dated Jan. 5, 2021 regarding Japanese Patent Application No. 2018-044769 corresponding to U.S. Appl. No. 16/124,119 (5 pages) with English Translation (5 pages).

Japanese Office Action dated Feb. 10, 2021 regarding Japanese Patent Application No. 2018-044777 corresponding to U.S. Appl. No. 16/124,119 (7 pages) with English Translation (7 pages).

Japanese Office Action dated Feb. 10, 2021 regarding Japanese Patent Application No. 2018-044767 corresponding to U.S. Appl. No. 16/124,119 (6 pages) with English Translation (6 pages).

Japanese Office Action dated Apr. 7, 2021 regarding Japanese Patent Application No. 2018-044781 corresponding to U.S. Appl. No. 16/124,155 and relating to U.S. Appl. No. 16/124,119 (3 pages) with English Translation (3 pages).

* cited by examiner

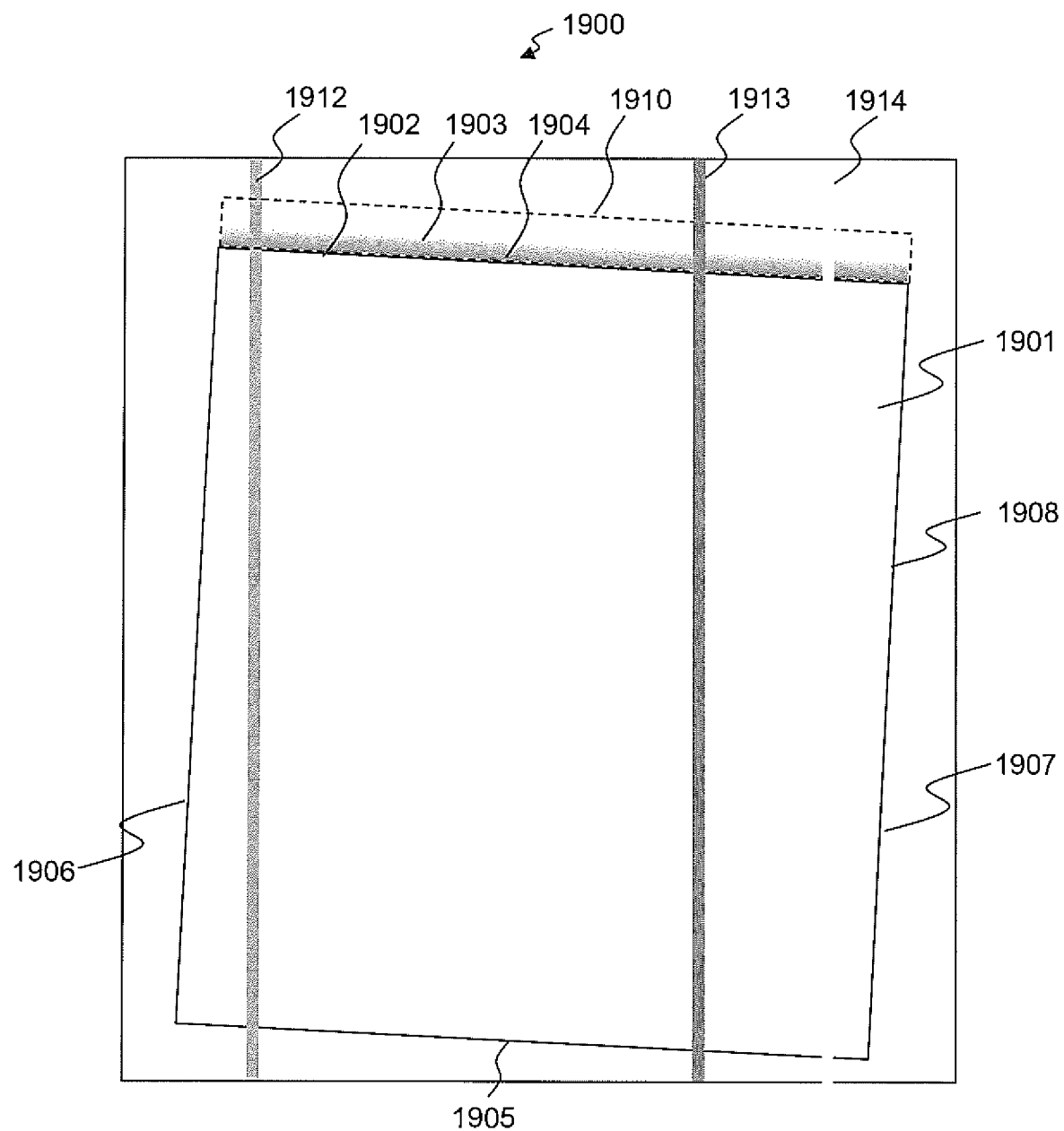

IMAGE READING APPARATUS FOR DETECTING A DIRT SUBSTANCE FROM A WHITE REFERENCE IMAGE AND A DOCUMENT IMAGE

CROSS-REFERENCE TO RELATED APPLICATIONS

This application is based upon and claims the benefit of priority of prior Japanese Patent Application No. 2018-044777, filed on Mar. 12, 2018, the entire contents of which are incorporated herein by reference.

TECHNICAL FIELD

The present invention relates to image processing technology.

BACKGROUND

An image reading apparatus, such as a scanner, typically captures an image of a document while conveying the document using an imaging device, such as a line sensor, where imaging elements are one-dimensionally arrayed. If a dirt substance, such as paper dust, other fine particles, or glue, adheres to a glass surface of the imaging device, noise line extending in a document conveyance direction is generated in an image that captures a document. Thus, an image reading apparatus or an image processing system having an image reading apparatus needs to appropriately detect a dirt substance from an image.

There has been disclosed a digital photocopier that reads a shading correction plate for acquiring data for shading correction and detects white level data when a user places a document on a document tray and issues a document reading request by operating an operation panel. The digital photocopier displays a notification on a display device prompting cleaning of a platen glass and a shading correction plate when dirt is detected in a white level detection process, and performs document reading processing when dirt is not detected. The digital photocopier determines that there is no dirt on the platen glass when dirt is not detected in processing of reading a marginal portion of a document (refer to Japanese Unexamined Patent Publication (Kokai) No. 2008-154129).

SUMMARY

An image reading apparatus or an image processing system having an image reading apparatus is desired to better detect a dirt substance from an image.

It is an object to provide an image reading apparatus, an image processing system, a control method, and a computer-readable, non-transitory medium storing a computer program that can better detect a dirt substance from an image.

According to an aspect of the apparatus, there is provided an image reading apparatus. The image reading apparatus includes an imaging device for generating a white reference image of a white reference member and a document image of a document and a periphery of the document, and a processor for performing first processing for detecting a dirt substance from the white reference image, generating data for shading correction based on the white reference image, correcting the document image using the data for shading correction to generate a correction image, and performing second processing for detecting a dirt substance from the correction image. One of the first processing or the second processing is performed using a dirt substance detection result of the other one of the first processing or the second processing. According to an aspect of the system, an image processing system is provided. The image processing system includes an image reading apparatus including an imaging device for generating a white reference image of a white reference member and a document image of a document and a periphery of the document, and a first processor for performing first processing for detecting a dirt substance from the white reference image, generating data for shading correction based on the white reference image, and correcting the document image using the data for shading correction to generate a correction image, and an information processing apparatus including a second processor for performing second processing for detecting a dirt substance from the correction image. One of the first processing or the second processing is performed using a dirt substance detection result of the other one of the first processing or the second processing.

According to an aspect of the method, there is provided a control method of an image processing system. The method includes acquiring a white reference image of a white reference member and a document image of a document and a periphery of the document, performing first processing for detecting a dirt substance from the white reference image, generating data for shading correction based on the white reference image, correcting the document image using the data for shading correction to generate a correction image, and performing second processing for detecting a dirt substance from the correction image. One of the first processing or the second processing is performed using a dirt substance detection result of the other one of the first processing or the second processing.

According to an aspect of the computer-readable, non-transitory medium storing a computer program, there is provided a computer-readable, non-transitory medium storing a computer program, wherein the computer program causes an image reading apparatus to execute a process. The process includes acquiring a white reference image of a white reference member and a document image of a document and a periphery of the document, performing first processing for detecting a dirt substance from the white reference image, generating data for shading correction based on the white reference image, correcting the document image using the data for shading correction to generate a correction image, and performing second processing for detecting a dirt substance from the correction image. One of the first processing or the second processing is performed using a dirt substance detection result of the other one of the first processing or the second processing.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 19A is a schematic view depicting an example of a correction image 1900.

DESCRIPTION OF EMBODIMENTS

Hereinafter, a document conveying apparatus, a control method, and computer program according to an embodiment, will be described with reference to the drawings. However, note that the technical scope of the invention is not limited to these embodiments and extends to the inventions described in the claims and their equivalents.

Figure 1:
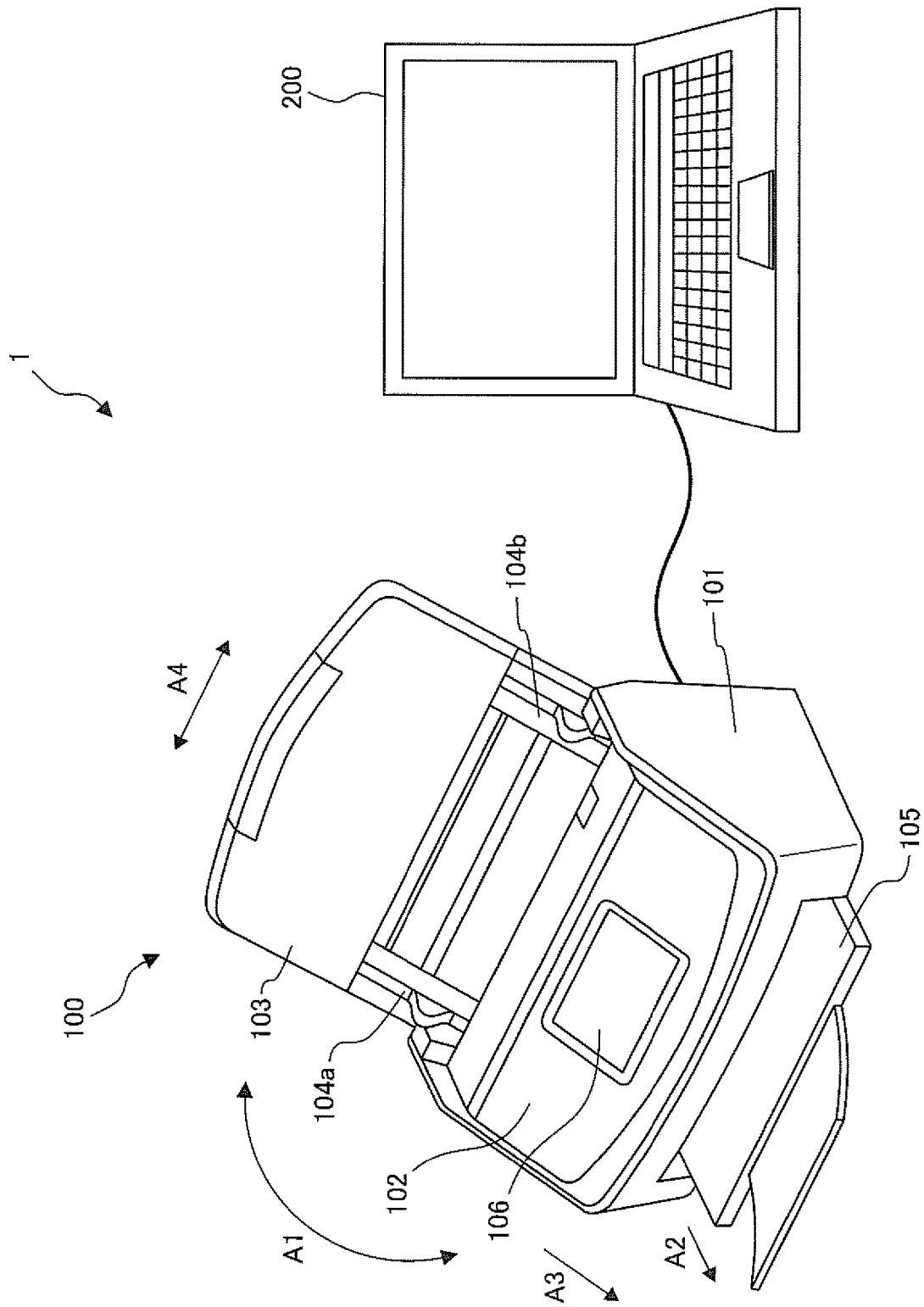
FIG. 1 is a configuration view of an example of an image processing system according to an embodiment.

FIG. 1 is a configuration view of an example of an image processing system 1 according to an embodiment.

The image processing system 1 includes an image reading apparatus 100 and an information processing apparatus 200. The image reading apparatus 100 is an example of the image processing apparatus, such as an image scanner. The image reading apparatus 100 may be a photocopier, a facsimile, or a multifunction peripheral (MFP). The information processing apparatus 200 is another example of the image processing apparatus, such as a personal computer, a multifunctional mobile terminal, or a mobile phone. The image reading apparatus 100 and the information processing apparatus 200 are mutually connected.

The image reading apparatus 100 includes a lower housing 101, an upper housing 102, a document tray 103, side guides 104*a*, 104*b*, a discharging tray 105, a display operation device 106, etc.

The upper housing 102 is arranged at a position for covering the upper surface of the image reading apparatus 100 and engaged with the lower housing 101 by a hinge such that the upper housing 102 can be opened and closed when a document is jammed or for cleaning the inside of the image reading apparatus 100, especially, the imaging position of the imaging sensor.

The document tray 103 is engaged with the lower housing 101 and rotatable in a direction of arrow A1. When the image reading apparatus 100 is not in use, the document tray 103 is arranged at a position for covering the upper housing 102 and the lower housing 101 and functions as an exterior cover. Whereas, when the image reading apparatus 100 is in use, the document tray 103 is arranged at a position on which documents can be placed and functions as a document placing tray.

The side guides 104*a* and 104*b* are provided on the document tray 103 movably in a direction A4 perpendicular to a document conveyance direction A3. The side guides 104*a* and 104*b* are aligned with the width of a document placed on the document tray 103 to regulate the width direction of the document.

The discharging tray 105 is housed inside the lower housing 101 such that the discharging tray 105 can be drawn out in a direction of arrow A2 where, in a drawn-out state, the discharging tray 105 can retain discharged documents.

The display operation device 106 is an example of a display device and an operation device. The display operation device 106 has a display composed of liquid crystal, organic EL (Electro-Luminescence), etc., and an interface circuit that outputs image data on the display so as to display image data on the display. The display operation device 106 further includes a touch-panel style input device and an interface circuit that acquires signals from the input device so as to receive an operation by a user and output signals according to an input by the user. Note that a display device and an operation device may be separately provided.

Figure 2:
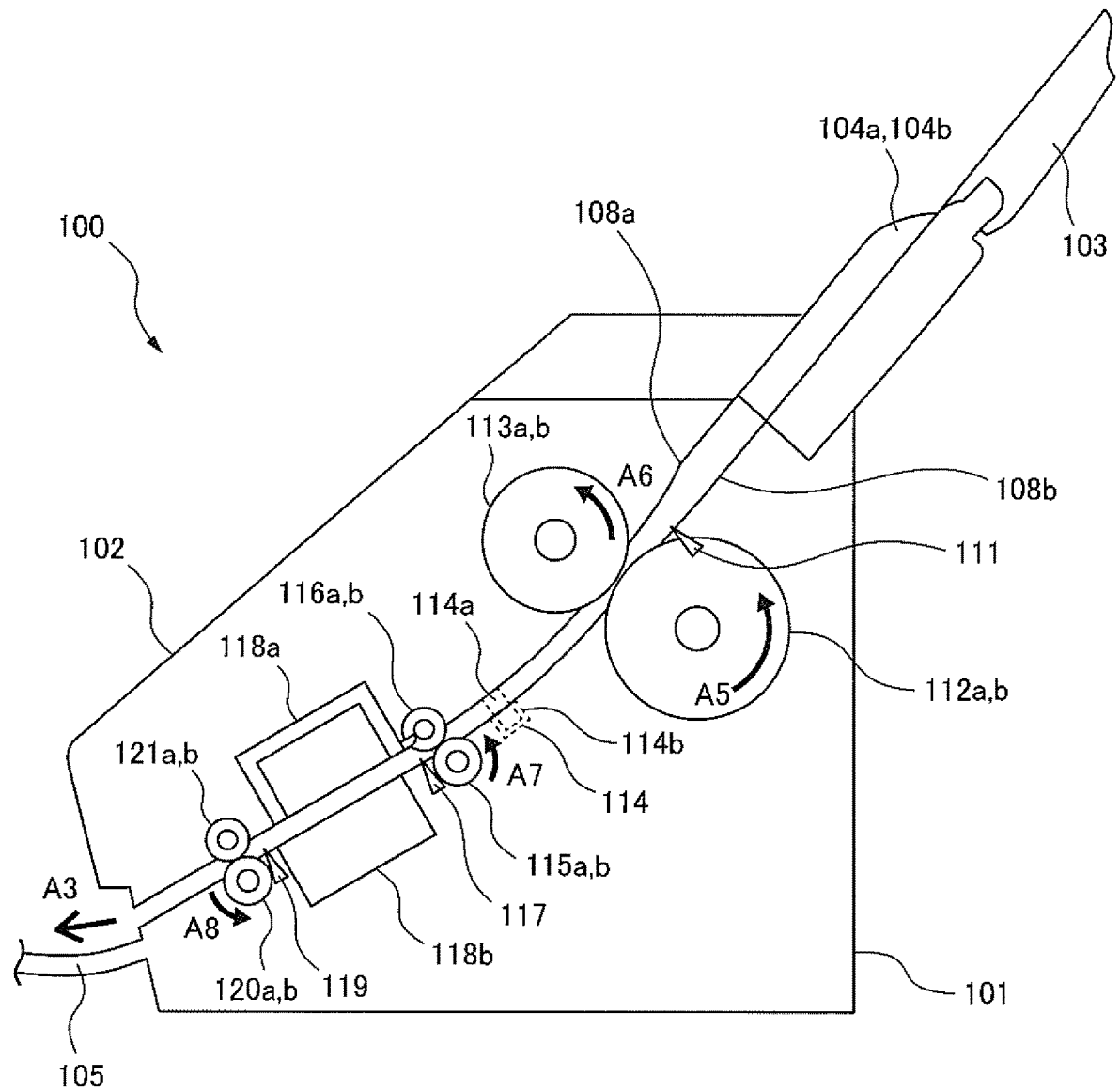
FIG. 2 is a view for illustrating a conveyance path inside an image reading apparatus.

FIG. 2 is a view for illustrating a conveyance path inside the image reading apparatus 100.

The conveyance path inside the image reading apparatus 100 includes: a first sensor 111, feed rollers 112a, 112b, retard rollers 113a, 113b, an open/close sensor 114, first conveyance rollers 115a, 115b, first driven rollers 116a, 116b, a second sensor 117, a first imaging unit 118a, a second imaging unit 118b, a third sensor 119, second conveyance rollers 120a, 120b, and second driven rollers 121a, 121b.

Hereinafter, the feed rollers 112a, 112b may be collectively referred to as the feed roller 112. Likewise, the retard rollers 113a, 113b may be collectively referred to as the retard roller 113. The first conveyance rollers 115a and 115b may be collectively referred to as the first conveyance roller 115. The first driven rollers 116a and 116b may be collectively referred to as the first driven roller 116. The second conveyance rollers 120a and 120b may be collectively referred to as the second conveyance roller 120. The second driven rollers 121a and 121b may be collectively referred to as the second driven roller 121. The first imaging unit 118a and the second imaging unit 118b may be collectively referred to as the imaging unit 118.

The lower surface of the upper housing 102 forms an upper guide 108a of the document conveyance path, while the upper surface of the lower housing 101 forms a lower guide 108b of the document conveyance path. In FIG. 2, an arrow A3 indicates a document conveyance direction. Hereinafter, upstream refers to upstream of the document conveyance direction A3; downstream refers to downstream of the document conveyance direction A1.

The first sensor 111 is a contact detecting sensor, is arranged on the upstream side of the feed roller 112 and retard roller 113 and detects whether or not a document is placed on the document tray 103.

The open/close sensor 114 is a contact detecting sensor that detects an open/closed state of the upper housing 102. The open/close sensor 114 detects whether the upper housing 102 is open or closed in relation to the lower housing 101 by detecting whether or not a projection 114a equipped on the upper housing 102 is engaged with a recess 114b equipped on the lower housing 101.

The second sensor 117 is a contact detecting sensor and is arranged on the downstream side of the first conveyance roller 115 and first driven roller 116, as well as, on the upstream side of the imaging unit 118. The second sensor 117 detects the presence of a document between the first conveyance roller 115 and first driven roller 116, and the imaging unit 118 in the document conveyance direction A3.

The third sensor 119 is a contact detecting sensor and is arranged on the downstream side of the imaging unit 118, as well as, on the upstream side of the second conveyance roller 120 and second driven roller 121. The third sensor 119 detects the presence of a document between the imaging unit 118, and the second conveyance roller 120 and second driven roller 121 in the document conveyance direction A3.

A document placed on the document tray 103 is conveyed in the document conveyance direction A3 between the upper guide 108a and the lower guide 108b by the rotation of the feed roller 112 in a direction of arrow A5. The retard roller 113 rotates in a direction of arrow A6 when a document is being conveyed. By the movement of the feed roller 112 and the retard roller 113, when a plurality of documents is placed on the document tray 103, only a document being in contact with the feed roller 112 among the documents placed on the document tray 103 is separated. As such, the feed roller 112 and retard roller 113 function as a conveyance member that conveys a document, as well as, as a separating member that separates a document by limiting the conveyance of documents other than the separated document (multi feed prevention).

The document is fed between the first conveyance roller 115 and the first driven roller 116 through the guide of the upper guide 108a and lower guide 108b. The document is then fed between the first imaging unit 118a and the second imaging unit 118b by the rotation of the first conveyance roller 115 in a direction of arrow A7. The document read by the imaging unit 118 is discharged on the discharging tray 105 by the rotation of the second conveyance roller 120 in a direction of arrow A8.

Figure 3:
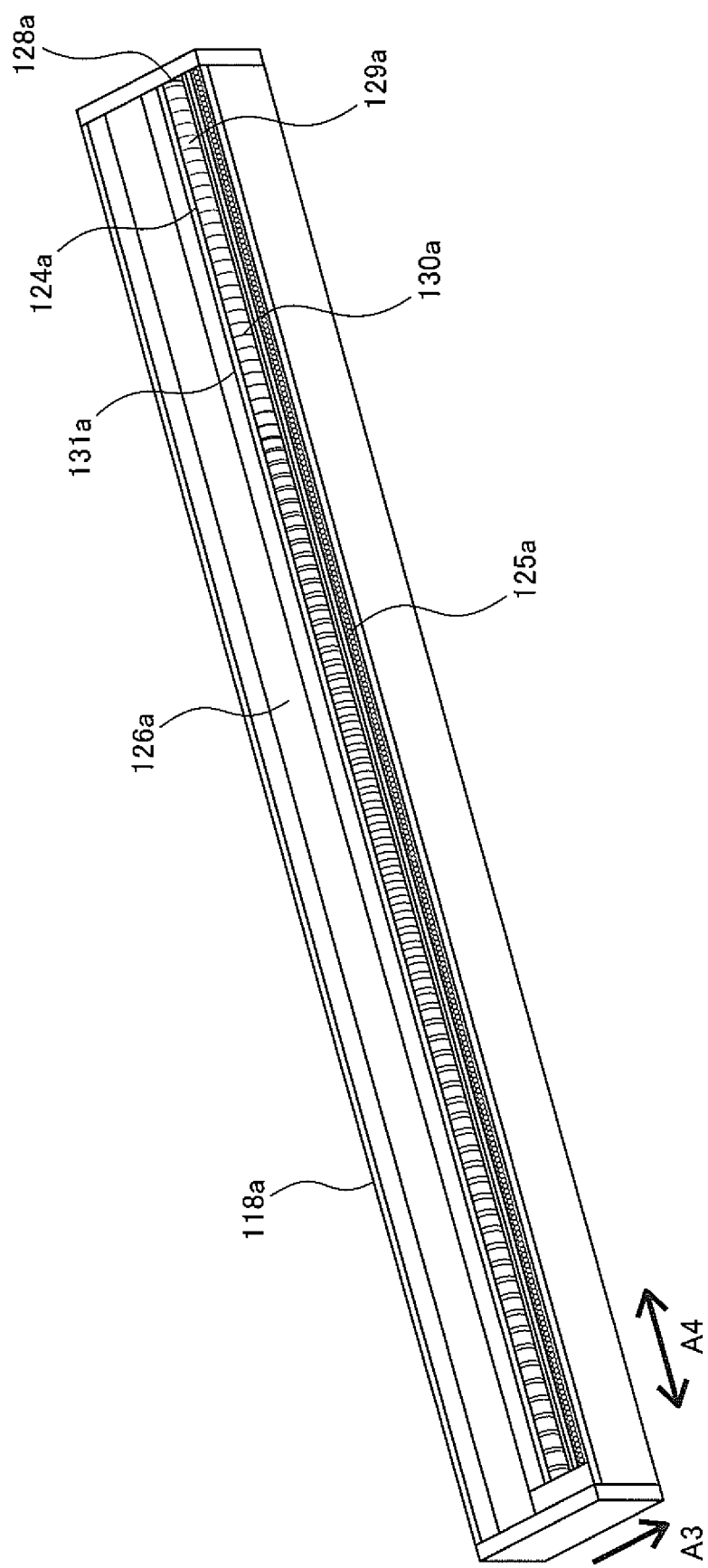
FIG. 3 is a perspective view of a first imaging unit seen from the side of a document conveyance path.
Figure 4:
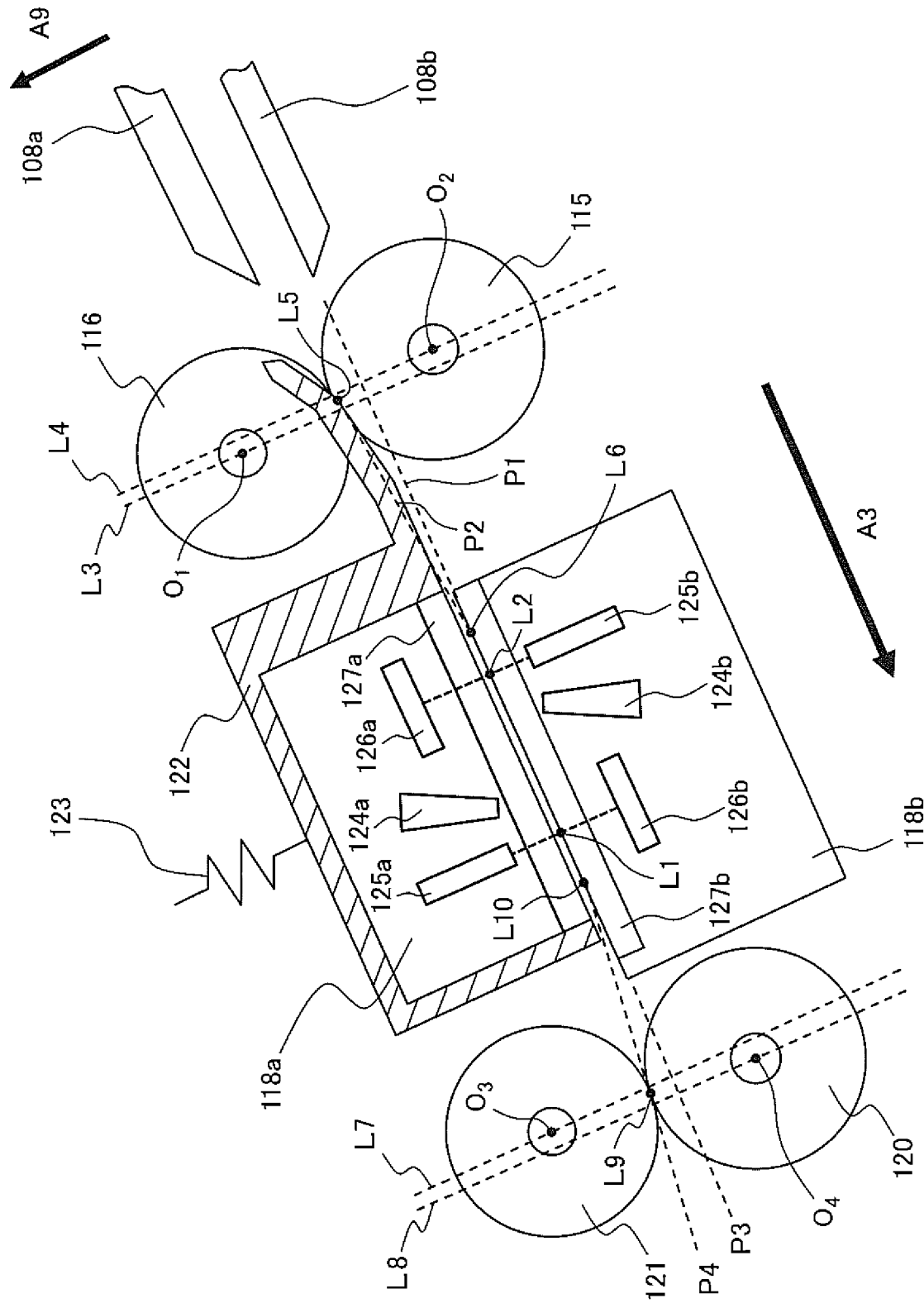
FIG. 4 is a view for illustrating the imaging unit and a conveyance mechanism of the upstream and downstream sides of the imaging unit.

FIG. 3 is a perspective view of the first imaging unit 118a seen from the side of the document conveyance path. Note that the second imaging unit 118b has the same structure as the first imaging unit 118a. FIG. 4 is a view for illustrating the imaging unit 118 and a conveyance mechanism of the upstream and downstream sides of the imaging unit 118.

The first imaging unit 118a is arranged above and opposing the second imaging unit 118b. The first imaging unit 118a is equipped with an imaging unit guide 122 for guiding a document between the first imaging unit 118a and the second imaging unit 118b. The first imaging unit 118a captures an image of the back surface of a conveyed document and the second imaging unit 118b captures an image of the front surface of a conveyed document.

While the second imaging unit 118b is fixed to the lower housing 101, the first imaging unit 118a is supported by the upper housing 102 such that the first imaging unit 118a is movable in a direction A9 perpendicular to the document conveyance path. An energizing spring 123 is equipped above the imaging unit guide 122 so that the energized spring 123 energizes the first imaging unit 118a toward the second imaging unit 118b.

The first imaging unit 118a includes a first light source 124a, a first imaging sensor 125a, a first white reference member 126a, a first transparent member 127a, etc. The second imaging unit 118b includes a second light source 124b, a second imaging sensor 125b, a second white reference member 126b, a second transparent member 127b, etc.

The first light source 124a is provided on the opposite side of the second white reference member 126b across the first transparent member 127a and the second transparent member 127b, as well as, on the upstream side of the first imaging sensor 125a in the document conveyance direction A3. The first light source 124a irradiates light toward the back surface of a document that has been conveyed to the position of the imaging unit 118 (when there is no conveyed document, toward the second white reference member 126b of the opposing second imaging unit 118b). The first light source 124a is equipped with an LED (Light Emitting Diode) 128a at an end thereof in a direction A4 perpendicular to the document conveyance direction A3, and further equipped with a light guide member 129a that guides light irradiated from the LED along the direction A4. The light guide member 129a is equipped with a plurality of slits 130a along the direction A4 through which light irradiated from the LED 128a passes. The widths of the slits 130a are increased as the slits are farther from the LED 128a so that the light amount becomes substantially uniform at each position.

A shield member 131a that has an opening on the side facing the imaging position L1 is provided around the light guide member 129a so that the first light source 124a can irradiate light toward the imaging position L1 of the first imaging sensor 125a. As such, the first light source 124a is provided in a manner in which the direction of the irradiated light is inclined with reference to the imaging direction of the first imaging sensor 125a.

Likewise, the second light source 124b is provided on the opposite side of the first white reference member 126a across the second transparent member 127b and the first transparent member 127a, as well as, on the downstream side of the second imaging sensor 125b in the document conveyance direction A3. The second light source 124b irradiates light toward the front surface of the document that has been conveyed to the position of the imaging unit 118 (when there is no conveyed document, toward the first white reference member 126a of the opposing first imaging unit 118a). The second light source 124b is equipped with an LED at an end thereof in the direction A4 and further equipped with a light guide member that guides light irradiated from the LED along the direction A4. The second light source 124b is provided in a manner in which the direction of the irradiated light is inclined with reference to the imaging direction of the second imaging sensor 125b.

The first imaging sensor 125a is an example of the imaging device and is provided on the opposite side of the second white reference member 126b across the first transparent member 127a and the second transparent member 127b. The first imaging sensor 125a is a Contact Image Sensor (CIS) of a unit magnification optical system type that has imaging elements using complementary metal oxide semiconductor (CMOS) that are linearly arranged in the main scanning direction. Further, the first imaging sensor 125a has a lens that forms an image on the imaging device and an A/D (analog to digital) converter that amplifies the electric signals output from the imaging device and converts the analog signals to digital signals (A/D). At the imaging position L1, the first imaging sensor 125a generates and outputs a document image captured a back surface and periphery of a document that was conveyed between the first imaging unit 118a and the second imaging unit 118b, i.e., between the second transparent member 127b and the first imaging sensor 125a. When there is no conveyed document, the first imaging sensor 125a generates and outputs a white reference image captured the second white reference member 126b.

Likewise, the second imaging sensor 125b, at the imaging position L2, is an example of the imaging device and is provided on the opposite side of the first white reference member 126a across the first transparent member 127a and the second transparent member 127b. The second imaging sensor 125b is a CIS of a unit magnification optical system type that has imaging elements using CMOS that are linearly arranged in the main scanning direction. Further, the second imaging sensor 125b has a lens that forms an image on the imaging device and an A/D converter that amplifies the electric signals output from the imaging device and converts the analog signals to digital signals. At the imaging position L2, the second imaging sensor 125b generates and outputs a document image captured a front surface and periphery of a document that was conveyed between the first imaging unit 118a and the second imaging unit 118b, i.e., between the first transparent member 127a and the second imaging sensor 125b. When there is no conveyed document, the second imaging sensor 125b generates and outputs a white reference image captured the first white reference member 126a.

Note that the first imaging sensor 125a and the second imaging sensor 125b may be an imaging sensor of an optical reduction system type that has imaging elements using charge coupled device (CCD), instead of CMOS.

The first white reference member 126a is provided at a position above the first transparent member 127a and spaced apart from the first transparent member 127a and opposing the second light source 124b and second imaging sensor 125b of the second imaging unit 118b. The surface of the first white reference member 126a facing the second imaging sensor 125b is white. Likewise, the second white reference member 126b is provided at a position below the second transparent member 127b and spaced apart from the second transparent member 127b and opposing the first light source 124a and first imaging sensor 125a of the first imaging unit 118a. The surface of the second white reference member 126b facing the first imaging sensor 125a is white. The image reading apparatus 100 can correct an image, such as by shading correction, based on the image signals captured the first white reference member 126a and the second white reference member 126b.

The first transparent member 127a and the second transparent member 127b are formed of transparent glass. Note that the first transparent member 127a and the second transparent member 127b may instead be formed of transparent plastic etc.

Hereinafter, the first light source 124a and the second light source 124b may be collectively referred to as the light source 124, and the first imaging sensor 125a and the second imaging sensor 125b may be collectively referred to as the imaging sensor 125. The first white reference member 126a and the second white reference member 126b may be collectively referred to as the white reference member 126, and the first transparent member 127a and the second transparent member 127b may be collectively referred to as the transparent member 127.

As depicted in FIG. 4, the first driven roller 116 is arranged above and opposing the first conveyance roller 115. That is, the first driven roller 116 is arranged on the opposite side of the second white reference member 126b with reference to the upper surface of the second transparent member 127b from the first conveyance roller 115 in the direction A9 perpendicular to the second transparent member 127b. The conveyance roller pair including the first conveyance roller 115 and the first driven roller 116 functions as a conveyance member that conveys a document between the first imaging unit 118a and the second imaging unit 118b, i.e., between the second transparent member 127b and the first imaging sensor 125a.

A position L3, which is the position of the center $O_1$ as an rotation axis of the first driven roller 116 in the document conveyance direction A3, is shifted to the side of the imaging unit 118, i.e., the side of the first imaging sensor 125a, than a position L4 which is the position of the center $O_2$ as an rotation axis of the first conveyance roller 115 in the document conveyance direction A3. A nip position L5 of the first conveyance roller 115 and the first driven roller 116 is arranged above the upper surface of the second transparent member 127b, i.e., on the opposite side of the second white reference member 126b with reference to the upper surface of the second transparent member 127b in the direction A9 perpendicular to the second transparent member 127b.

In particular, the nip position L5 is arranged such that a position L6, at which a tangent plane P2 that contacts the first conveyance roller 115 at the nip position L5 contacts the upper surface of the second transparent member 127b, is arranged on the upstream side of the imaging positions L1 and L2 in the document conveyance direction A3. As such, the first conveyance roller 115 and the first driven roller 116 can convey a document such that the document is conveyed along the second transparent member 127b at the imaging positions L1 and L2.

The second driven roller 121 is arranged above and opposing the second conveyance roller 120. That is, the second driven roller 121 is arranged on the opposite side of the second white reference member 126b with reference to the upper surface of the second transparent member 127b from the second conveyance roller 120 in the direction A9.

A position L7, which is the position of the center $O_3$ as an rotation axis of the second driven roller 121 in the document conveyance direction A3, is shifted to the side of the imaging unit 118, i.e., the side of the first imaging sensor 125a, than a position L8 which is the position of the center $O_4$ as an rotation axis of the second conveyance roller 120 in the document conveyance direction A3. A nip position L9 of the second conveyance roller 120 and the second driven roller 121 is arranged at the same height as the nip position of the first conveyance roller 115 and the first driven roller 116 from the upper surface of the second transparent member 127b in the direction A9 perpendicular to the second transparent member 127b. In particular, the nip position L9 is arranged so that a position L10, at which a tangent plane P4 that contacts the second conveyance roller 120 at the nip position L9 contacts the upper surface of the second transparent member 127b, is arranged on the downstream side of the imaging positions L1 and L2 in the document conveyance direction A3. The angle of the tangent plane P4 with reference to the upper surface of the second transparent member 127b is preferably arranged to be the same angle of the tangent plane P2 with reference to the upper surface of the second transparent member 127b.

Figure 5:
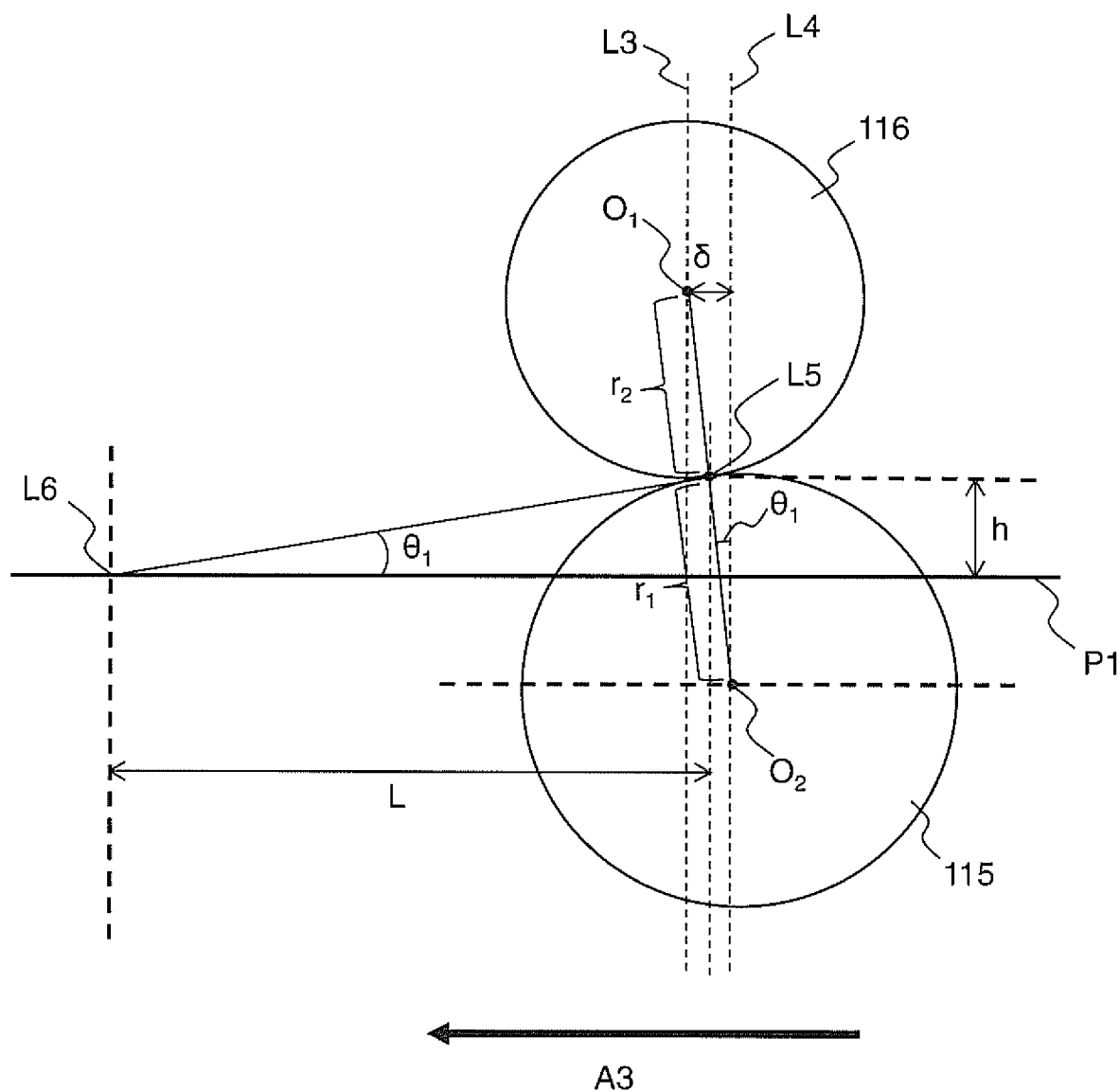
FIG. 5 is a view for illustrating the arrangement of a first conveyance roller and a first driven roller.

FIG. 5 is a view for illustrating the arrangement of the first conveyance roller 115 and the first driven roller 116.

A distance h between the nip position L5 of the first conveyance roller 115 and the first driven roller 116 and an extension plane P1 of the upper surface of the second transparent member 127b is set to be larger than the height of an embossed bump that may be formed on a card to be conveyed. Likewise, depicted in FIG. 4, a distance between the nip position L9 of the second conveyance roller 120 and the second driven roller 121 and an extension plane P3 of the upper surface of the second transparent member 127b is set to be larger than the height of an embossed bump that may be formed on a card to be conveyed. The height of an embossed bump can be defined according to the specification of the device and may be set at 0.46 mm that is the height of embossing on an identification (ID) card specified by ISO/IEC 7811-1. Alternatively, the height of an embossed bump may be set at 0.48 mm that is the height of embossing on a card specified by Japanese Industrial Standards (JIS).

The following formulas can be established with regard to the first conveyance roller 115 and the first driven roller 116:

$$\sin\theta_1 = \frac{\delta}{r_1 + r_2}, \tan\theta_1 = \frac{h}{L} \quad [\text{Math 1}]$$

$\theta_1$ is an angle of a straight line extending from the imaging position L2 of the second imaging sensor 125b to the nip position L5 of the first conveyance roller 115 and the first driven roller 116 with reference to the extension plane P1. $r_1$ is the radius of the first conveyance roller 115 and $r_2$ is the radius of the first driven roller 116. L is a distance from the nip position L5 to the imaging position L2 of the second imaging sensor 125b in the document conveyance direction A3. $\delta$ is a displacement of the center $O_1$ of the first driven roller 116 with reference to the center $O_2$ of the first conveyance roller 115 in the document conveyance direction A3.

Thus, the displacement $\delta$ of the center $O_1$ of the first driven roller 116 with reference to the center $O_2$ of the first conveyance roller 115 in the document conveyance direction A3 can be calculated by the following formula:

$$\delta = (r_1 + r_2) \times \sin\left(\tan^{-1}\left(\frac{h}{L}\right)\right) \quad [\text{Math 2}]$$

To arrange the position L6 depicted in FIG. 4 on the side of the first conveyance roller 115 and first driven roller 116 than the imaging position L2, the center $O_1$ of the first driven roller 116 may be shifted by $\delta$ or more from the center $O_2$ of the first conveyance roller 115 in the document conveyance direction A3. For example, when h is 1.5 mm; $r_1$, 6.8 mm; $r_2$, 6.5 mm; and L, 18.7 mm, the displacement of the center $O_1$ of the first driven roller 116 with reference to the center $O_2$ of the first conveyance roller 115 is set at 1.1 mm.

Figure 6:
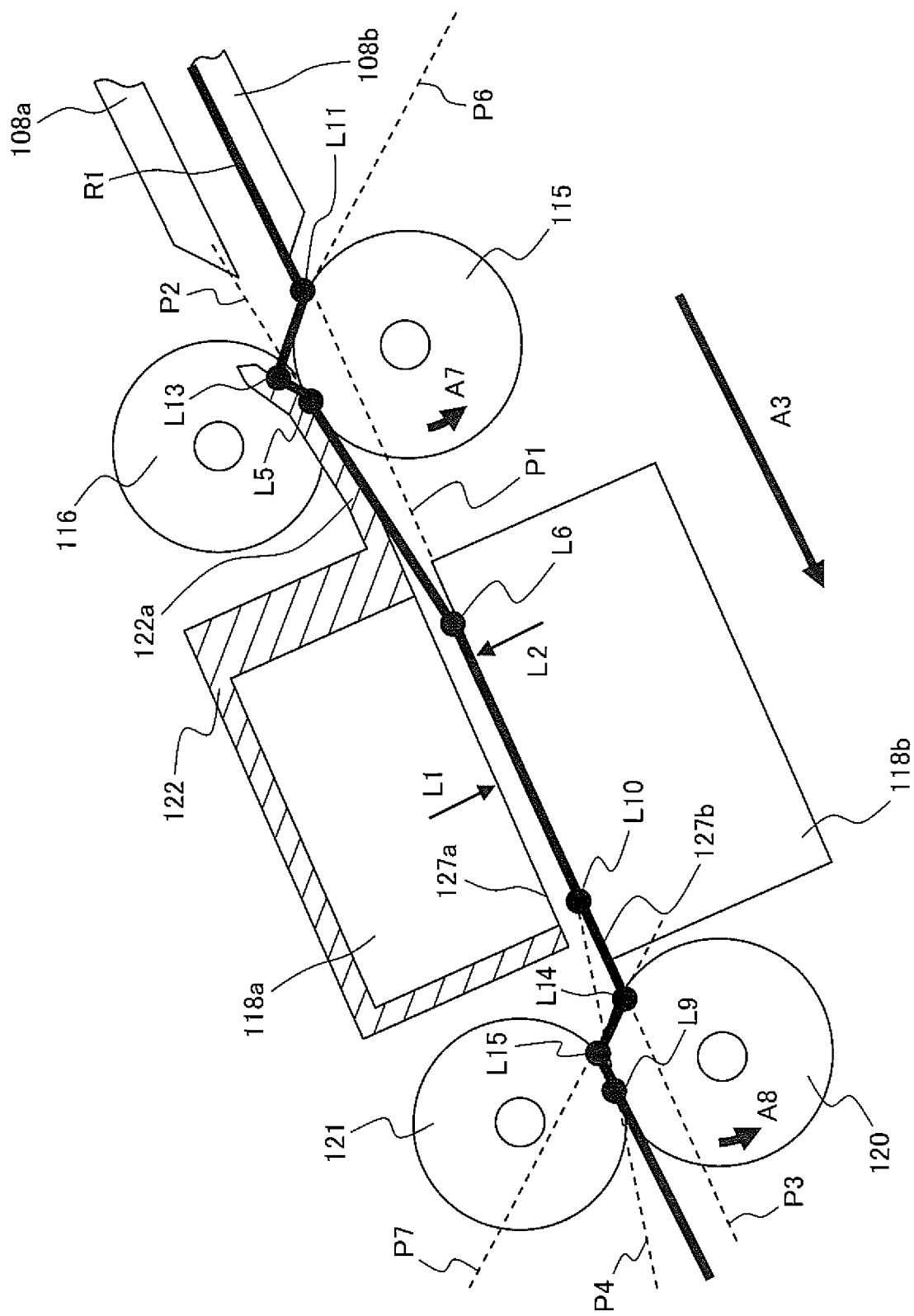
FIG. 6 is a view for illustrating how a document is conveyed.

FIG. 6 is a view for illustrating how a document is conveyed.

In FIG. 6, the path R1 indicates an ideal conveyance path through which the leading end of a document passes. The leading end of a document that is conveyed by the image reading apparatus 100 contacts the first conveyance roller 115 at a position L11, and proceeds upward from the extension plane P1 on the upper surface of the second transparent member 127b along the tangent plane P6 of the first conveyance roller 115. Then, the leading end of the document contacts the guide member 122a of the imaging unit guide 122 at a position L13, then, proceeds downward.

The leading end of the document that is directed downward by the guide member 122a is fed between the first conveyance roller 115 and the first driven roller 116. The leading end of the document passes through the nip position L5 of the first conveyance roller 115 and the first driven roller 116, proceeds along the tangent plane P2 at the nip position L5, and contacts the second transparent member 127b of the second imaging unit 118b at the position L6.

The leading end of the document that has contacted the second transparent member 127b is conveyed along the second transparent member 127b. After passing through between the first imaging unit 118a and the second imaging unit 118b, the leading end of the document proceeds along the extension plane P3 of the upper surface of the second transparent member 127b and contacts the second conveyance roller 120 at a position L14. The leading end of the document that has contacted the second conveyance roller 120 proceeds along the tangent plane P7 of the second conveyance roller 120 at the position L14, and contacts the second driven roller 121 at a position L15.

The leading end of the document that has contacted the second driven roller 121 is fed between the second conveyance roller 120 and the second driven roller 121, and passes through the nip position L9 of the second conveyance roller 120 and the second driven roller 121.

When the leading end of the document has passed the nip position L9, a portion of the document located on the second transparent member 127b is pulled along the tangent plane P4 at the nip position L9 and separated from the second transparent member 127b on the downstream side of the position L10 in the document conveyance direction A3. The document is always maintained at a certain distance from the second transparent member 127b at the imaging positions L1 and L2, and the distance from the document to each imaging sensor 125 is constant. As such, even when CIS of a unit magnification optical system type with small depth-of-field is used, occurrence of divergence of focus can be prevented and the imaging sensor 125 can acquire stable images. In particular, as a distance from a document to each imaging sensor 125 in the direction A4 (main scanning direction) perpendicular to the document conveyance direction A3 is constant, occurrence of unevenness in the horizontal direction in the document image is prevented. By stabilizing the conveyance path of a document, the image reading apparatus 100 does not need an ample space in the direction A9 (vertical direction) perpendicular to the second transparent member 127b, and the device size can be reduced.

Since the leading end of a document is conveyed along the second transparent member 127b, the leading end of the document can clean the second transparent member 127b, i.e., remove dirt substances from the second transparent member 127b. Although dirt substances may not only adhere to the second transparent member 127b but also possibly adhere to the first transparent member 127a, dirt substances adhering to the first transparent member 127a are more likely to fall by its own weight and adhere to the second transparent member 127b. In the image reading apparatus 100, the conveyance of the leading end of a document along the second transparent member 127b allows removal of dirt substances that fell from the first transparent member 127a.

Figure 7:
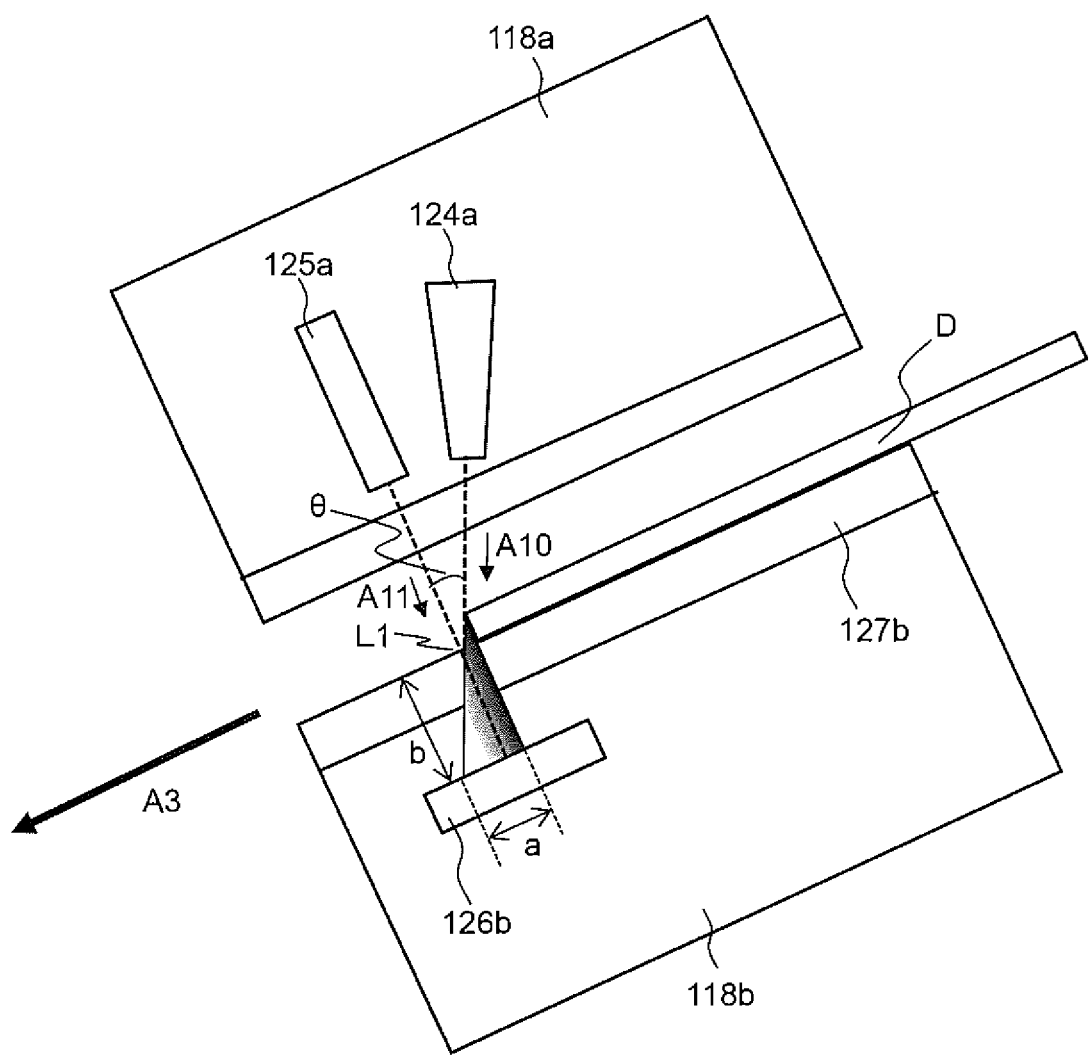
FIG. 7 is a view for illustrating the arrangement of a first light source and a first imaging sensor.

FIG. 7 is a view for illustrating the arrangement of the first light source 124a and the first imaging sensor 125a.

As depicted in FIG. 7, the first light source 124a is provided on the upstream side of the first imaging sensor 125a in the document conveyance direction A3 such that the light irradiation direction A10 is inclined with reference to the imaging direction A11 of the first imaging sensor 125a. The second white reference member 126b is provided spaced apart from the second transparent member 127b. As such, when a document D conveyed on the second transparent member 127b has reached immediately before the imaging position L1 of the first imaging sensor 125a, a shadow of the leading end of the document D is formed on the second white reference member 126b at the imaging position L1.

When a dirt substance (foreign substance), such as paper dust, other fine particles, glue, etc., adheres to the transparent member 127, noise line (vertical streak noise) extending in a document conveyance direction (sub-scanning direction) is generated in a document image, necessitating removal of such noise line. Dirt substances may in some cases be captured in white and in other cases in black in the document image. When the color of a dirt substance is similar to the color of a background of a document, the dirt substance is less likely to be identified or detected in the document image. In addition, since the white reference member 126 is white, although black dirt substances can be clearly identified and accurately detected in the white reference image, white dirt substances are less likely to be identified and detected in the white reference image. Thus, the image processing system 1 detects noise line in a shadow region formed by the shadow of a document in the correction image that was made based on the document image. Since the shadow formed on the white reference member 126 is gray that is an intermediate color of white and black, both white and black dirt substances can be identified and accurately detected in the shadow region.

The correction image preferably has a shadow of 4 pixels or more in the document conveyance direction A3 so that the noise line can be well detected in the correction image. Accordingly, the width a of a shadow in the document conveyance direction A3 formed on the second white reference member 126b is preferably a length equivalent to 4 pixels (0.3 mm in 300 dpi) or more.

The width a is the product of a distance b from the upper surface of the second transparent member 127b to the upper surface of the second white reference member 126b and the tangent of an angle θ of the light irradiation direction A10 with reference to the imaging direction A11. In order to increase the width a, the angle θ or the distance b should be increased. However, if the angle θ is excessively increased, the dimension of the imaging unit 118 is enlarged. As such, the angle θ is preferably a value between 30° or more and 45° or less. Whereas, if the length b is excessively increased, the luminance of the second white reference member 126b becomes lower (darker) in the white reference image captured the second white reference member 126b, and it becomes difficult to perform satisfactory shading correction using the white reference image. As such, the length b is preferably a value between 0.8 mm or more and 1.8 mm or less.

Each imaging unit 118 is constituted by a CIS and irradiates the second white reference member 126b only by the directive light emitted from the first light source 124a. For example, if an image reading apparatus has a reflection member that reflects light emitted from the first light source 124a toward the second white reference member 126b, the dimension of the device increases, as well as, a shadow formed on the second white reference member 126b becomes bright and disappears (fades). Whereas, the image reading apparatus 100 does not have a reflection member that reflects the light emitted from the first light source 124a toward the side of the second white reference member 126b. In this way, with the image reading apparatus 100, the dimension of the device can be reduced, as well as, a shadow can be favorably formed on the second white reference member 126b.

Note that the second light source 124b is provided on the downstream side of the second imaging sensor 125b in the document conveyance direction A3 such that the light irradiation direction is inclined with reference to the imaging direction of the second imaging sensor 125b. The first white reference member 126a is provided spaced apart from the first transparent member 127a. As such, when the rear end of a document D conveyed on the second transparent member 127b has passed the imaging position L2 of the second imaging sensor 125b, a shadow of the rear end of the document D is formed at the imaging position L2 on the first white reference member 126a.

When the light source 124 is provided on the upstream side of the imaging sensor 125 in the document conveyance direction A3, a shadow is formed by the leading end of the document D, while, when the light source 124 is provided on the downstream side of the imaging sensor 125, a shadow is formed by the rear end of the document D. A shadow formed by the leading end of the document D allows detection of a shadow area from the document image and detection of a dirt substance before completion of the conveyance of the document D, thus, the light source 124 is preferably provided on the upstream side of the imaging sensor 125 in the document conveyance direction A3.

As described above, since a sufficiently long shadow is formed on each white reference member 126 in the image reading apparatus 100, the image processing system 1 can accurately detect both black and white dirt substances at the imaging position of each imaging sensor 125.

In addition, as described above, the first conveyance roller 115 and the first driven roller 116 can convey a document such that the document is conveyed along the second transparent member 127*b* at the imaging positions L1 and L2. In this way, in contrast to a case where a document is conveyed floated in the air without being conveyed along a specific member, the image reading apparatus 100 can stabilize a document conveyance path regardless of the kind of document (thickness, hardness, etc.) and stably generate a shadow on the white reference member 126.

Further, the image reading apparatus 100 has a transparent member 127 between the document conveyance path and each white reference member 126, protecting the white reference member 126 and preventing the white reference member 126 from dirt or scratches. Since the transparent member 127 has higher rigidity than the white reference member 126, the transparent member 127 is less likely to sustain scratches when cleaned by users.

Figure 8:
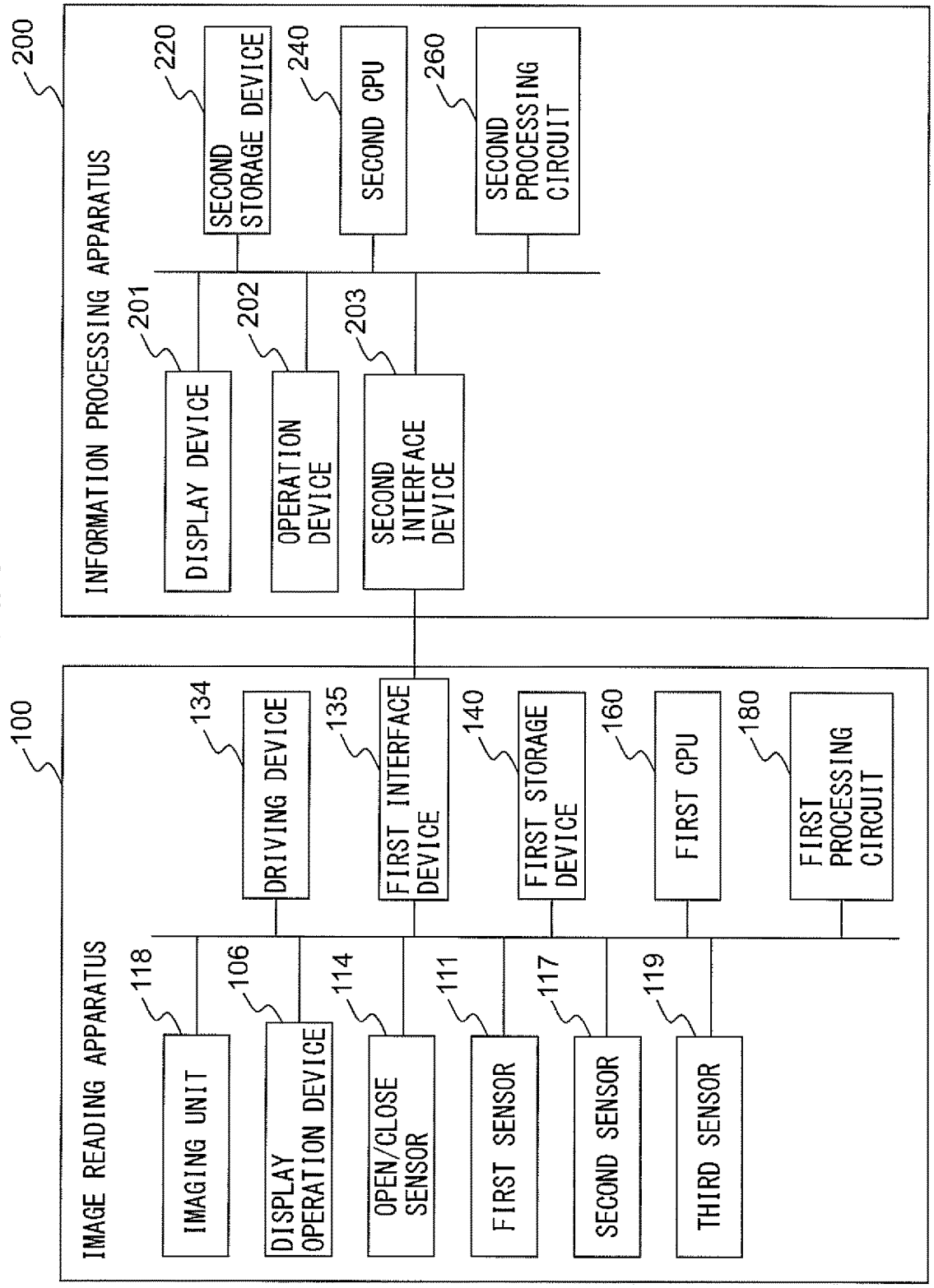
FIG. 8 is a block diagram depicting schematic components of an image reading apparatus and an information processing apparatus.

FIG. 8 is a block diagram depicting schematic components of the image reading apparatus 100 and the information processing apparatus 200.

In addition to the above-described components, the image reading apparatus 100 further includes a driving device 134, a first interface device 135, a first storage device 140, a first Central Processing Unit (CPU) 160, a first processing circuit 180, etc.

The driving device 134 includes one or a plurality of motors and rotates the feed roller 112, the retard roller 113, the first conveyance roller 115, and the second conveyance roller 120 according to a control signal from the CPU 160 to convey a document.

The first interface device 135 has an interface circuit conforming to a serial bus such as Universal Serial Bus (USB). The first interface device 135 transmits and receives various images and information through a communication connection with the information processing apparatus 200. Instead of the first interface device 135, a communication device that has an antenna for transmitting and receiving wireless signals and a wireless communication interface circuit for transmitting and receiving signals via a wireless communication channel according to a predetermined communication protocol may be used. The predetermined communication protocol may be, for example, a wireless local area network (LAN).

The first storage device 140 includes: a memory device, such as a random access memory (RAM) and a read only memory (ROM); a fixed disk device, such as a hard disk; or a portable storage device, such as a flexible disk and an optical disk. The first storage device 140 stores a computer program, a database, a table, etc., that are used for various processing of the image reading apparatus 100. The computer program may be installed on the first storage device 140 from a computer-readable, non-transitory medium such as a compact disk read only memory (CD-ROM), a digital versatile disk read only memory (DVD-ROM), etc., by using a well-known setup program, etc.

The first storage device 140 further stores a variety of images. The first storage device 140 also stores number of documents which have been scanned as a document scan count, the position of dirt, etc. The scan count is the number of times the image reading apparatus 100 has scanned a document and incremented each time the image reading apparatus 100 scans a document. The position of dirt is a position where a dirt substance is detected in the white reference image. The scan count and the position of dirt are stored in a non-transitory memory to be referred to even after the power of the image reading apparatus 100 is switched off and on again.

The first CPU 160 operates according to a program stored in advance in the first storage device 140. Note that a digital signal processor (DSP), a large scale integration (LSI), etc., may be used instead of the first CPU 160. Alternatively, an Application Specific Integrated Circuit (ASIC), a field-programming gate array (FPGA) etc., may be used instead of the first CPU 160.

The first CPU 160 is connected to the display operation device 106, the first sensor 111, the open/close sensor 114, the second sensor 117, the third sensor 119, the imaging unit 118, the driving device 134, the first interface device 135, the first storage device 140, the first processing circuit 180, etc., and controls these components. The first CPU 160 controls driving of the driving device 134, document reading of the imaging unit 118, etc., to acquire a document image.

The first processing circuit 180 performs predetermined image processing such as correction processing on the document image acquired from the imaging unit 118. Note that a LSI, a DSP, an ASIC, a FPGA, etc., may be used as the first processing circuit 180.

Whereas, the information processing apparatus 200 further includes a display device 201, an operation device 202, a second interface device 203, a second storage device 220, a second CPU 240, a second processing circuit 260, etc.

The display device 201 is an example of a display device, which has a display composed of liquid crystal, organic EL, etc., and an interface circuit for outputting image data on the display and displays image data on the display according to an instruction from the second CPU 240.

The operation device 202 is an example of an operation device, which further includes an input device and an interface circuit that acquires signals from the input device, receives an operation by a user, and outputs signals according to the input by the user to the second CPU 240.

The second interface device 203 includes an interface circuit or a wireless communication interface circuit, similar to the one of the first interface device 135, and transmits and receives a variety of images and information through a communication connection with the image reading apparatus 100.

The second storage device 220 has: a memory device, such as a RAM and a ROM; a fixed disk device, such as a hard disk; or a portable storage device, such as a flexible disk and an optical disk. Further, the second storage device 220 stores a computer program, a database, a table, etc., that are used for various processing of the information processing apparatus 200. The computer program may be installed on the second storage device 220 from a computer-readable, non-transitory medium such as a CD-ROM, a DVD-ROM, etc., by using a well-known setup program, etc.

The second storage device 220 further stores a variety of images. The second storage device 220 also stores noise line positions etc. The noise line position is a position where a noise line is detected in a correction image. The noise line position is stored in a non-transitory memory, a hard disk, etc., so as to be referred to even after the power of the information processing apparatus 200 is switched off and on again.

The second CPU 240 operates according to a program stored in advance in the second storage device 220. Note that a DSP, a LSI, an ASIC, a FPGA, etc., may be used instead of the second CPU 240.

The second CPU 240 is connected to the display device 201, the operation device 202, the second interface device 203, the second storage device 220, the second processing circuit 260, etc., and controls these components. The second CPU 240 controls the components and executes image processing on images acquired from the image reading apparatus 100.

The second processing circuit 260 performs predetermined image processing such as correction processing on an image acquired from the image reading apparatus 100. Note that a DSP, a LSI, an ASIC, a FPGA, etc., may be used as the second processing circuit 260.

Figure 9:
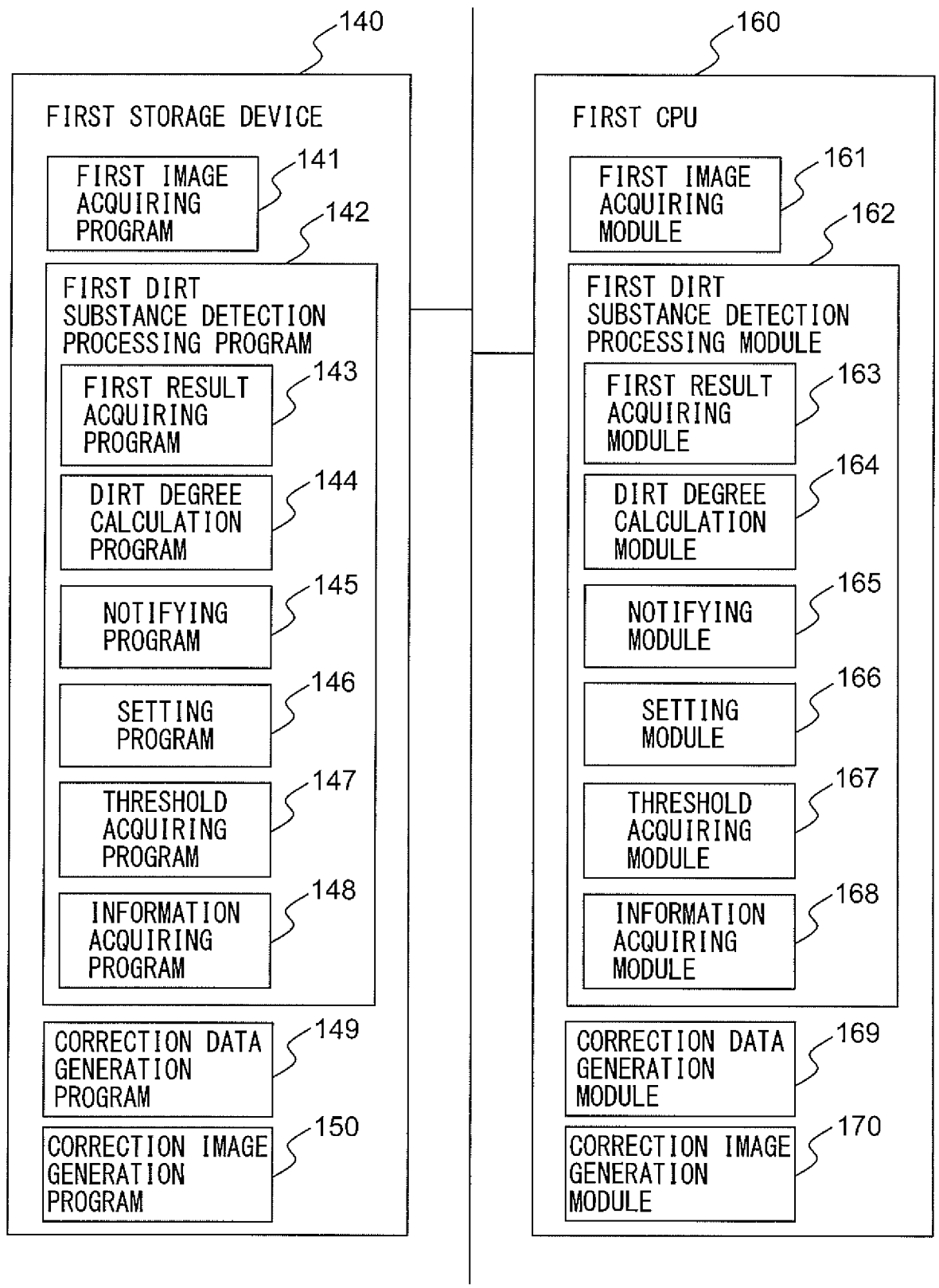
FIG. 9 is a view depicting schematic components of a first storage device and a first CPU.

FIG. 9 is a view depicting the schematic components of the first storage device 140 and the first CPU 160 of the image reading apparatus 100.

As depicted in FIG. 9, the first storage device 140 stores programs, such as a first image acquiring program 141, a first dirt substance detection processing program 142, a correction data generation program 149, a correction image generation program 150, etc. The first dirt substance detection processing program 142 includes a first result acquiring program 143, a dirt degree calculation program 144, a notifying program 145, a setting program 146, a threshold acquiring program 147, an information acquiring program 148, etc. Each program is a functional module implemented by software that operates on the processor. The first CPU 160 reads each program stored in the first storage device 140 and operates according to the read program. As such, the first CPU 160 functions as a first image acquiring module 161, a first dirt substance detection processing module 162, a first result acquiring module 163, a dirt degree calculation module 164, a notifying module 165, a setting module 166, a threshold acquiring module 167, an information acquiring module 168, a correction data generation module 169, and a correction image generation module 170.

Figure 10:
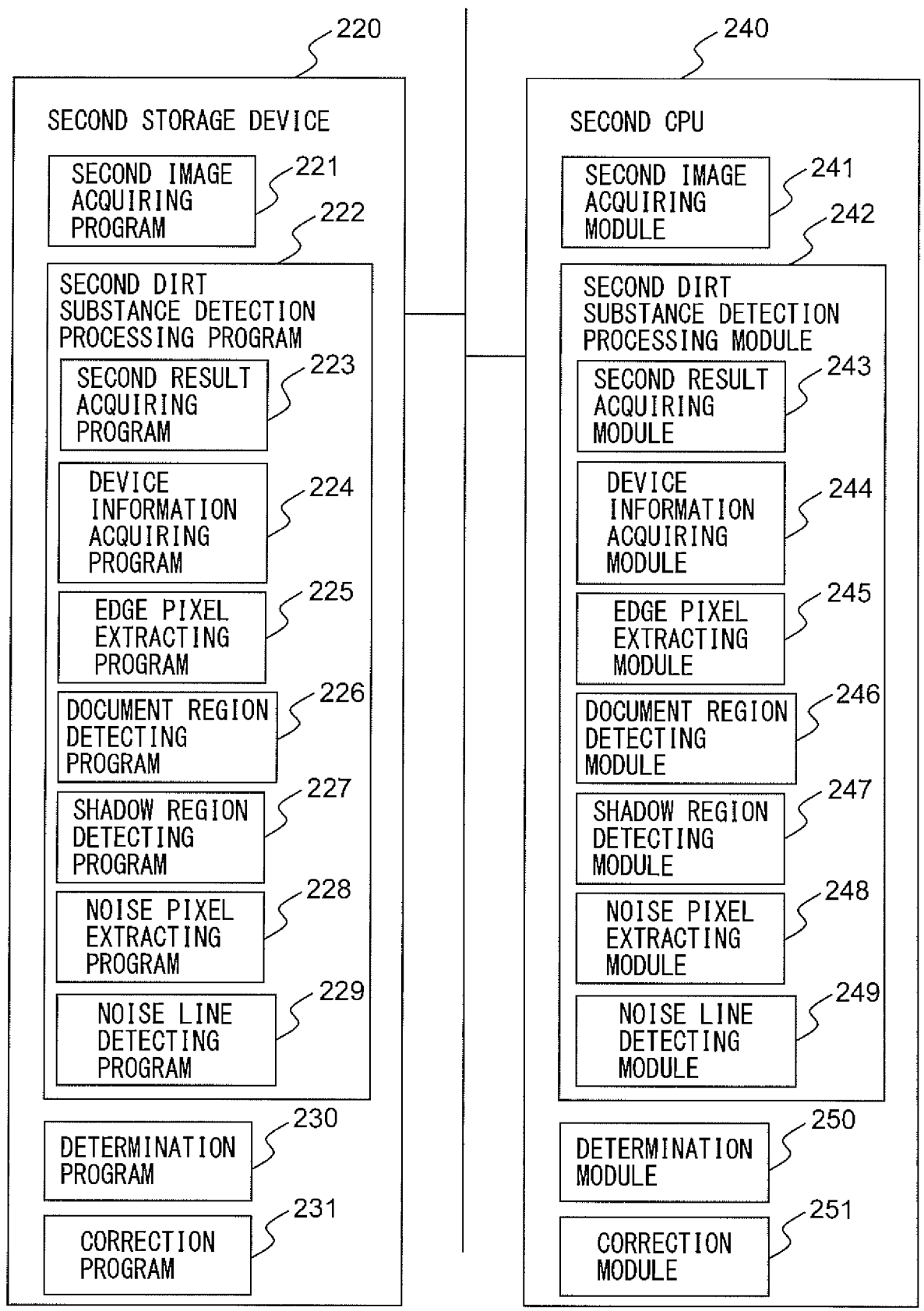
FIG. 10 is a view depicting schematic components of a second storage device and a second CPU.

FIG. 10 is a view depicting the schematic components of the second storage device 220 and second CPU 240 of the information processing apparatus 200.

As depicted in FIG. 10, the second storage device 220 stores programs, such as a second image acquiring program 221, a second dirt substance detection processing program 222, a determination program 230, a correction program 231, etc. The second dirt substance detection processing program 222 includes a second result acquiring program 223, a device information acquiring program 224, an edge pixel extracting program 225, a document region detecting program 226, a shadow region detecting program 227, a noise pixel extracting program 228, a noise line detecting program 229, etc. Each program is a functional module implemented by software that operates on the processor. The second CPU 240 reads each program stored in the second storage device 220 and operates according to the read program. As such, the second CPU 240 functions as a second image acquiring module 241, a second dirt substance detection processing module 242, a second result acquiring module 243, a device information acquiring module 244, an edge pixel extracting module 245, a document region detecting module 246, a shadow region detecting module 247, a noise pixel extracting module 248, a noise line detecting module 249, a determination module 250 and a correction module 251.

Figure 11:
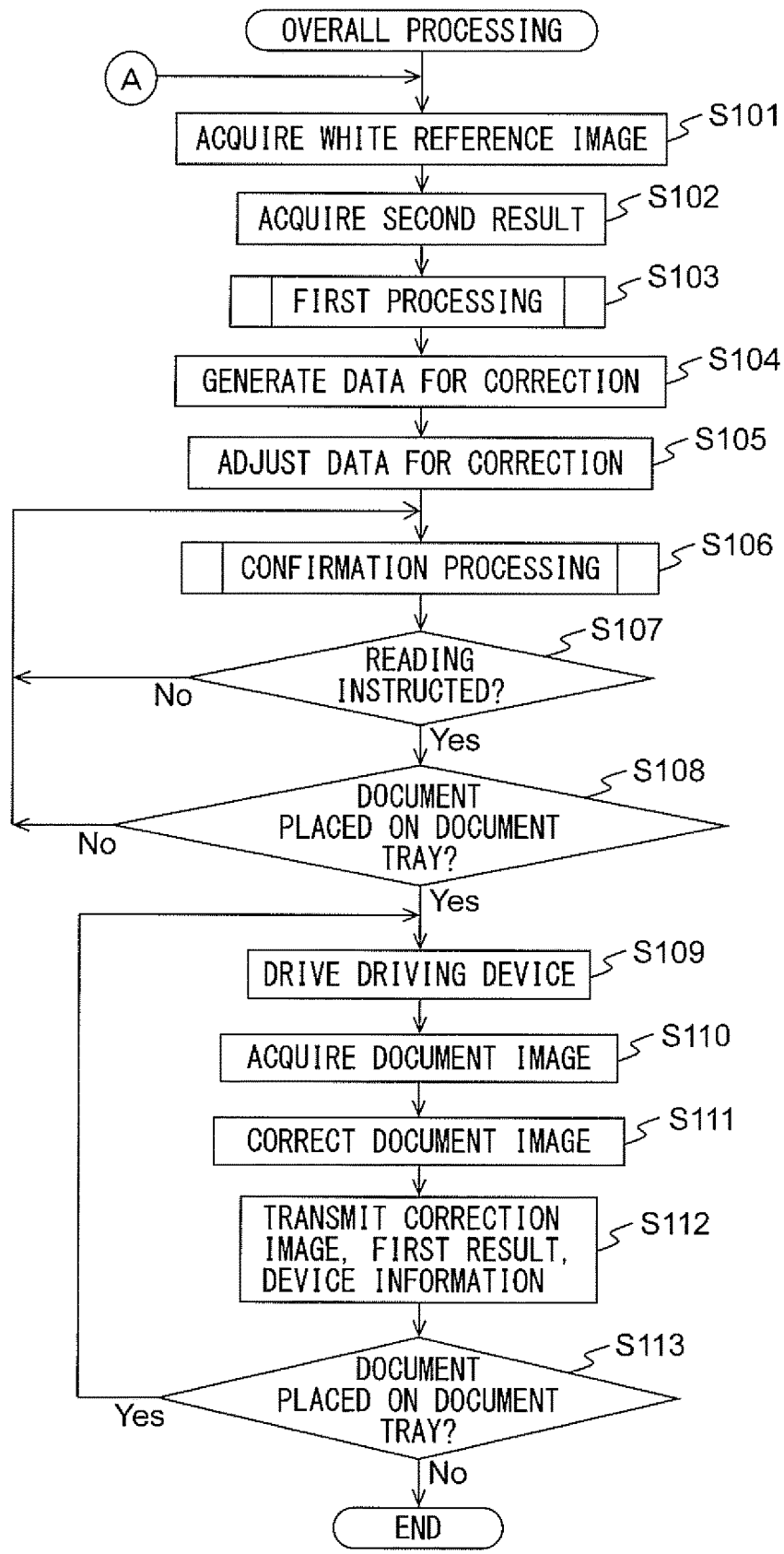
FIG. 11 is a flowchart depicting an example of the operation of the overall processing of the image reading apparatus.

FIG. 11 is a flowchart depicting an example of the operation of the overall processing of the image reading apparatus 100. The following will describe an example of the operation of the overall processing of the image reading apparatus 100 with reference to the flowchart depicted in FIG. 11. Note that the operation flow as will be described below is performed primarily by the first CPU 160 jointly with each component of the image reading apparatus 100 according to programs prestored in the first storage device 140. This operation flow is performed immediately after start-up of the device or after document reading processing.

First, the first image acquiring module 161 causes each imaging sensor 125 to capture an image of each white reference member 126 to generate a white reference image and acquires the generated white reference image (step S101). The white reference image is an image where the number of pixels in a vertical direction (a document conveyance direction A3) is one and a plurality of pixels are arranged in a horizontal direction (a direction A4 perpendicular to the document conveyance direction A3). Hereinafter, the white reference image captured the second white reference member 126b by the first imaging sensor 125a may be referred to as the first white reference image, and the white reference image captured the first white reference member 126a by the second imaging sensor 125b may be referred to as the second white reference image.

Next, the first result acquiring module 163 of the first dirt substance detection processing module 162 acquires a second result from the information processing apparatus 200 via the first interface device 135 (step S102). The second dirt substance detection processing module 242 of the information processing apparatus 200 executes second processing for detecting a dirt substance from the correction image. In particular, in the second processing, the second dirt substance detection processing module 242 detects a dirt substance causing noise line from the correction image. The second result is a dirt substance detection result of the second processing by the second dirt substance detection processing module 242 and is a noise line detection result from the correction image. The second result includes information, such as, whether or not a dirt substance is detected from the correction image, the position of the detected dirt substance in the correction image, and whether or not the detected dirt substance has been confirmed by a user. Note that, when the second dirt substance detection processing module 242 has not performed the second processing, the first dirt substance detection processing module 162 does not acquire the second result.

Next, the first dirt substance detection processing module 162 executes the first processing (step S103). The first dirt substance detection processing module 162 detects a dirt substance from the white reference image in the first processing. In particular, the first dirt substance detection processing module 162 detects a dirt substance that causes dirt at an imaging position from the white reference image in the first processing. Further, when the first dirt substance detection processing module 162 has detected a dirt substance from the white reference image in the first processing, the first dirt substance detection processing module 162 determines whether the detected dirt substance is on the transparent member on the side of the imaging sensor which captured the white reference image or on the transparent member on the side of the white reference member which was captured in the white reference image. The details of the first processing will be described later.

Next, the correction data generation module 169 generates data for shading correction based on the white reference image (step S104). The correction data generation module 169 uses, for example, as the data for shading correction, an image that has a gradient value of each pixel obtained by adding a predetermined offset value to or subtracting a predetermined offset value from the gradient value of a corresponding pixel in the white reference image. The gradient value is, for example, a luminance value. Note that the gradient value may instead be a color value (R value, G value, B value) etc. Note that the correction data generation module 169 may use the white reference image as is as data for shading correction. Hereinafter, the data for shading correction generated from the first white reference image may be referred to as the first data for shading correction and the data for shading correction generated from the second white reference image may be referred to as the second data for shading correction.

Next, when, in the first processing, the correction data generation module 169 determines that a dirt substance detected from a white reference image is on the transparent member on the side of the white reference member which was captured in the white reference image, the correction data generation module 169 adjusts the data for shading correction generated from the white reference image (step S105). The correction data generation module 169, for example, adjusts the data for shading correction by replacing a gradient value of each pixel included in a dirt substance region corresponding to a dirt substance in the data for shading correction with an average value of the gradient values of pixels included in a region of a predetermined width adjacent to the dirt substance region. Whereas, when a dirt substance is not detected from the white reference image in the first processing, or when a dirt substance is determined to be on the transparent member on the side of the imaging sensor which captured the white reference image, the correction data generation module 169 does not adjust the data for shading correction generated from the white reference image.

When a position of a dirt substance is on the transparent member on the side of the white reference member, the dirt substance is captured in the white reference image captured the white reference member, but the dirt substance is not captured in the document region of a document image, as there is a document between the imaging sensor and the dirt substance when the document image is captured. Thus, the document image can be appropriately corrected through shading correction by removing elements corresponding to a dirt substance from the data for shading correction generated based on the white reference image captured the dirt substance.

Whereas, when the position of a dirt substance is on the transparent member on the side of the imaging sensor, the dirt substance is captured at the corresponding position in both white reference image captured by the imaging sensor and document image subsequently captured by the imaging sensor. Thus, by performing shading correction using data for shading correction generated based on the white reference image captured the dirt substance as it is, the dirt substance captured in the document image can be removed and occurrence of noise line caused by the dirt substance in the correction image can be prevented.

Next, the first dirt substance detection processing module 162 executes confirmation processing (step S106). In the confirmation processing, the first dirt substance detection processing module 162 determines whether a confirmation operation by a user has been received. The details of the confirmation processing will be described later.

Next, the first image acquiring module 161 determines whether a user has instructed reading of a document using the display operation device 106 and a reading instruction signal that instructs reading of a document has been received via the display operation device 106 (step S107). When a reading instruction signal has not been received yet, the first dirt substance detection processing module 162 returns the processing to step S106 and re-executes the confirmation processing.

Whereas, when a reading instruction signal has been received, the first image acquiring module 161 determines whether a document is placed on the document tray 103 based on a signal received from the first sensor 111 (step S108). When a document is not placed on the document tray 103, the first dirt substance detection processing module 162 returns the processing to step S106 and re-executes the confirmation processing.

Whereas, when a document is placed on the document tray 103, the first image acquiring module 161 drives the driving device 134 to rotate the feed roller 112, retard roller 113, first conveyance roller 115 and second conveyance roller 120 to convey the document (step S109).

Next, the first image acquiring module 161 causes the imaging sensor 125 to capture an image of the document to generate a document image, acquires the generated document image, and increments the scan count stored in the first storage device 140 (step S110). When the image reading apparatus 100 detects dirt, the image reading apparatus 100 generates and provides a warning to a user. However, the image reading apparatus 100 captures the document even if a user has not completed the confirmation. In this way, the image reading apparatus 100 can continue capturing an image of a document when a user does not care about the dirt, thereby improving user convenience. Hereinafter, the document image captured by the first imaging sensor 125a may be referred to as the first document image and the document image captured by the second imaging sensor 125b may be referred to as the second document image.

Next, the correction image generation module 170 performs shading correction on the document image using the data for shading correction based on the white reference image to generate a correction image (step S111). The correction image is an example of an input image. The correction image generation module 170 performs shading correction on the first document image using the first data for shading correction and performs shading correction on the second document image using the second data for shading correction. Hereinafter, the correction image obtained by correcting the first document image may be referred to as the first correction image and the correction image obtained by correcting the second document image may be referred to as the second correction image.

Next, the correction image generation module 170 transmits the correction image, first result, and device information to the information processing apparatus 200 via the first interface device 135 (step S112). The first result is a dirt substance detection result of the first processing by the first dirt substance detection processing module 162 and is a dirt detection result at the imaging position in the white reference image. The first result includes information, such as, whether or not a dirt substance is detected from the white reference image, the position of the detected dirt substance in the white reference image, and whether or not the detected dirt substance has been confirmed by a user.

The device information indicates the arrangement of the imaging sensor 125 and the light source 124 in the image reading apparatus 100 that generates a correction image. For example, the device information indicates that, with regard to a first correction image, the first light source 124a is provided on the upstream side of the first imaging sensor 125a in the document conveyance direction A3 and, with regard to a second correction image, the second light source 124b is provided on the downstream side of the second imaging sensor 125b in the document conveyance direction A3. Note that the correction image generation module 170 may transmit the first result, only when new first result was acquired, and may omit transmission of the first result that has already been transmitted. Further, when the device information has already been transmitted, the correction image generation module 170 may also omit transmission of the device information.

Next, the first CPU 160 determines whether there is any document remaining on the document tray 103 based on the signals received from the first sensor 111 (step S113).

When there is a document remaining on the document tray 103, the first CPU 160 returns the processing to step S109 and repeats the processing of steps S109 to S113. Whereas, when no document is remaining on the document tray 103, the first CPU 160 ends the set of processing.

Figure 12:
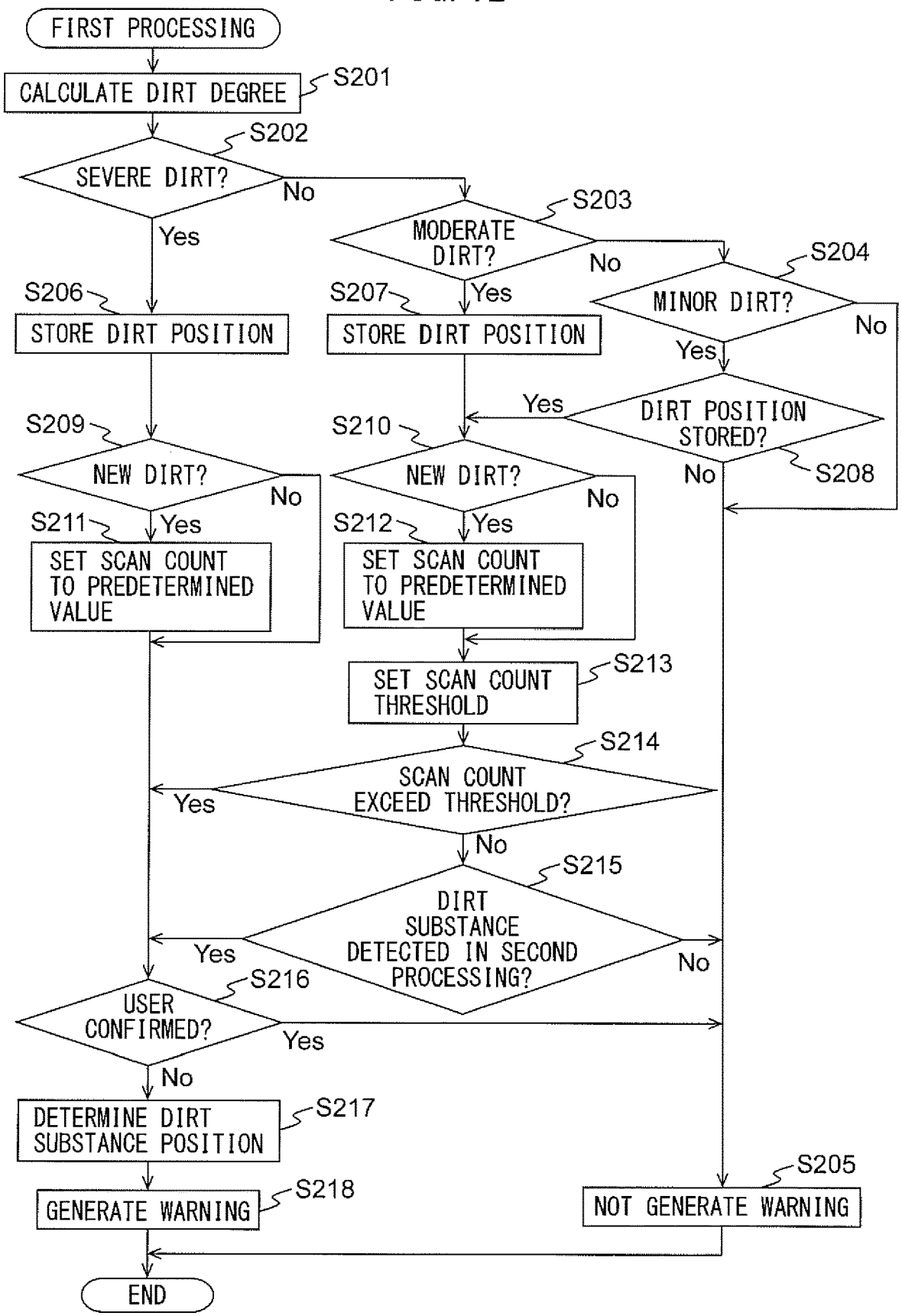
FIG. 12 is a flowchart depicting an example of the operation of first processing.

FIG. 12 is a flowchart depicting an example of the operation of the first processing. The first processing depicted in FIG. 12 is carried out at step S103 of the flowchart depicted in FIG. 11.

First, the dirt degree calculation module 164 calculates a dirt degree at the imaging position for each pixel included in a white reference image (step S201). The dirt degree is the degree of dirt caused by a dirt substance, such as paper dust, on the first transparent member 127a and the second transparent member 127b at the imaging position of the imaging sensor 125. The dirt degree calculation module 164 calculates a dirt degree by comparing the gradient value of each pixel with the gradient values of peripheral pixels of the pixel of interest. The peripheral pixels may be, for example, pixels located within a predetermined range (for example, 3 pixels) from the pixel of interest. The dirt degree calculation module 164 calculates, for example, the absolute value of a difference between the gradient value of the pixel of interest and the average value of the gradient values of the peripheral pixels as a dirt degree of the pixel of interest. Note that the dirt degree calculation module 164 may calculate the absolute value of a difference between the gradient value of the pixel of interest and the weighted average value of the gradient values of the peripheral pixels that are weighted such that the weight becomes larger as closer to the pixel of interest, as a dirt degree of the pixel of interest.

Figure 13:
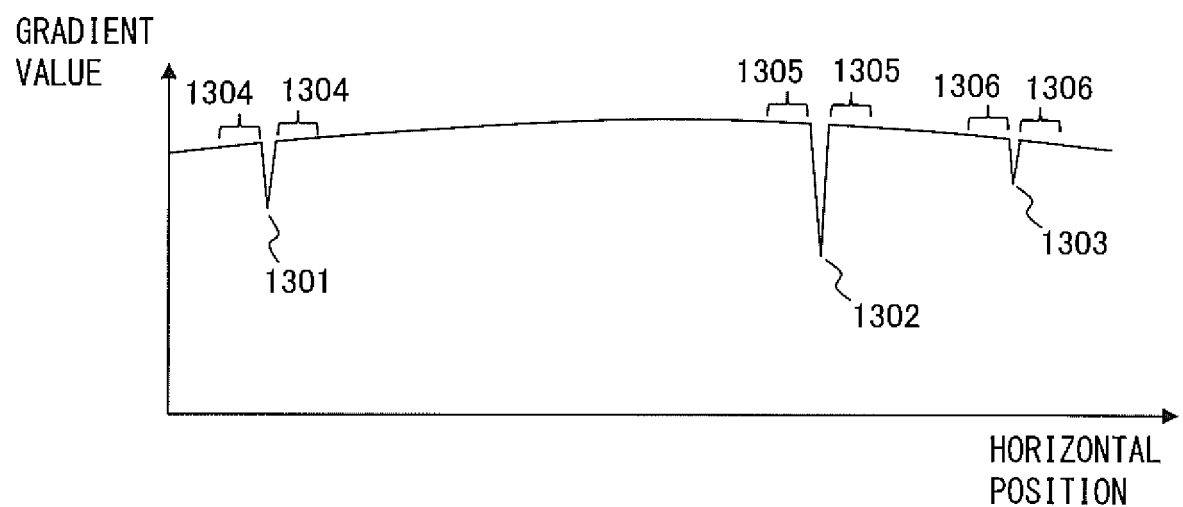
FIG. 13 is a schematic view depicting an example of a white reference image.

FIG. 13 is a schematic view depicting an example of a white reference image.

The horizontal axis in FIG. 13 indicates the position of each pixel in a horizontal direction in the white reference image and the vertical axis indicates the gradient value of each pixel. The surface of the white reference member 126 facing the imaging sensor 125 is white, and, as depicted in FIG. 13, the gradient values of pixels at horizontal positions in the white reference image are substantially constant. However, when a dirt substance adheres to the transparent member 127, pixels 1301-1303 corresponding to the dirt substance become dark, and the gradient values of the pixels 1301-1303 become lower compared with the gradient values of the peripheral pixels 1304-1306. As such, the dirt degree calculation module 164 can accurately detect a dirt substance on the transparent member 127 by comparing the gradient value of each pixel with the gradient values of the peripheral pixels of the pixel of interest.

Alternatively, the dirt degree calculation module 164 may calculate a dirt degree by comparing the gradient value of each pixel with a reference value. In such a case, the dirt degree calculation module 164 calculates the absolute value of a difference between the gradient value of the pixel of interest and a preset reference value (for example, 255) as a dirt degree of the pixel of interest.

Next, the notifying module 165 determines whether severe dirt exists at the imaging position (step S202). When the dirt degree of any pixel calculated with regard to the white reference image is equal to or more of a first threshold, the notifying module 165 determines that there is severe dirt at the imaging position on the transparent member 127 corresponding to the pixel. Whereas, when the dirt degree of every pixel is less than a first threshold, the notifying module 165 determines that there is no severe dirt at the imaging position on the transparent member 127.

When the notifying module determines that there is no severe dirt at the imaging position, the notifying module 165 determines whether there is moderate dirt at the imaging position (step S203). When the dirt degree of any pixel calculated with regard to the white reference image is less than the first threshold and equal to or more than a third threshold, the notifying module 165 determines that there is moderate dirt at the imaging position on the transparent member 127 corresponding to the pixel. Whereas, when the dirt degree of every pixel is less than the third threshold, the notifying module 165 determines that there is no moderate dirt at the imaging position on the transparent member 127. The third threshold is set smaller than the first threshold and larger than the second threshold as will be described later.

When the notifying module determines that there is no moderate dirt at the imaging position, the notifying module 165 determines whether there is minor dirt at the imaging position (step S204). When the dirt degree of any pixel calculated with regard to the white reference image is less than the third threshold and equal to or more than a second threshold, the notifying module 165 determines that there is minor dirt at the imaging position on the transparent member 127 corresponding to the pixel. Whereas, when the dirt degree of every pixel is less than a second threshold, the notifying module 165 determines that there is no minor dirt at the imaging position on the transparent member 127. The second threshold is set at a smaller value than the first threshold and the third threshold.

When the notifying module 165 determines that there is no minor dirt at the imaging position, the notifying module 165 ends the set of steps without generating and providing the warning to a user (step S205).

Whereas, when the notifying module 165 determines that there is severe or moderate dirt at the imaging position, the notifying module 165 stores the position of a pixel corresponding to the dirt as a dirt position in the first storage device 140 (steps S206, S207). In other words, when the notifying module 165 detects a dirt substance causing severe or moderate dirt, the notifying module 165 stores the position where the dirt substance is detected in the white reference image as a dirt position in the first storage device 140. The notifying module 165 stores the position of a pixel of which calculated dirt degree is equal to or more than the third threshold as a dirt position.

Whereas, when the notifying module 165 determines that there is no severe or moderate dirt but there is minor dirt at the imaging position, the notifying module 165 determines whether the position of a pixel corresponding to the minor dirt is stored in the first storage device 140 as a dirt position (step S208).

When the position of the pixel corresponding to the minor dirt is not stored as a dirt position, i.e., the dirt has not previously been detected as moderate dirt or severe dirt, the notifying module 165 does not generate and provide the warning to a user (step S205) and ends the set of steps. Whereas, when the position of the pixel corresponding to the minor dirt is stored as a dirt position, i.e., the dirt has previously been detected as moderate dirt or severe dirt, the notifying module 165 transfers the processing to step S210 in order to processes for the minor dirt in the same way as moderate dirt.

Next, the notifying module 165 determines whether the dirt is newly generated dirt (steps S209, S210). The notifying module 165 determines that the dirt is newly generated dirt when the position of a specific pixel corresponding to the dirt is not stored in the first storage device 140 as a dirt position, or determines that the dirt is the existing dirt when the position is stored. Note that the notifying module 165 may keep counting the number of detected dirt specks, and, when the number of detected dirt specks that is detected this time is larger than that of previous time, the notifying module 165 may determine that the dirt is newly generated dirt.

When the dirt is newly generated dirt, the notifying module 165 sets the scan count stored in the first storage device 140 to a predetermined value (steps S211, S212). The notifying module 165 sets a value that is equal to or more than a scan count threshold as a predetermined value. The scan count threshold is a threshold to be compared with the scan count when there is moderate dirt at the imaging position, and the notifying module 165 generates and provides the warning to a user only when the scan count exceeds the scan count threshold. By setting the scan count to a value that is equal to or more than the scan count threshold, the image reading apparatus 100 can immediately generate and provide the warning again when the dirt is detected again without having been confirmed by a user.

When there is moderate dirt at the imaging position (or there is minor dirt that has been previously detected as moderate or severe dirt), the notifying module 165 sets a scan count threshold (step S213). The notifying module 165, for example, changes the scan count threshold according to the number of detected moderate or minor dirt specks, i.e., the number of pixels of which dirt degree is less than the first threshold and equal to or more than the second threshold. The notifying module 165 changes the scan count threshold so that the scan count threshold becomes smaller as the number of pixels of which dirt degree is less than the first threshold and equal to or more than the second threshold is larger. For example, when the number of pixels of which dirt degree is less than the first threshold and equal to or more than the second threshold is larger than a first predetermined value, the notifying module 165 sets the scan count threshold at an average value of scan counts per day. Whereas, when the number of pixels of which dirt degree is less than the first threshold and equal to or more than the second threshold is smaller than a second predetermined value that is smaller than the first predetermined value, the notifying module 165 sets the scan count threshold at an average value of scan counts per week. As the average value of scan counts, the average value with regard to this image reading apparatus 100 may be used or the average value of scan counts by general users that are acquired from a plurality of image reading apparatuses may be used.

In this way, the notifying module 165 can increase the frequency of generating and providing the warning to a user to prompt cleaning when the number of moderate dirt and minor dirt is large, or can decrease the frequency of generating and providing the warning to a user to suppress troubling a user when the number of moderate and minor dirt is small.

Note that the notifying module 165 may change the scan count threshold according to the number of pixels of which dirt degree is equal to or more than the second threshold, the number of pixels of which dirt degree is equal to or more than the third threshold, or the number of pixels of which dirt degree is less than the first threshold and equal to or more than the second threshold. In such a case, the notifying module 165 changes the scan count threshold so that the scan count threshold becomes smaller as the number of such pixels is larger. Alternatively, the notifying module 165 may omit the processing of step S213 and use a fixed value that was set as the scan count threshold in advance.

Next, the notifying module 165 determines whether the scan count exceeds the scan count threshold (step S214). When the scan count exceeds the scan count threshold, the notifying module 165 transfers the processing to step S216 in order to process for the moderate dirt (or minor dirt that has been previously detected as moderate or severe dirt) in the same way as severe dirt.

Whereas, when the scan count is equal to or less than the scan count threshold, the notifying module 165 determines whether a dirt substance has been detected at a position corresponding to the dirt position in the second processing based on the second result (step S215).

When no dirt substance has been detected at a position corresponding to the dirt position in the second processing, the notifying module 165 ends the set of steps without notifying a warning to a user (step S205). Whereas, when a dirt substance has been detected at a position corresponding to the dirt position in the second processing, the dirt is likely to cause noise line in the correction image. In such a case, the notifying module 165 treats the moderate dirt (or minor dirt that has previously been detected as moderate or severe dirt) in the same way as severe dirt and transfers the processing to step S216. In this case, a warning is notified to a user in the processing described later. As such, the notifying module 165 changes timing of generating and providing the warning to a user based on the second result when the notifying module 165 has detected a dirt substance causing dirt. The notifying module 165 generates and provides the warning at an earlier stage when there is dirt causing noise line in the correction image, yet, does not generate and provide the warning so as not to trouble a user when the dirt does not affect the correction image.

Note that the notifying module 165 may omit the processing of step S215 and may not generate and provide the warning to a user when the scan count is equal to or less than the scan count threshold, regardless of the second result by the second processing.

Next, the notifying module 165 determines whether a user has already confirmed the dirt (step S216). When the display operation device 106 has received a confirmation operation by a user after a warning on the dirt had previously been notified to a user, the notifying module 165 determines that the user has already confirmed the dirt. Further, the notifying module 165 may also determine that the user has already confirmed the dirt, when the second result indicates that a dirt substance has been detected and the position of the detected dirt substance in the correction image corresponds to the present dirt position, as well as, the detected dirt substance has already been confirmed by a user. Note that when a difference between the horizontal position where a dirt substance is detected in the correction image and the horizontal position where dirt is detected in the white reference image is within a predetermined range, the notifying module 165 recognizes that these positions correspond to each other.

When a user has already confirmed the dirt, the notifying module 165 ends the set of steps without generating and providing the warning to a user (step S205). As such, when a user has already confirmed a dirt substance in the information processing apparatus 200, the notifying module 165 does not generate and provide the warning.

Whereas, when a user has not confirmed the dirt, the notifying module 165 determines whether the dirt substance causing the dirt is present on the side of the imaging sensor or on the side of the white reference member using the second result (step S217). That is, the notifying module 165 determines whether the dirt substance is on the transparent member on the side of the imaging sensor which captured the white reference image or on the transparent member on the side of the white reference member which was captured in the white reference image. When a noise line has been detected at a position corresponding to the present dirt position within the document region in the correction image, the dirt is likely to exist on front side of the document as seen from the side of the imaging sensor, and, when a noise line has not been detected at the position, the dirt is likely to exist on back side of the document as seen from the side of the imaging sensor. Thus, when the second result indicates that a dirt substance causing a noise line has been detected in the document region of the correction image and the position where the dirt substance has been detected in the correction image and the present dirt position correspond to each other, the notifying module 165 determines that the dirt substance is on the side of the imaging sensor. Whereas, when the second result indicates that no dirt substance causing a noise line has been detected in the document region of the correction image or the position where a dirt substance has been detected in the correction image and the present dirt position do not correspond to each other, the notifying module 165 determines that the dirt substance is on the side of the white reference member.

The first dirt substance detection processing module 162, when it detects a dirt substance, can use the second result to accurately determine whether the position where the dirt substance exists is on the side of the white reference member or on the side of the imaging sensor.

Next, the notifying module 165 generates and provides the warning to a user and ends the set of steps (step S218). The notifying module 165 displays an image for providing a warning on the display operation device 106. Note that the notifying module 165 may provide a warning by turning on an LED (not shown) or outputting voice from a speaker (not shown) etc.

Figure 14A:
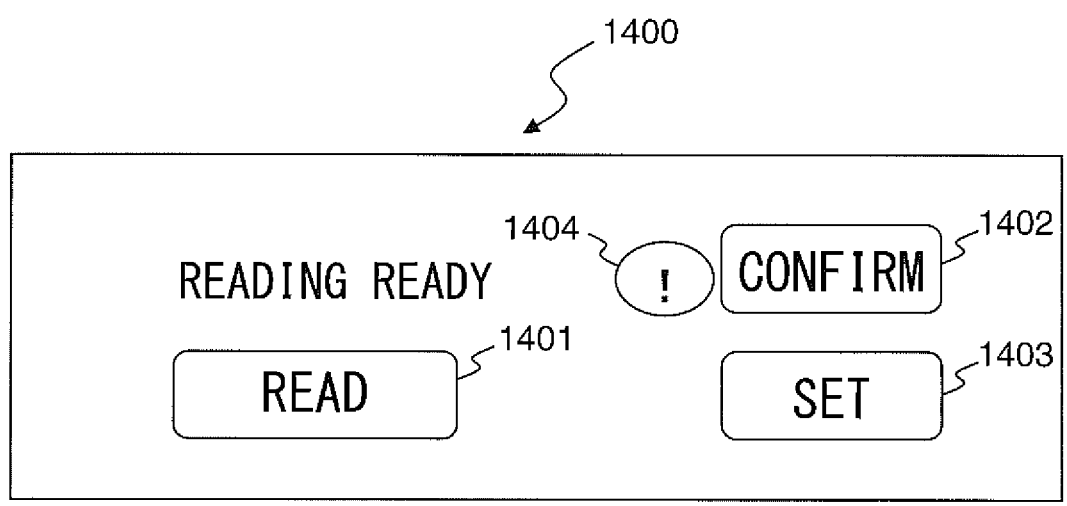
FIG. 14A is a schematic view depicting an example of a reception screen.

FIG. 14A is a schematic view depicting an example of the reception screen 1400 displayed on the display operation device 106.

The reception screen depicted in FIG. 14A displays a read button 1401, a confirm button 1402, a set button 1403, etc. The read button 1401 is a button for instructing reading of a document; when the read button 1401 is pressed, the display operation device 106 outputs a read instruction signal to the first CPU 160. The confirm button 1402 is a button for receiving a confirmation operation by a user and a request of displaying the status of dirt at the imaging position. When the confirm button 1402 is pressed, the display operation device 106 receives a confirmation operation by a user, transmits a confirmation accept signal that indicates that the confirmation operation has been received, to the notifying module 165, and displays a status display screen that displays the status of dirt at the imaging position. The set button 1403 is a button for instructing display of a setting screen (not shown) for performing a variety of settings on the image reading apparatus 100. Note that, when the notifying module 165 detects dirt, a warning image 1404 indicating the presence of dirt is displayed near the confirm button 1402. The warning image 1404 is an example of an image for providing the warning.

Figure 14B:
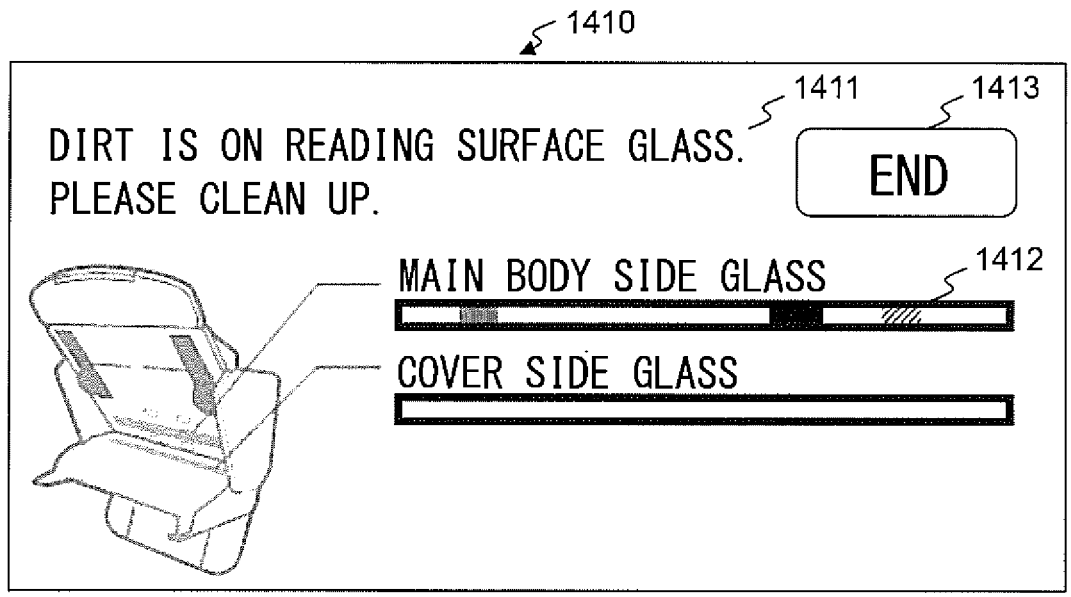
FIG. 14B is a schematic view depicting an example of a status display screen.
Figure 14C:
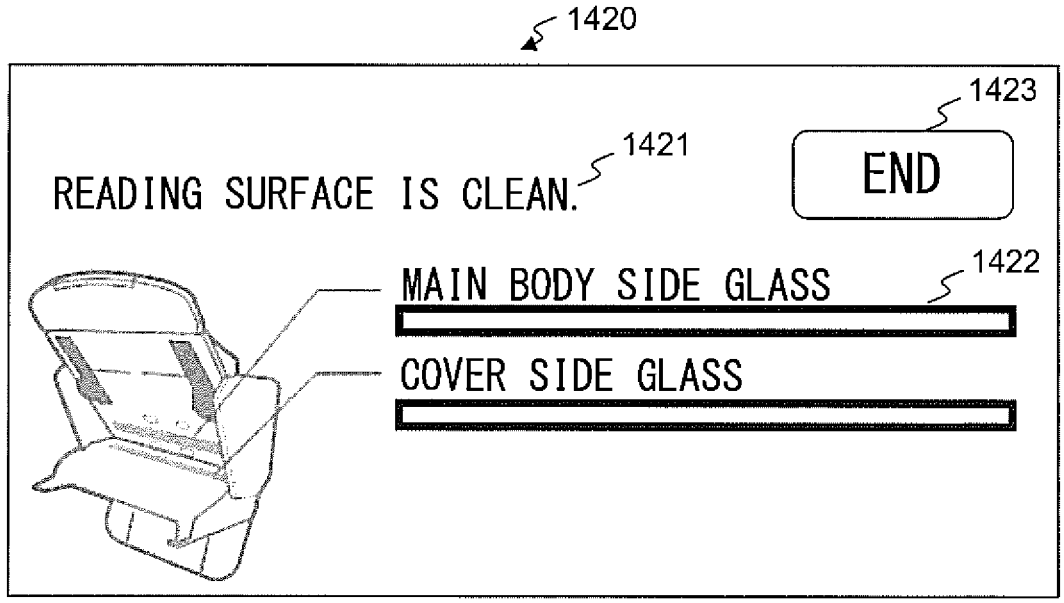
FIG. 14C is a schematic view depicting an example of a status display screen.

FIGS. 14B, 14C are schematic views depicting examples of status display screens displayed on the display operation device 106. FIG. 14B is an example of a status display image 1410 when a warning is notified to a user and also an example of an image for providing the warning. FIG. 14C is an example of a status display screen 1420 when a warning is not notified to a user.

As depicted in FIG. 14B, the status display screen 1410 displays a character 1411 that indicates the presence of dirt and prompts cleaning, an image 1412 that indicates the position of dirt, and an end button 1413.

The image 1412 indicates: whether the dirt is on the transparent member on the side of the imaging sensor that capture a white reference image or on the transparent member on the side of the white reference member that is captured in the white reference image; the dirt position on the transparent member; and if the dirt is severe, moderate, or minor. In the image 1412, when there is dirt on the transparent member, the position of dirt on the transparent member is indicated distinctly from positions without dirt. For example, to identify a dirt degree by the density of color, a position corresponding to severe dirt is displayed in black, a position corresponding to moderate dirt is displayed in gray, a position corresponding to minor dirt is displayed in lighter gray, and a position without dirt is displayed in white. Alternatively, to identify dirt degree by color, a position corresponding to severe dirt may be displayed in red, a position corresponding to moderate dirt may be displayed in yellow, a position corresponding to minor dirt may be displayed in blue, and a position without dirt may be displayed in white.

The notifying module 165 generates and provides, on the status display screen 1410, the warning, and a notification of the imaging positions of pixels corresponding to severe, moderate, or minor dirt, i.e., pixels of which dirt degree is equal to or more than the first, third, or second threshold, to a user. In this way, a user can accurately recognize the position of a dirt substance causing dirt and clean the position.

When the end button 1413 is pressed, the display operation device 106 displays the reception screen 1400 again.

Whereas, the status display screen 1420 depicted in FIG. 14C displays a character 1421 that indicates there is no dirt, an image 1422, and an end button 1423.

In this way, the notifying module 165 generates and provides the warning to a user according to the dirt degree at the imaging position in the white reference image. The notifying module 165 generates and provides the warning when there is severe dirt at the imaging position, or does not generate and provide the warning when there is no dirt at the imaging position. Whereas, when there is moderate dirt at the imaging position, the notifying module 165 generates and provides the warning only when the scan count exceeds the scan count threshold. Further, when there is minor dirt at the imaging position and the dirt has not been detected as moderate or severe dirt previously, the notifying module 165 does not generate and provide the warning regardless of whether the scan count exceeds the scan count threshold or not. Whereas, when there is minor dirt at the imaging position and the dirt has been detected as moderate or severe dirt previously, the notifying module 165 generates and provides the warning only when the scan count exceeds the scan count threshold as in a case where there is moderate dirt.

In this way, the notifying module 165 can generate and provide the warning at appropriate timing according to a dirt degree at the imaging position. In particular, when there is severe dirt, the notifying module 165 generates and provides the warning until a user confirms the dirt. Thus, the user can recognize the presence of dirt at the imaging position and clean it before scanning a document. This decreases situations where noise line is generated in the document image and re-scanning of the document is required, whereby the image reading apparatus 100 can improve user convenience. Whereas, when there is moderate dirt, the image reading apparatus 100 generates and provides a warning at a certain cycle, thereby preventing troubling a user, while making the user moderately recognize the presence of dirt.

The first dirt substance detection processing module 162 performs the first processing using a dirt substance detection result from the second dirt substance detection processing module 242. As such, the first dirt substance detection processing module 162 can better detect a dirt substance.

Note that, at step S216, when a user has already confirmed dirt, the notifying module 165 may not go without generating and providing the warning yet may change the timing of generating and providing the warning. In such a case, for example, the notifying module 165 generates and provides the warning at every predetermined count even when a user has already confirmed the dirt.

Alternatively, the first dirt substance detection processing module 162 may detect dirt based on other reference images than the white reference image in the first processing. In this case, the first image acquiring module 161 turns on the light source 124 and causes the imaging sensor 125 to capture an image of the white reference member 126 to generate a white reference image, as well as, turns off the light source 124 and causes the imaging sensor 125 to capture an image of the white reference member 126 to generate a black reference image. The first image acquiring module 161 generates a reference image having, as a pixel value of each pixel, a value obtained by subtracting the pixel value of a pixel in the black reference image from the pixel value of a corresponding pixel in the white reference image.

Figure 15:
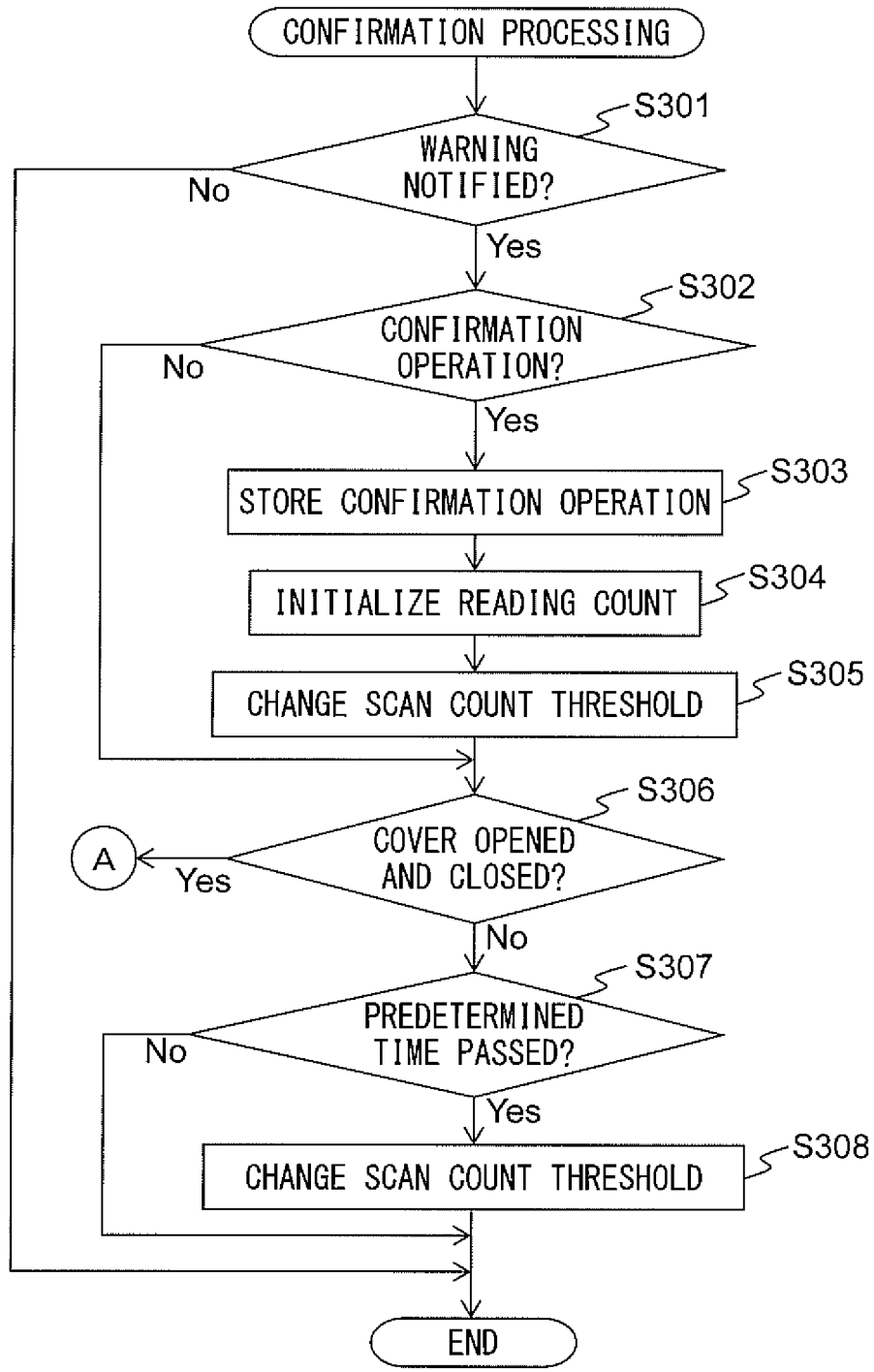
FIG. 15 is a flowchart depicting an example of the operation of confirmation processing.

FIG. 15 is a flowchart depicting an example of the operation of confirmation processing. The confirmation processing depicted in FIG. 15 is carried out at step S106 of the flowchart depicted in FIG. 11.

First, the notifying module 165 determines whether a warning has been notified to a user (step S301). When no warning has been notified, the notifying module 165 does not perform particular processing and ends the set of steps.

Whereas, when the warning has been generated and provided, i.e., after generating and providing the warning, the notifying module 165 determines whether the display operation device 106 has received a confirmation operation by a user based on whether a confirmation acceptance signal has been received from the display operation device 106 (step S302).

When the display operation device 106 has received a confirmation operation by a user, the notifying module 165 stores the confirmation operation information that indicates that the confirmation operation has been received, in the first storage device 140, in association with the dirt position displayed on the image 1412 of the status display screen 1410 (step S303). Note that the notifying module 165 thereafter periodically monitors the confirmation operation information, and when dirt is not detected at a position associated with the confirmation operation information, the notifying module 165 deletes the confirmation operation information from the first storage device 140.

Next, the notifying module 165 initializes (resets) the scan count stored in the first storage device 140 to zero (step S304). In this way, as the scan count becomes equal to or less than the scan count threshold, the notifying module 165 does not generate and provide the warning to a user even when moderate dirt on which the warning has already been notified to a user is redetected. Thus, the notifying module 165 keeps generating and providing the warning to a user who has not confirmed the warning, and prevents repeating providing the same warning to a user who has confirmed the warning, thereby preventing troubling the user.

Next, the notifying module 165 changes the scan count threshold according to the confirmation time from providing the warning until the display operation device 106 receives a confirmation operation by a user (step S305). For example, the notifying module 165 changes the scan count threshold larger as the confirmation time is longer. In this way, when a user does not care about the dirt, the notifying module 165 can prevent troubling the user by reducing the frequency of providing the warning.

Next, the information acquiring module 168 determines whether or not the cover of the image reading apparatus 100 has been opened and closed based on an open/close signal, which indicates whether the upper housing 102 is open or closed with respect to the lower housing 101, output from the open/close sensor 114 (step S306). When the state of the upper housing 102 has changed from a closed state to an open state with respect to the lower housing 101, then, further changed to a closed state, the information acquiring module 168 determines that the cover of the image reading apparatus 100 has been opened and closed. In such a case, the information acquiring module 168 acquires open/close information that indicates that the cover of the image reading apparatus 100 has been opened and closed. Note that the open/close sensor 114 may determine whether or not the cover of the image reading apparatus 100 has been opened and closed and the information acquiring module 168 may acquire the open/close information from the open/close sensor 114.

When the information acquiring module 168 has acquired the open/close information, the first CPU 160 re-executes the overall processing depicted in FIG. 11 from step S101. In such a case, the first image acquiring module 161 acquires newly captured a white reference image, the dirt degree calculation module 164 newly calculates a dirt degree based on the newly captured white reference image, and the notifying module 165 generates and provides the warning to a user according to the newly calculated dirt degree. As such, as the notifying module 165 automatically determines whether there is remaining dirt after the image position was cleaned and generates and provides the warning to a user if there is remaining dirt, the user can immediately recognize that there is remaining dirt.

Whereas, when the information acquiring module 168 has not acquired open/close information, the notifying module 165 determines whether a certain time period (for example, one minute) has passed after providing the warning (step S307). When a certain time period has not passed after providing the warning, the notifying module 165 does not perform particular processing and ends the set of steps.

When a certain time period has passed after providing the warning, i.e., when the information acquiring module 168 has not acquired open/close information within the certain time period after providing the warning, the notifying module 165 changes the scan count threshold (step S308) and ends the set of steps. For example, the notifying module 165 increases the scan count threshold. Note that when the information acquiring module 168 has not acquired open/close information even though the display operation device 106 had received a confirmation operation by a user, the notifying module 165 may further increase the scan count threshold. Further, the notifying module 165 may change the scan count threshold so that the scan count threshold becomes larger as the time period from providing the warning to acquisition of open/close information is longer. In this way, when a user does not care about the dirt, the notifying module 165 can prevent troubling the user by reducing the frequency of providing the warning.

Note that, even when a warning has been notified to a user in the second processing instead of the first processing, the information acquiring module 168 may determine whether or not the cover of the image reading apparatus 100 has been opened and closed, and, when the cover has been opened and closed, the first CPU 160 may re-execute the overall processing as depicted in FIG. 11. In this way, even when a warning was notified to a user on the side of the information processing apparatus 200 and a user cleaned the dirt, the image reading apparatus 100 can automatically determine whether there is remaining dirt and, if there is remaining dirt, generate and provide the warning to a user.

Note that each processing of steps S304, S305, S306, S307 to S308 may be omitted.

Figure 16:
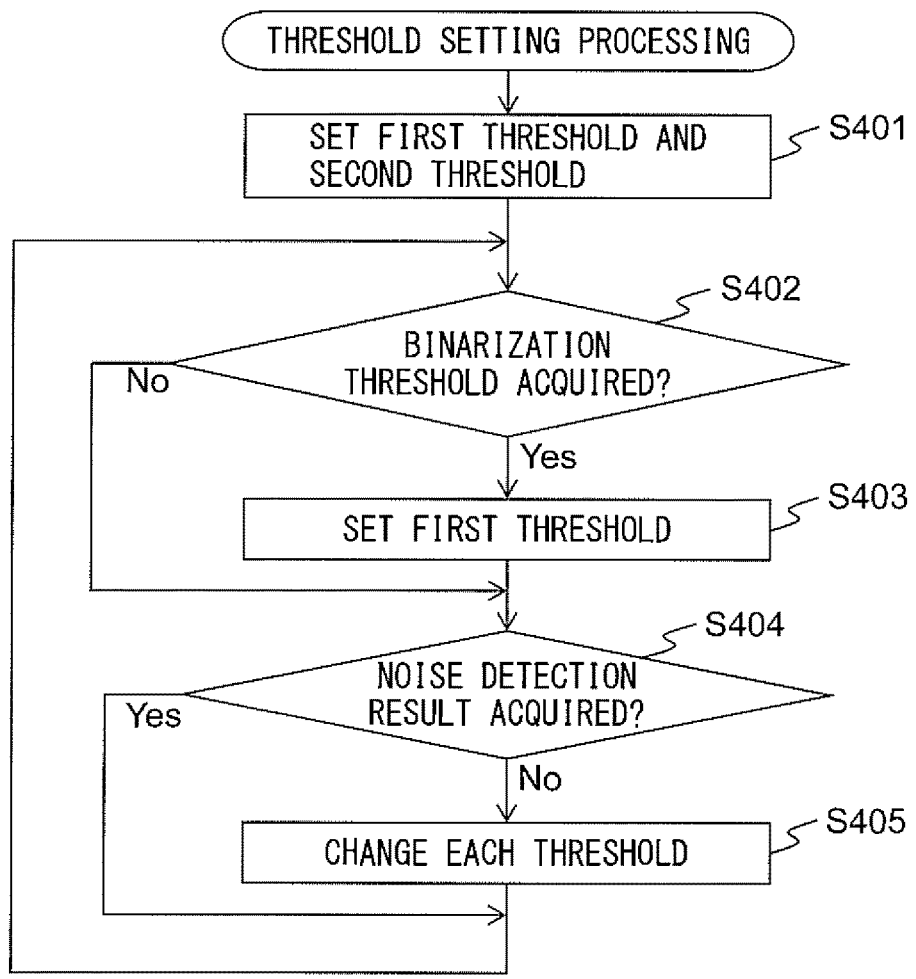
FIG. 16 is a flowchart depicting an example of the operation of threshold setting processing.

FIG. 16 is a flowchart depicting an example of the operation of threshold setting processing of the image reading apparatus 100. The following will describe an example of the operation of the threshold setting processing of the image reading apparatus 100 with reference to the flowchart depicted in FIG. 16. The operation flow as will be described below is performed primarily by the first CPU 160 jointly with each component of the image reading apparatus 100 according to a program prestored in the first storage device 140. This operation flow is performed immediately after start-up of the device.

First, the setting module 166 sets a first threshold, a second threshold, and a third threshold at predefined values (step S401). The setting module 166 sets the first threshold based on a binarization threshold for binarizing a correction image to detect characters from the correction image in the optical character recognition (OCR) processing performed by the information processing apparatus 200. The setting module 166, for example, sets the first threshold as a value obtained by subtracting the binarization threshold (or plus or minus a predetermined margin value) from the gradient value representing white (for example, 255). In this way, the image reading apparatus 100 can detect dirt that has density that can be recognized as a part of black characters in contrast to a white background in the character recognition processing as severe dirt and immediately a user of a warning.

Whereas, the setting module 166 sets the third threshold as a value that can distinguish visually recognizable dirt for human eyes from visually unrecognizable dirt in a multi-level image. In prior evaluation, the setting module 166 accepts, from an administrator, gradient values corresponding to visually recognizable dirt and gradient values corresponding to visually unrecognizable dirt in a white reference image (multi-level image) captured dirt of a variety of densities. The setting module 166 calculates an average value of gradient values corresponding to visually recognizable dirt and gradient values corresponding to visually unrecognizable dirt, and sets the third threshold as a value obtained by subtracting the average value (or plus or minus a predetermined margin value) from a gradient value representing white. In this way, the image reading apparatus 100 can detect visually recognizable dirt in a multi-level image as moderate dirt and generate and provide the warning at a certain cycle.

Further, the setting module 166 sets the second threshold as a value obtained by subtracting an allowable error value that is set in the image reading apparatus 100 with regard to the reading value of the imaging sensor 125 from the third threshold. In this way, the image reading apparatus 100 can prevent failing to detect visually recognizable dirt as moderate dirt due to the precision error of the image reading apparatus 100.

Next, the setting module 166 determines whether the threshold acquiring module 167 has newly acquired a binarization threshold from the information processing apparatus 200 via the first interface device 135 (step S402). When the threshold acquiring module 167 has newly acquired a binarization threshold, the setting module 166 resets the first threshold based on the newly acquired binarization threshold (step S403).

Next, the setting module 166 determines whether the first result acquiring module 163 has newly acquired a second result from the information processing apparatus 200 via the first interface device 135 (step S404). When the first result acquiring module 163 has newly acquired a second result, the setting module 166 changes the first threshold, the second threshold, or the third threshold based on the newly acquired second result (step S405), and returns the processing to step S402. The setting module 166 changes the first threshold, the second threshold or the third threshold to a smaller value than the present value, for example, when a dirt substance causing noise line is detected in the second processing, and changes the first threshold, the second threshold or the third threshold to a larger value than the present value, when a dirt substance is not detected in the second processing. In this way, the image reading apparatus 100 can more accurately generate and provide the warning when there is dirt that can cause noise line in the correction image.

Note that each processing of steps S402 to S403, S404 to S405 may be omitted.

Figure 17:
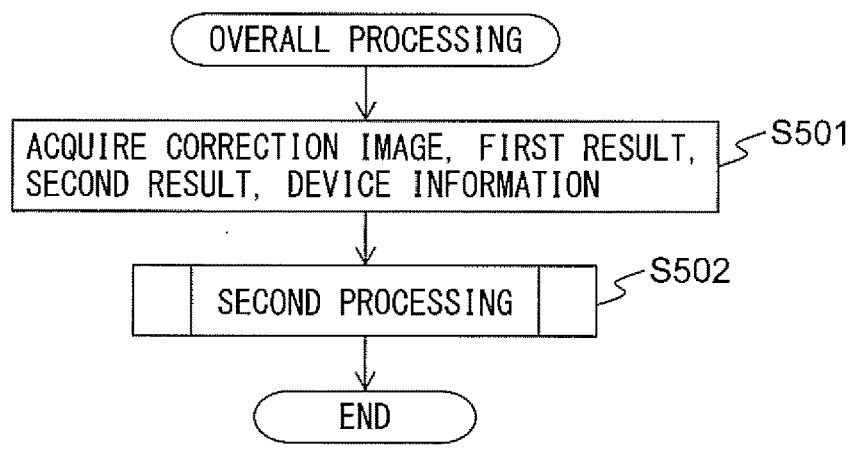
FIG. 17 is a flowchart depicting an example of the operation of the overall processing of an information processing apparatus.

FIG. 17 is a flowchart depicting an example of the operation of the overall processing of an information processing apparatus 200. The following will illustrate an example of the operation of the overall processing of the information processing apparatus 200 with reference to the flowchart depicted in FIG. 17. Note that the operation flow as will be described below is performed primarily by the second CPU 240 jointly with each component of the information processing apparatus 200 according to a program prestored in the second storage device 220. This operation flow is periodically performed.

First, the second image acquiring module 241 acquires a correction image from the image reading apparatus 100 via the second interface device 203. Further, the second result acquiring module 243 acquires a first result from the image reading apparatus 100 via the second interface device 203. The second result acquiring module 243 acquires a second result relating to the previously conveyed document from the noise line detecting module 249. The device information acquiring module 244 acquires device information from the image reading apparatus 100 via the second interface device 203 (step S501). Note that the second result acquiring module 243 may acquire the first result only when a new first result is transmitted from the image reading apparatus 100. Further, the device information acquiring module 244 may omit acquisition of the device information when the device information has already been acquired.

Next, the second dirt substance detection processing module 242 executes the second processing (step S502) and ends the set of steps. The second dirt substance detection processing module 242 detects a dirt substance from the correction image in the second processing. The details of the second processing will be described later.

Figure 18:
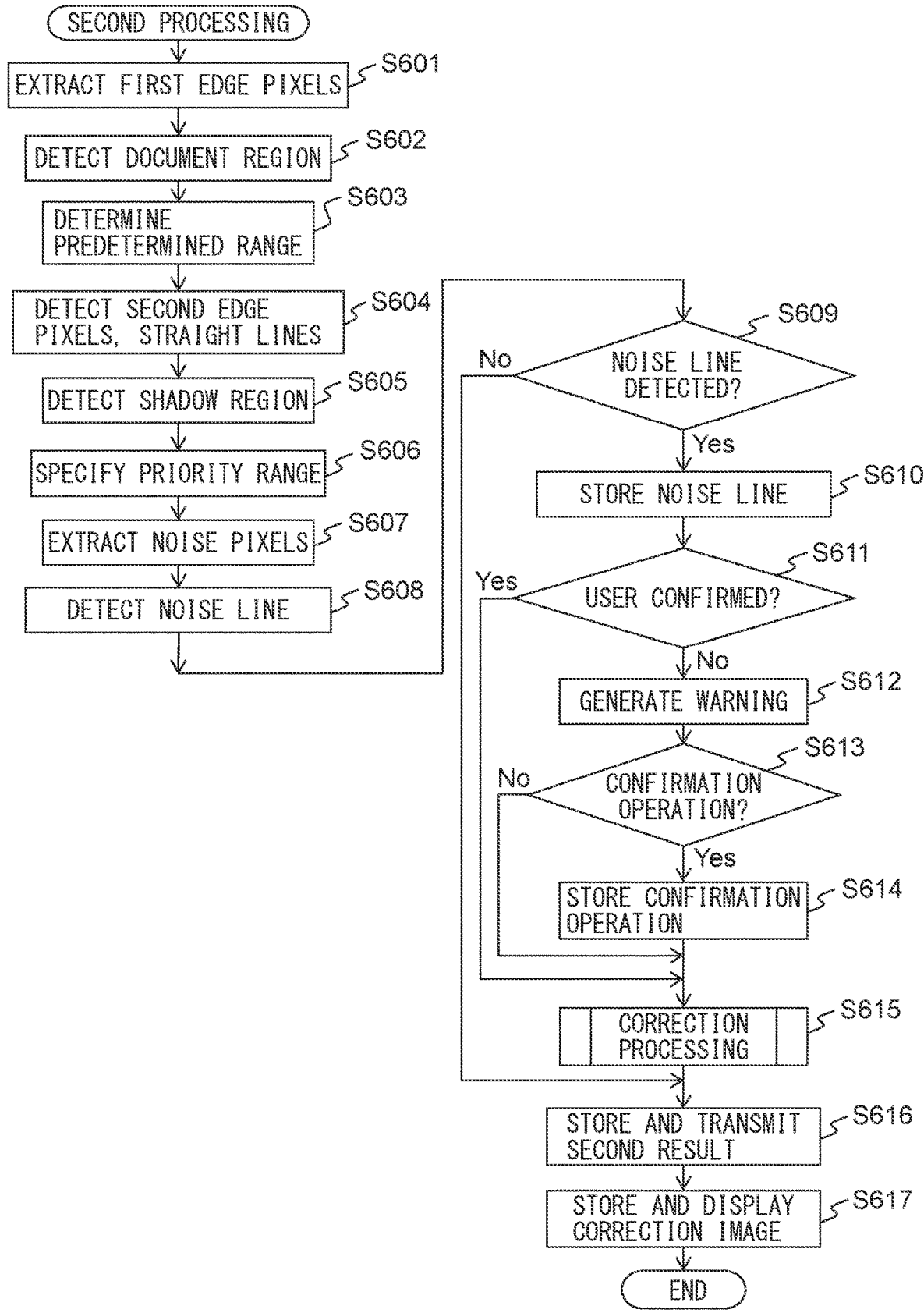
FIG. 18 is a flowchart depicting an example of the operation of second processing.

FIG. 18 is a flowchart depicting an example of the operation of the second processing. The second processing depicted in FIG. 18 is carried out at step S502 of the flowchart depicted in FIG. 17.

First, the edge pixel extracting module 245 extracts first edge pixels in horizontal and vertical directions from the correction image (step S601). The edge pixel extracting module 245 generates a first edge image constituted by the first edge pixels in horizontal and vertical directions of the correction image.

The edge pixel extracting module 245 calculates the absolute value of a difference of gradient values between both side pixels of a pixel of interest in a horizontal direction in the correction image or the absolute value of a difference of gradient values of pixels that are apart by a predetermined distance from the pixel of interest (hereinafter, referred to as a peripheral difference value) and, when the peripheral difference value exceeds a fourth threshold, the edge pixel extracting module 245 extracts the pixel of interest as a first vertical edge pixel. This peripheral difference value indicates the intensity of the edge in the edge pixels. The fourth threshold may be set, for example, at a difference of gradient values in an image that can be visually distinguished by human eyes (for example, 20). The edge pixel extracting module 245 performs the same processing in a vertical direction and extracts first horizontal edge pixels. Then, the edge pixel extracting module 245 generates a first horizontal edge image and a first vertical edge image for a horizontal direction and a vertical direction respectively.

Note that the edge pixel extracting module 245 may instead calculate, as a peripheral difference value, the absolute value of a difference between a gradient value of the pixel of interest in the correction image and the average value of gradient values of peripheral pixels located both sides of the pixel of interest or located within a predetermined range from the pixel of interest in a horizontal or vertical direction. Alternatively, the edge pixel extracting module 245 may extract the first edge pixel by comparing the gradient value of each pixel with a threshold. For example, when the gradient value of the pixel of interest is less than a threshold and the gradient values of pixels on both sides of the pixel of interest or pixels that are apart from the pixel of interest by a predetermined distance in a horizontal or vertical direction are equal to or more than the threshold, the edge pixel extracting module 245 determines the pixel of interest as the first edge pixel.

FIG. 19A is a schematic view depicting an example of a correction image 1900.

In the correction image 1900 depicted in FIG. 19A, a document 1901 and the periphery thereof, as well as, a shadow 1903 formed on the white reference member 126 by the leading end 1902 of the document 1901 are captured. In the correction image 1900, pixels corresponding to the ends 1904 to 1907 of the document 1901 are extracted as the first edge pixels.

Next, the document region detecting module 246 detects a document region based on the first edge pixels (step S602).

The document region detecting module 246 first extracts a plurality of straight lines from the first edge pixels extracted by the edge pixel extracting module 245. The document region detecting module 246 extracts straight lines from the first horizontal edge image and the first vertical edge image. The document region detecting module 246 extracts straight lines using Hough transform. Note that the document region detecting module 246 may extract straight lines using a least squares method. Alternatively, the document region detecting module 246 may group the first edge pixels adjacent to one another into one by labeling them and extract straight lines by connecting the first edge pixels at both ends in a horizontal or vertical direction from among the first edge pixels included in each group.

Next, the document region detecting module 246 detects a rectangle from the extracted plurality of straight lines. The document region detecting module 246 extracts a plurality of rectangle candidates, each constituted by four straight lines where each two of the extracted plurality of straight lines are substantially perpendicular to each other. The document region detecting module 246 first selects one straight line in a horizontal direction (hereinafter, referred to as the first horizontal line) and extracts another straight line in a horizontal direction that is substantially parallel (for example, ±3° or less) to the selected straight line and apart from the selected straight line by threshold Th1 or more (hereinafter, referred to as the second horizontal line). Next, the document region detecting module 246 extracts a straight line in a vertical direction substantially perpendicular to the first horizontal line (for example, ±3° or less with respect to 90°) (hereinafter, referred to as the first vertical line). Next, the document region detecting module 246 extracts a straight line in a vertical direction that is substantially perpendicular to the first horizontal line and apart from the first vertical line by a threshold Th2 or more (hereinafter, referred to as the second vertical line). Note that the thresholds Th1 and Th2 may be predefined according to the size of a document to be read by the image reading apparatus 100 and may be the same values.

The document region detecting module 246 extracts all combinations of a first horizontal line, a second horizontal line, a first vertical line, and a second vertical line that satisfy the above conditions from among all the extracted straight lines and extracts rectangles constituted by the extracted combinations as rectangle candidates. The document region detecting module 246 calculates the areas of the extracted rectangle candidates and eliminates the rectangle candidates of which area is less than a predetermined value. The document region detecting module 246 detects a rectangle candidate with the largest area from the remaining rectangle candidates as a document region. Whereas, when there is no remaining rectangle candidate, the document region detecting module 246 detects no document region.

In the correction image 1900 depicted in FIG. 19A, straight lines corresponding to the ends 1904 to 1907 of the document 1901 are extracted and the document region 1908 surrounded by the straight lines is extracted.

Next, the shadow region detecting module 247 determines a predetermined range for detecting a shadow region in a correction image based on the device information acquired by the device information acquiring module 244 (step S603). The shadow region is a region that captures a shadow formed on the white reference member 126 by the leading end or rear end of the document in the correction image and the predetermined range is determined by an adjacent region outside of the document region detected in the correction image. For example, when the device information indicates that the first light source 124a is provided on the upstream side of the first imaging sensor 125a in the document conveyance direction A3, as depicted in FIG. 7, a shadow is formed by the leading end of the document on the second white reference member 126b. In such a case, the shadow region detecting module 247 determines a range within a predetermined distance from the upper end of the document region corresponding to the leading end of the document (for example, a distance equivalent to 5 mm) as a predetermined range in a first correction image. Likewise, when the device information indicates that the second light source 124b is provided on the downstream side of the second imaging sensor 125b in the document conveyance direction A3, a shadow is formed by the rear end of the document on the first white reference member 126a. In such a case, the shadow region detecting module 247 determines a range within a predetermined distance from the lower end of the document region corresponding to the rear end of the document as a predetermined range in a second correction image.

In the correction image 1900 depicted in FIG. 19A, a range 1910 within a predetermined distance, in an outward direction of the document region 1908, from the upper end 1904 of the document region 1908 is determined as a predetermined range.

Next, the shadow region detecting module 247 extracts second edge pixels within the determined predetermined range and extracts a plurality of straight lines based on the extracted second edge pixels (step S604).

The shadow region detecting module 247 extracts the second edge pixels in the same way in which the edge pixel extracting module 245 extracts the first edge pixels. However, the shadow region detecting module 247 extracts a plurality of levels of second edge pixels with different degrees of peripheral difference values (edge intensities). The shadow region detecting module 247 first sets an initial value at a fifth threshold and extracts the second edge pixels of which peripheral difference value exceeds the fifth threshold. The initial value is set, for example, at the same or a smaller value than the fourth threshold. Next, the shadow region detecting module 247 extracts straight lines from the extracted second edge pixels in the same way in which the document region detecting module 246 extracts straight lines, and extracts line segments of a region corresponding to the extracted second edge pixels in a horizontal direction from among the extracted straight lines.

Next, the shadow region detecting module 247 changes the fifth threshold to a smaller value than the present value, extracts the second edge pixels of which peripheral difference value exceeds the changed fifth threshold from a range where line segments have not extracted in a horizontal direction, and extracts new line segments from among the extracted second edge pixels. The shadow region detecting module 247 extracts a plurality of levels of second edge pixels with different degrees of peripheral difference values while changing the fifth threshold to smaller values until line segments are extracted from the entire range in a horizontal direction and extracts a line segment from the second edge pixels at each level.

Figure 19B:
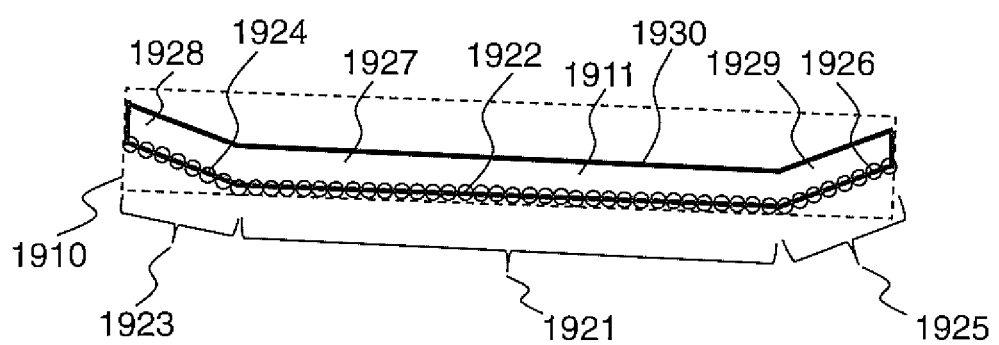
FIG. 19B is a schematic view for illustrating a plurality of line segments.

FIG. 19B is a schematic view for illustrating a plurality of line segments extracted based on the second edge pixels. FIG. 19B is an enlarged view of the predetermined range 1910 depicted in FIG. 19A.

As depicted in FIG. 19B, when an end of the document 1901 is curved, the shadow region 1911 does not become a rectangular region. In the example depicted in FIG. 19B, first, the second edge pixels 1921 of a first level are extracted and a line segment 1922 is extracted from the second edge pixels 1921. Next, the second edge pixels 1923 of a second level that is lower than the first level are extracted and a line segment 1924 is extracted from the second edge pixels 1923. Then, the second edge pixels 1925 of a third level that is lower than the second level are extracted and a line segment 1926 is extracted from the second edge pixels 1925.

Next, the shadow region detecting module 247 detects a region in a second predetermined range (for example, a distance equivalent to 1 min) from each of a plurality of extracted line segments as a shadow region (step S605). The shadow region detecting module 247 detects a shadow region obtained by connecting regions within the second predetermined range in a vertical direction from the line segments.

In the example depicted in FIG. 19B, a shadow region is detected as a region 1930 obtained by connecting a region 1927 within the second predetermined range from the line segment 1922, a region 1928 within the second predetermined range from the line segment 1924, and a region 1929 within the second predetermined range in a vertical direction from the line segment 1926. In this way, even when an end of the document 1901 is curved, the shadow region detecting module 247 can accurately detect a shadow region by detecting a shadow region using a plurality of line segments.

Next, the noise pixel extracting module 248 specifies a priority range for preferentially detecting a dirt substance in the shadow region using a position within a white reference image where a dirt substance is detected, i.e., a position of the dirt substance detected by the first dirt substance detection processing module 162 as indicated in the first result (step S606).

To reduce a load of noise pixel determination processing, the noise pixel extracting module 248 sets pixels apart from one another by a first distance in a horizontal direction as target pixels for determining whether the pixels are noise pixels or not, instead of determining whether they are noise pixels or not for all pixels in the shadow region. Whereas, the noise pixel extracting module 248 sets a range within a predetermined distance from a position corresponding to the position where a dirt substance is detected in the white reference image as a priority range in the shadow region. As for pixels in the priority range, the noise pixel extracting module 248 sets pixels adjacent to one another in a horizontal direction or pixels apart from one another by a second distance that is shorter than the first distance as target pixels.

Figure 20A:
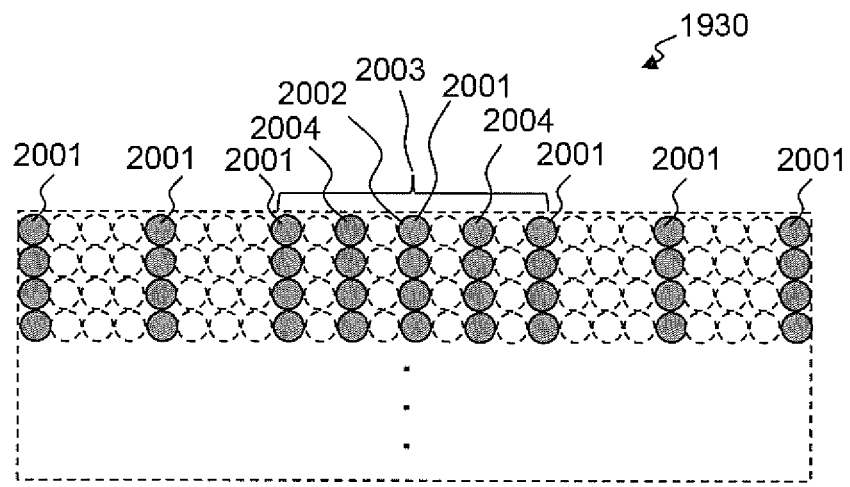
FIG. 20A is a schematic view for illustrating a priority range.

FIG. 20A is a schematic view for illustrating a priority range. FIG. 20A is an enlarged view of the shadow region 1930 depicted in FIG. 19B.

In the example depicted in FIG. 20A, pixels spaced apart from one another by a first distance (4 pixels) in a horizontal direction are set as target pixels 2001. Further, a dirt substance is detected at a position in a white reference image corresponding to a position 2002 in the shadow region 1930, and a range within a predetermined distance (4 pixels) from the position 2002 is set as a priority range 2003. In the priority range 2003, pixels spaced apart from one another by a second distance (2 pixels) are set as the target pixels 2004. In this way, the noise pixel extracting module 248 can efficiently extract noise pixels since the noise pixel extracting module 248 can selectively scan a region where a dirt substance is likely to exist while reducing the load of noise pixel determination processing.

Further, the noise pixel extracting module 248 specifies a priority range for preferentially detecting a dirt substance in a shadow region using a position within a correction image where a dirt substance has been previously detected, indicated by a previous second result by the second dirt substance detection processing module 242. The noise pixel extracting module 248 specifies the priority range in the same way as the case where a priority range is specified using a position of a dirt substance detected by the first dirt substance detection processing module 162.

Next, the noise pixel extracting module 248 extracts noise pixels in the shadow region based on the specified priority range (step S607). In this way, the noise pixel extracting module 248 specifies a priority range before executing the second processing. The noise pixel extracting module 248 extracts, as a noise pixel, a pixel where a difference between the gradient value of the shadow region and the gradient value of the noise pixel is equal to or more than a sixth threshold.

As depicted in FIG. 19A, the shadow region has gradation along a vertical direction; the shadow region is the darkest (lower luminance) around the upper end of the document and gradually becomes brighter (higher luminance) as it goes upward. The noise pixel extracting module 248 calculates an average value of the gradient values of pixels for each horizontal line in the shadow region, and extracts, as a noise pixel, a pixel where the absolute value of a difference between the gradient value of the pixel of interest and the average value calculated for a horizontal line to which the pixel of interest belongs is equal to or more than the sixth threshold. As described above, as the shadow formed on the white reference member 126 is gray that is an intermediate color between white and black, not only a black dirt substance but also a white dirt substance is extracted as noise pixels from the shadow region in the white reference image.

Figure 20B:
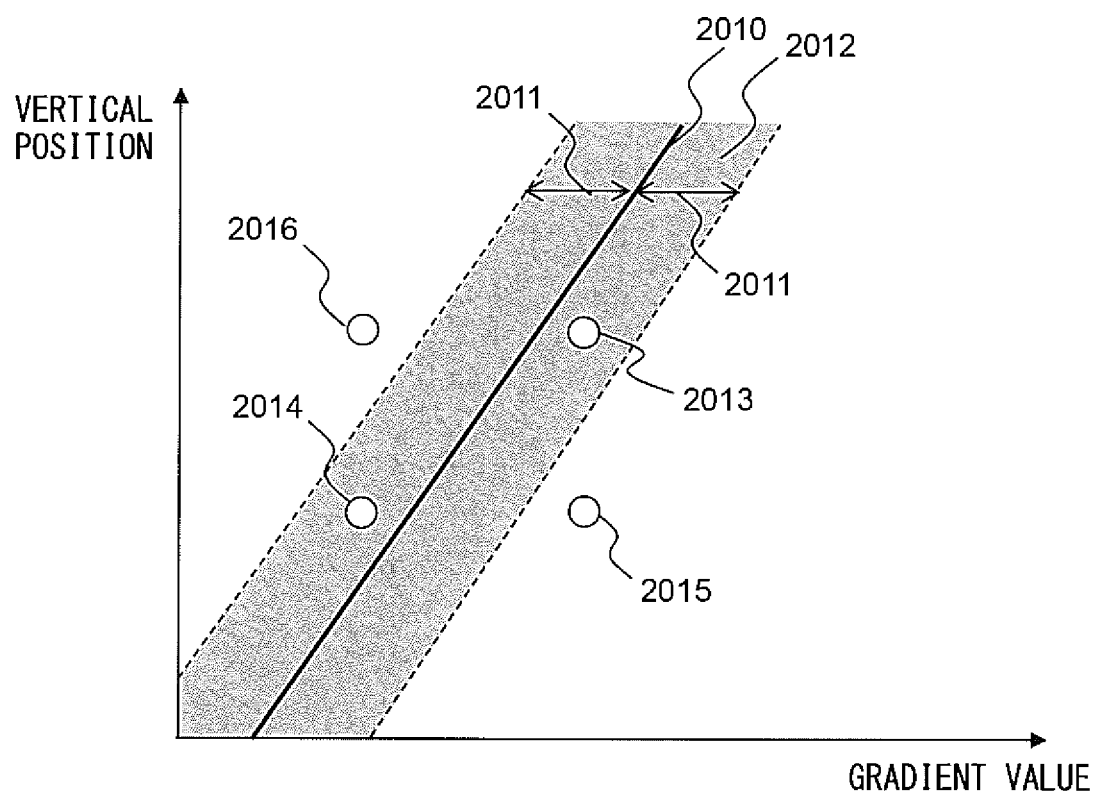
FIG. 20B is a graph for illustrating noise pixels.

FIG. 20B is a graph for illustrating noise pixels.

The horizontal axis of FIG. 20B indicates a gradient value and the vertical axis indicates a position in a vertical direction in a correction image. The straight line 2010 of FIG. 20B indicates an average value of the gradient values of pixels for each horizontal line in the shadow region. As described above, the straight line 2010 is inclined as the shadow region has gradation along the vertical direction. The pixels 2013, 2014 plotted within a range 2012 where a distance 2011 in a horizontal axis direction from this straight line 2010 is equal to or less than the sixth threshold are not extracted as noise pixels, rather, pixels 2015, 2016 plotted outside the range 2012 are extracted as noise pixels.

Next, the noise line detecting module 249 detects noise pixels, the number of which connected with one another is equal to or more than a predetermined number (for example, 4 pixels), from noise pixels extracted by the noise pixel extracting module 248 as a noise line (step S608). The noise line detecting module 249 determines whether to connect noise pixels extracted by the noise pixel extracting module 248 in a vertical direction (whether adjacent noise pixels exist). The noise line detecting module 249 groups mutually connected noise pixels into one and, when the length of each group in a vertical direction is equal to or more than a predetermined value (for example, a distance equivalent to 0.5 mm), detects the group as a noise line. In this way, the noise line detecting module 249 detects a dirt substance causing a noise line based on a difference between the gradient value of a shadow region and the gradient value of the dirt substance. By detecting a noise line from a shadow region outside of a document region, the noise line detecting module 249 can accurately detect a noise line without being affected by the content, such as ruled lines, in the document.

Next, the noise line detecting module 249 determines whether a noise line is detected from the correction image (step S609). When no noise line is detected, the noise line detecting module 249 transfers the processing to step S616.

Whereas, when a noise line is detected, the noise line detecting module 249 stores a position in a horizontal direction where the noise line is detected in the correction image as a noise line position in the second storage device 220 (step S610).

Next, the noise line detecting module 249 determines whether a user has confirmed the noise line (step S611). When the operation device 202 has received a confirmation operation by a user after a warning on the noise line had previously been notified to a user, the noise line detecting module 249 determines that the user has confirmed the noise line. When the first result indicates that dirt is detected and the dirt position of the detected dirt corresponds to the noise line position of the present noise line, and the detected dirt has been confirmed by a user, the noise line detecting module 249 may also determine that the user has already confirmed the noise line.

When a user has already confirmed the noise line, the noise line detecting module 249 transfers the processing to step S615. As such, when a user has already confirmed a dirt substance in the image reading apparatus 100, the noise line detecting module 249 does not generate and provide the warning.

Whereas, when a user has not confirmed the noise line, the noise line detecting module 249 generates and provides the warning to a user (step S612). The noise line detecting module 249 generates and provides the warning to a user by displaying the similar image as the reception screen depicted in FIG. 14A and the status display screen depicted in FIGS. 14B and 14C on the display device 201.

In this way, the noise line detecting module 249 keeps generating and providing the warning to a user who has not confirmed the warning and prevents repeating providing the same warning to a user who has confirmed the warning, thereby preventing troubling the user.

Next, the noise line detecting module 249 determines whether the display device 201 has received a confirmation operation by a user based on whether the operation device 202 has received a confirmation acceptance signal (step S613).

When the operation device 202 has received a confirmation operation from a user, the noise line detecting module 249 stores the confirmation operation information that indicates that the confirmation operation has been received, in the second storage device 220, in association with the noise line position of the noise line (step S614). Note that the noise line detecting module 249 thereafter periodically monitors the confirmation operation information, and, when the noise line is not detected at a position associated with the confirmation operation information, the noise line detecting module 249 deletes the confirmation operation information from the second storage device 220.

Next, the noise line detecting module 249, the determination module 250, and the correction module 251 perform correction processing (step S615). In the correction processing, the correction module 251 corrects the document region of the correction image based on the noise line detection result by the noise line detecting module 249. The details of the correction processing will be described later.

Next, the noise line detecting module 249 stores the second result in the second storage device 220, as well as, transmits the second result to the image reading apparatus 100 via the second interface device 203 (step S616).

Next, the correction module 251 stores the correction image in the second storage device 220, as well as, displays the correction image on the display device 201 (step S617), and ends the set of steps.

As such, the second dirt substance detection processing module 242 executes the second processing using the dirt substance detection result by the first dirt substance detection processing module 162 to detect a dirt substance from the correction image. As such, the second dirt substance detection processing module 242 can better detect a dirt substance.

Note that, at step S611, when a user has already confirmed the noise line, the noise line detecting module 249 may not go without generating and providing the warning yet may change the timing of generating and providing the warning. In such a case, for example, the noise line detecting module 249 generates and provides the warning at every predetermined count even when a user has already confirmed the noise line.

Figure 21:
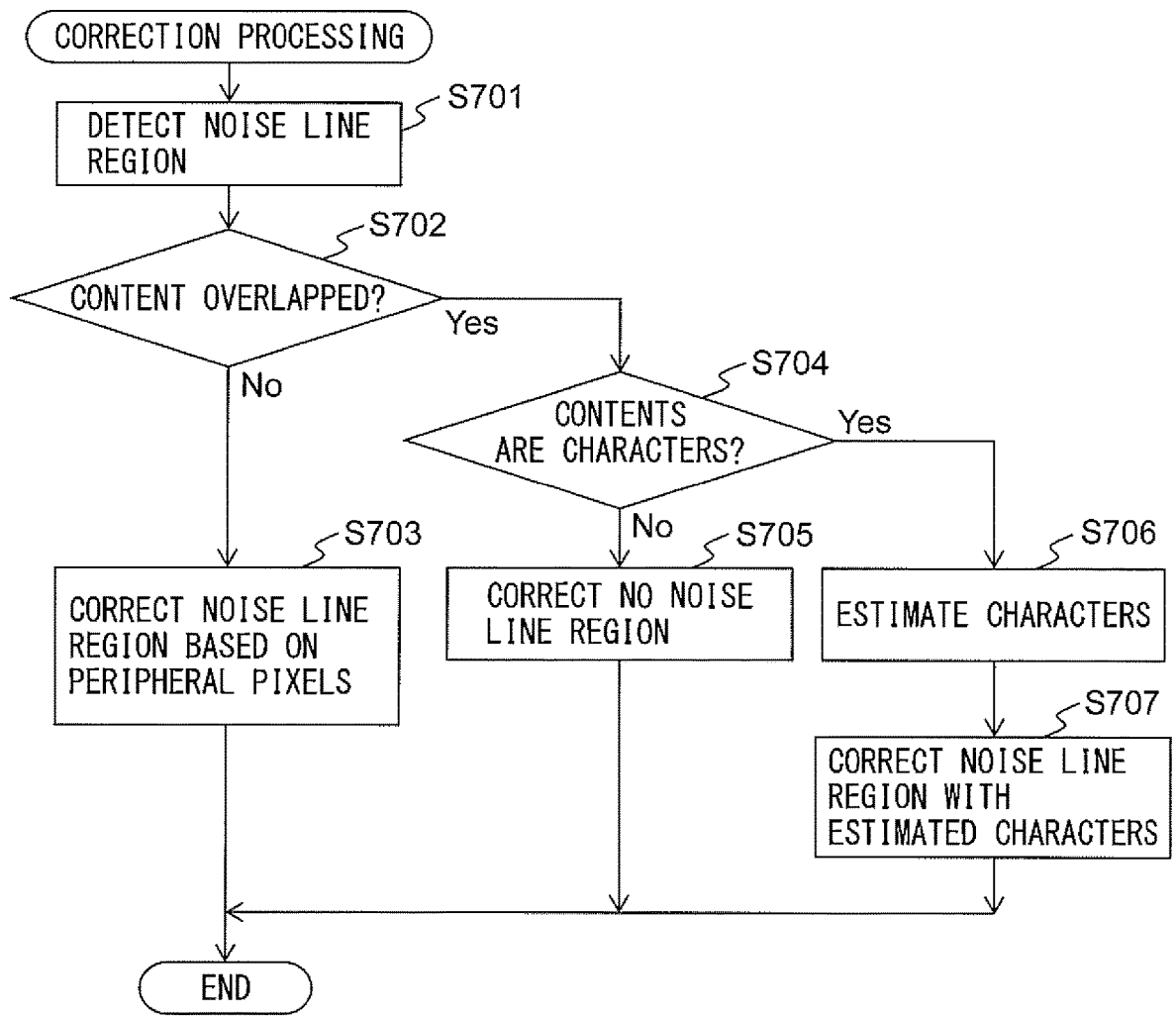
FIG. 21 is a flowchart depicting an example of the operation of correction processing.

FIG. 21 is a flowchart depicting an example of the operation of the correction processing. The correction processing depicted in FIG. 21 is carried out at step S615 of the flowchart depicted in FIG. 18.

First, the noise line detecting module 249 specifies the noise line range, corresponding to a noise line detected in the shadow region, in the document region detected by the document region detecting module 246 (step S701).

As depicted in FIG. 19A, when there are noise lines 1912 to 1914 in the shadow region, the noise lines are likely to extend in a vertical direction and present in the document region 1908. Thus, the noise line detecting module 249 estimates that a noise line is present in the document region at a horizontal position corresponding to the noise line position of the noise line detected in the shadow region, and specifies the horizontal position in the document region corresponding to the noise line position of the noise line detected in the shadow region as a noise line region.

The noise line detecting module 249 further determines whether or not a noise line is present in the identified noise line region. In the same way as the edge pixel extracting module 245, the noise line detecting module 249 extracts third edge pixels in the noise line region, and determines that there are noise lines in the specified noise line region, i.e., in the document region, when the number or ratio of the extracted third edge pixels is equal to or more than a predetermined number or ratio. The noise line detecting module 249 includes the determination result in the second result. This determination result is used by the notifying module 165 to determine whether a dirt substance is on the side of the imaging sensor or on the side of the white reference member.

Next, the determination module 250 determines whether the noise line in the document region overlaps the content based on a difference between the gradient value of the noise line region identified by the noise line detecting module 249 and the gradient values of the peripheral pixels in the noise line region (step S702). The peripheral pixels may be, for example, pixels located within a predetermined range (for example, 20 pixels) from the noise line region.

Figure 22:
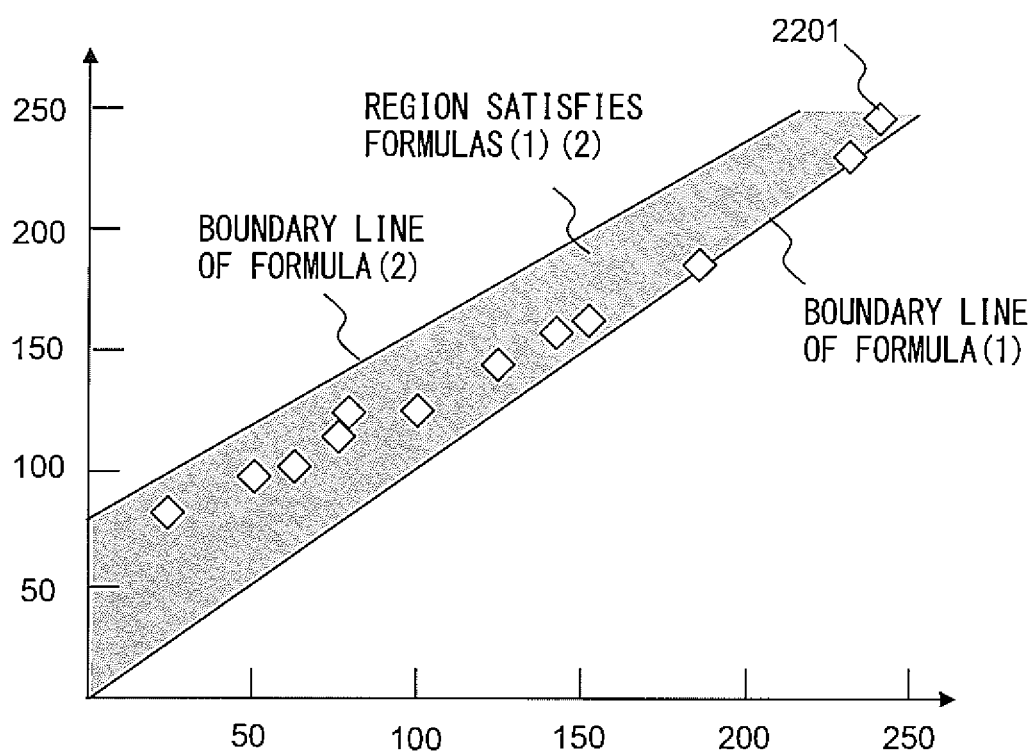
FIG. 22 is a graph for illustrating a relationship between a noise line and the background of a document.

FIG. 22 is a graph for illustrating a relationship between a noise line and a background of a document.

The horizontal axis of FIG. 22 indicates the gradient value of the background of a document and the vertical axis indicates the gradient value of noise lines. Each dot 2201 of FIG. 22 corresponds to each document image of a document of a different single color such that a noise line is generated in the document image, and is plotted at a coordinate corresponding to the gradient value of the background of the document and the gradient value of the noise line in each document image. A noise line occurs when light from the light source 124 is reflected against a dirt substance, such as paper dust, adhered to the transparent member 127 between the imaging sensor 125 and the document. As such, as depicted in FIG. 22, when a noise line overlaps the background of a document in the document image, the gradient value of the noise line pixels corresponding to the noise line becomes slightly higher than the gradient value of the background pixels capturing the background of the document around the noise line. Further, as the background is darker, the influence of reflection, against the background, of the light from the light source 124 becomes larger, while, as the background is brighter, the influence of reflection, against the background, of the light from the light source 124 becomes smaller. As such, as the gradient value of the background pixel is lower, the difference between the gradient value of the noise line pixels and the gradient value of the background pixels becomes larger; as the gradient value of the background pixel is higher, the difference between the gradient value of the noise line pixels and the gradient value of the background pixels becomes smaller.

As the result of measurement using a variety of documents, it is found that the relationship of the following formulas (1) and (2) can be established between the gradient value of pixels corresponding to a noise line and the gradient value of peripheral background pixels:

(Gradient value of noise line pixels)>(Gradient values of background pixels)      (1)

(Gradient value of noise line pixels)<0.8×(Gradient values of background pixels)+80      (2)

Thus, when the gradient value of a noise line region and the average value of the gradient values of peripheral pixels of the noise line region satisfy the relationship of the following formulas (3) and (4), the determination module 250 determines that the noise line region overlaps the background yet does not overlap the content. Whereas, when the gradient value of the noise line region and the average value of the gradient values of peripheral pixels of the noise line region do not satisfy the relationship of the following formulas (3) and (4), the determination module 250 determines that the noise line region does not overlap the content.

(Gradient value of noise line pixels)>(Average value of gradient values of peripheral pixels)      (3)

(Gradient value of noise line pixels)<α×(Average value of gradient values of peripheral pixels)+β      (4)

where a is a value larger than 0.6 and smaller than 1.0, and preferably 0.8; β is a value larger than 0 and smaller than 160, and preferably 80.

Figure 23A:
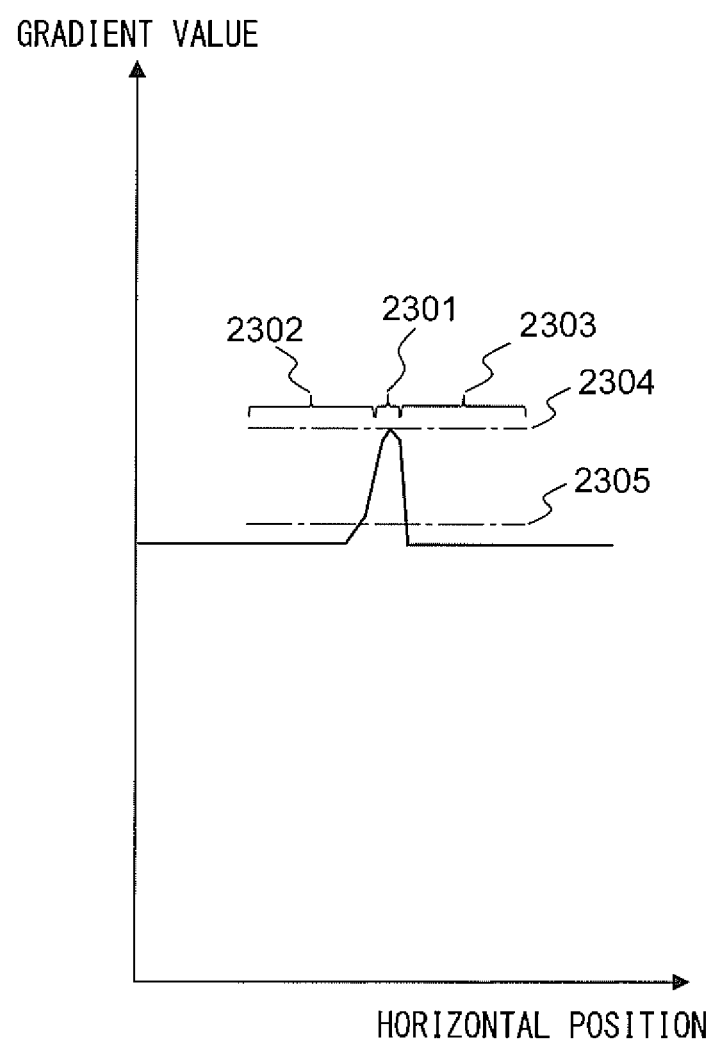
FIG. 23A is a graph for illustrating a relationship between a noise line region and a content.
Figure 23B:
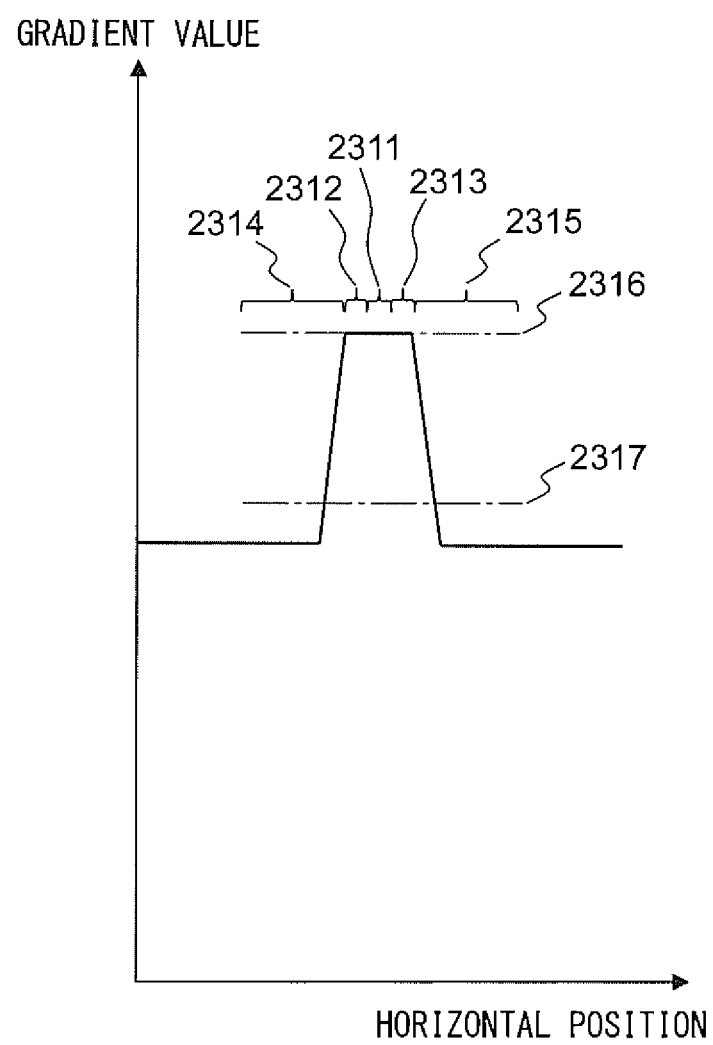
FIG. 23B is a graph for illustrating a relationship between a noise line region and a content.
Figure 23C:
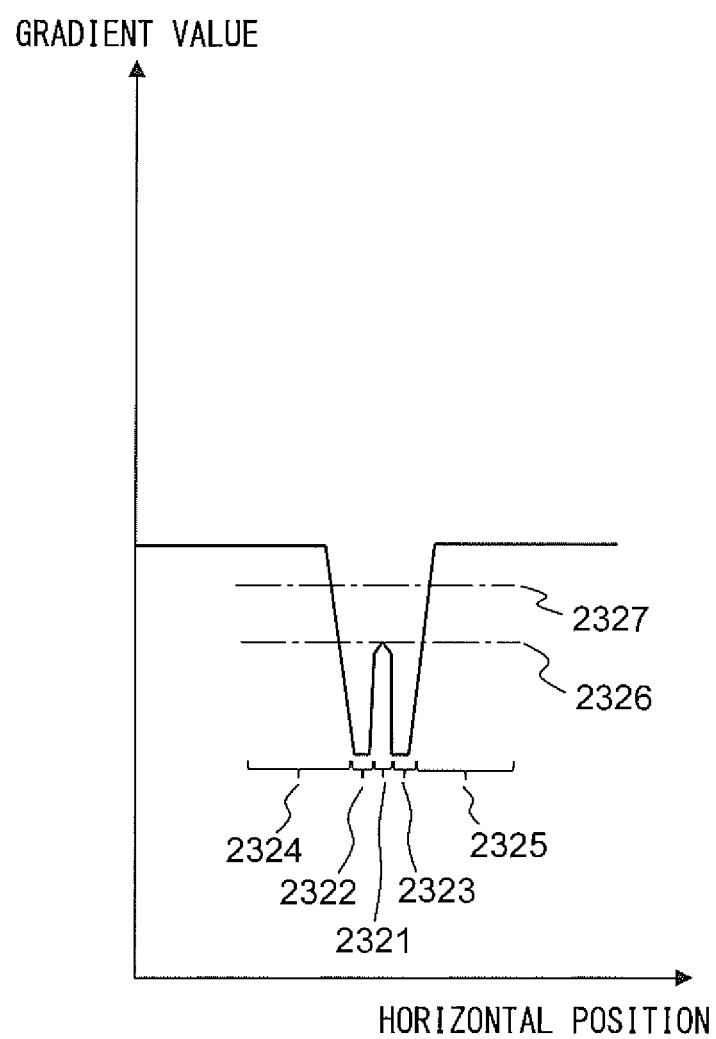
FIG. 23C is a graph for illustrating a relationship between a noise line region and a content.

FIGS. 23A to 23C are graphs for illustrating a relationship between a noise line region and a content. The horizontal axis of FIGS. 23A to 23C indicates the horizontal position in a correction image and the vertical axis indicates the gradient value.

FIG. 23A depicts the gradient value of a horizontal line in a correction image with a noise line overlapping a background. In this correction image, a noise line is in a region 2301 and a background is in peripheral regions 2302, 2303. In the example depicted in FIG. 23A, the gradient value 2304 of the noise line region 2301 is larger than the average value 2305 of the gradient values of the peripheral regions 2302, 2303 and a difference therebetween is sufficiently small, thus, formulas (3) and (4) are satisfied and the noise line region is determined not to overlap the content.

FIG. 23B depicts the gradient value of a horizontal line in a correction image with a noise line overlapping a content that has a higher gradient value than the background. In this correction image, a noise line is in a region 2311, a content with a higher gradient value is in peripheral regions 2312, 2313, and a background is in further peripheral regions 2314, 2315. The content regions 2312, 2313 have sufficiently higher gradient values compared with the background regions 2314, 2315 so that a user can easily identify the content. Thus, the noise line region 2311 is buried in the content regions 2312, 2313, and the gradient value 2316 of the noise line region 2311 becomes a substantially similar level as the gradient values of the content regions 2312, 2313. Whereas, as the peripheral regions 2312 to 2315 include the background in addition to the content, the average value 2317 of the gradient values of the peripheral regions 2312 to 2315 becomes a value close to the gradient value of the background. Thus, a difference between the gradient value 2316 of the noise line region 2311 and the average value 2317 of the gradient values of the peripheral regions 2312 to 2315 becomes large, and the formula (4) is not satisfied, whereby the noise line region is determined to overlap the content.

FIG. 23C depicts the gradient value of a horizontal line in a correction image with a noise line overlapping a content that has a lower gradient value than the background. In this correction image, a noise line is in a region 2321 and a content with a lower gradient value is in peripheral regions 2322, 2323, and a background is in further peripheral regions 2324, 2325. The content regions 2322, 2323 have sufficiently low gradient values compared with the background regions 2324, 2325 so that a user can easily identify the content. Thus, the gradient value 2326 of the noise line region 2321 becomes a higher value than the gradient values of the content regions 2322, 2323, but is a sufficiently lower value than the gradient values of the background regions 2324, 2325. As the peripheral regions 2322 to 2325 include the background in addition to the content, the average value 2327 of the gradient values of the peripheral regions 2322 to 2325 becomes a value close to the gradient value of the background. Thus, the gradient value 2326 of the noise line region 2321 becomes smaller than the average value 2327 of the gradient values of the peripheral regions 2322 to 2325, and the formula (3) is not satisfied, whereby the noise line region is determined to overlap the content.

When the determination module 250 determines that the noise line region does not overlap the content, the correction module 251 corrects the vertical region based on the peripheral pixels of the noise line region (step S703) and ends the set of steps. The correction module 251 uses, for example, a known linear interpolation technique to correct the noise line region using the gradient values of the peripheral pixels of the noise line region. In this way, when the periphery of the noise line region is a monotonous background, the correction module 251 can bury the noise line region in the background.

Whereas, when the noise line region is determined to overlap the content, the determination module 250 determines whether the content is a character or not (step S704). The determination module 250 detects a character from the correction image, for example, using a known character recognition (OCR) technique. The determination module 250 calculates the likelihood (coincidence) of including each preregistered character in each region in the correction image and, when the likelihood of the character with the highest likelihood is equal to or more than a predetermined threshold, the determination module 250 determines that the region includes the character. When a character is detected, the determination module 250 determines whether the overlapping region that is determined to overlap the content in the noise line region overlaps a character region where the character is detected. When the overlapping region overlaps the character region, the determination module 250 determines that the content overlapping the overlapping region is a character, or when the overlapping region does not overlap the character region, the determination module 250 determines that the content overlapping the overlapping region is not a character.

When the determination module 250 determines that the content overlapping the overlapping region is not a character, the correction module 251 does not correct the vertical region (step S705) and ends the set of steps. When the content is not a character, the content is likely a photograph, a pattern, etc., and such a content is likely bright (high luminance value). Noise lines are conspicuous when they are brighter than the document and are inconspicuous when they are darker than the document, thus, when a noise line overlaps a content other than characters, the noise line may preferably be left as is without correction. Whereas, when a noise line overlaps a content such as ruled lines, elimination of the noise line may also eliminate ruled lines. The correction module 251 does not correct a noise line when the noise line overlaps other contents than characters, thereby preventing inappropriately correcting a noise line and exacerbating the correction image.

When the determination module 250 determines that the content overlapping the overlapping region is a character, the correction module 251 estimates the character overlapping the overlapping region based on the context of the content (step S706). The context is words, sentences, a text, etc., constituted by a plurality of characters.

Figure 24:
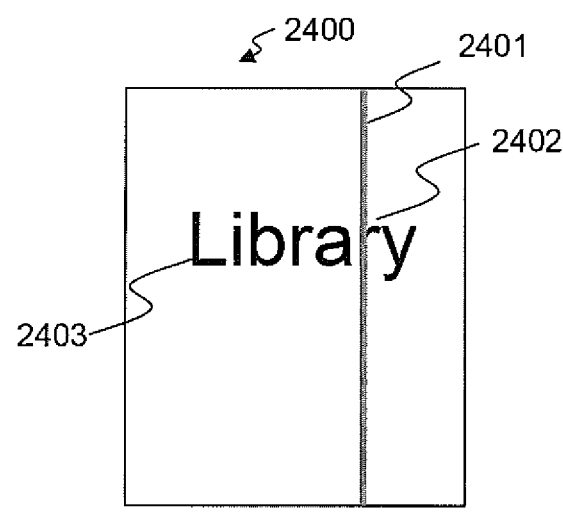
FIG. 24 is a schematic view depicting an example of a correction image in which a noise line region overlaps a character.

FIG. 24 is a schematic view depicting an example of a correction image in which a noise line region overlaps a character.

In the correction image 2400 depicted in FIG. 24, a character "r" 2402 overlaps a noise line region 2401. When character recognition processing is performed on this correction image 2400, the character 2402 is unlikely to be recognized correctly (for example, mistakenly recognized as "1"), while characters 2403 "L," "i," "b," "r," "a," "y" that do not overlap the noise line region 2401 are correctly recognized. Thus, the correction module 251 estimates the character 2402 overlapping the noise line region 2401 based on the characters 2403 that do not overlap the noise line region 2401.

For example, the information processing apparatus 200 stores a context table recording a variety of contexts and image patterns of characters in the second storage device 220 in advance. The correction module 251 retrieves and refers to the context table in the second storage device 220 and identifies a context where characters that do not overlap the noise line region match characters included in each context from among the contexts stored in the context table. Note that the correction module 251 identifies a context that includes characters that do not overlap the noise line region and are lined up in sequence except for the character that overlaps the noise line region. Then, the correction module 251 estimates the character that overlaps the noise line region from the identified context.

Next, the correction module 251 corrects the noise line region using the estimated characters (step S707), and ends the set of steps. The correction module 251 identifies the character portion of characters that do not overlap the noise line region and the background portion in the periphery of the characters, and calculates the average value of the color values of the identified character portion and the average value of the color values of the background portion for each RGB color. The correction module 251 retrieves an image pattern of the estimated character from the second storage device 220, and generates an image by defining each color value of pixels corresponding to the image pattern as the calculated average value of the color values of the character portion and defining each color value of other pixels as the calculated average value of the color values of the background portion. Then, the correction module 251 corrects the noise line region by replacing the character portion overlapping the noise line region with the generated image.

If a noise line is corrected by linear interpolation etc., when the noise line overlaps a character, the character portion may possibly be blurred, erased, or destroyed. The correction module 251 can accurately correct a character by replacing the whole character portion that overlaps the noise line region with a preset image pattern.

Alternatively, the correction module 251 may estimate a character that overlaps a noise line using a discriminator that has learned beforehand to output character information when an image in which a character and a noise line overlap each other is input. This discriminator learns in advance using a plurality of images in which a character and a noise line overlap each other by deep learning etc., and is stored in the second storage device 220 in advance. The correction module 251 inputs an image including a character portion that overlaps a noise line region to the discriminator and acquires character information output from the discriminator to estimate the character that overlaps the noise line. In such a case, the correction module 251 can accurately estimate a character that overlaps a noise line and appropriately correct the character portion that overlaps the noise line region.

Alternatively, the context table may not be stored in the second storage device 220, yet instead, stored in a server (not shown) that connects and communicates with the information processing apparatus 200. In such a case, the correction module 251 transmits characters that do not overlap the noise line region to the server via a communication circuit (not shown), receives a context that matches the characters from the server, and estimates the character overlapping the noise line region from the received context. Likewise, the discriminator may not be stored in the second storage device 220, and instead, stored in a server (not shown) that connects and communicates with the information processing apparatus 200. In such a case, the correction module 251 transmits an image including the character portion that overlaps the noise line region to the server via a communication circuit (not shown) and receives information of characters that are in the character portion from the server.

In this way, the correction module 251 changes the method of correcting a noise line region according to the determination result of the determination module 250. Thus, the correction module 251 can appropriately correct a noise line region for each target overlapping the noise line region.

Note that, in the image processing system 1, the image reading apparatus 100 may have a second dirt substance detection processing module 242 and execute the second processing, instead of the information processing apparatus 200. In such a case, the image reading apparatus 100 executes the second processing after generating the correction image at step S111 of FIG. 11 and detects a dirt substance from the correction image.

Alternatively, in the image processing system 1, the information processing apparatus 200 may have a first dirt substance detection processing module 162 and execute the first processing and confirmation processing, instead of the image reading apparatus 100. In such a case, the image reading apparatus 100 transmits the white reference image acquired at step S101 of FIG. 11 to the information processing apparatus 200. When having received a white reference image from the image reading apparatus 100, the information processing apparatus 200 executes the first processing, detects a dirt substance from the white reference image, and generates the warning and provides the warning to a user via the display device 201. The information processing apparatus 200 further executes the confirmation processing and receives a confirmation operation by a user via the operation device 202.

Further, the second dirt substance detection processing module 242 may detect a dirt substance from the document image instead of the correction image in the second processing. In such a case, at step S112 of FIG. 11, the image reading apparatus 100 transmits the document image, instead of or in addition to the correction image, to the information processing apparatus 200 and the information processing apparatus 200 acquires the document image as an input image.

Further, in the same way as the second dirt substance detection processing module 242, the first dirt substance detection processing module 162 may specify a priority range for preferentially detecting dirt in the white reference image using a position in the correction image where a dirt substance is detected as indicated in the second result. In such a case, the first dirt substance detection processing module 162 calculates dirt degrees of pixels that are spaced apart from one another by a first distance in a horizontal direction, without calculating dirt degrees of all pixels in the white reference image. Whereas, the first dirt substance detection processing module 162 sets a range, in the white reference image, that is within a predetermined distance from a position corresponding to the position where a dirt substance is detected in the correction image as a priority range. With regard to the pixels within the priority range, the first dirt substance detection processing module 162 calculates dirt degrees of pixels that are adjacent to one another or spaced apart from one another in a horizontal direction by a second distance that is shorter than the first distance. In this way, the first dirt substance detection processing module 162 can reduce the load of dirt detection processing while selectively scanning a region where dirt is highly likely to be present, which allows efficient detection of dirt.

Alternatively, the image processing system 1 may include a plurality of information processing apparatuses 200, instead of one, which may jointly operate to share each processing in the overall processing and second processing. In such a case, the plurality of information processing apparatuses 200 may be distributed over a network so that the image processing service can be provided in the form of cloud computing.

As detailed above, the image reading apparatus 100 generates the warning when a dirt degree at the imaging position is severe, or generates the warning when a dirt degree at the imaging position is moderate (or minor) only when the document scan count exceeds a threshold, yet, does not generate the warning in other cases. Thus, the image reading apparatus 100 can generate the warning at more appropriate timing when the imaging position is dirty.

Further, the image processing system 1 is provided with a light source 124 in the image reading apparatus 100 so that the leading end or rear end of a document conveyed onto the transparent member 127 forms a shadow on the white reference member 126, whereby the image reading apparatus 100 detects a shadow region from a correction image and detects a dirt substance from the detected shadow region. Thus, the image processing system 1 can detect both white dirt substance and black dirt substance from a shadow region and can better detect a dirt substance from a correction image.

Further, the image processing system 1 detects a shadow region from a region outside the document region in the correction image and detects noise pixels, the number of which connected with one another in the shadow region is equal to or more than a predetermined number, as a noise line. Thus, the image processing system 1 can detect both white noise line and black noise line from a shadow region and can more accurately detect a noise line from an image.

Further, in the image processing system 1, a dirt substance detection result is fed back to and used by each other between the first processing for detecting a dirt substance from a white reference image before generation of data for shading correction and the second processing for detecting a dirt substance from the correction image obtained by performing shading correction on a document image. Thus, the image processing system 1 can better detect a dirt substance from an image.

Figure 25:
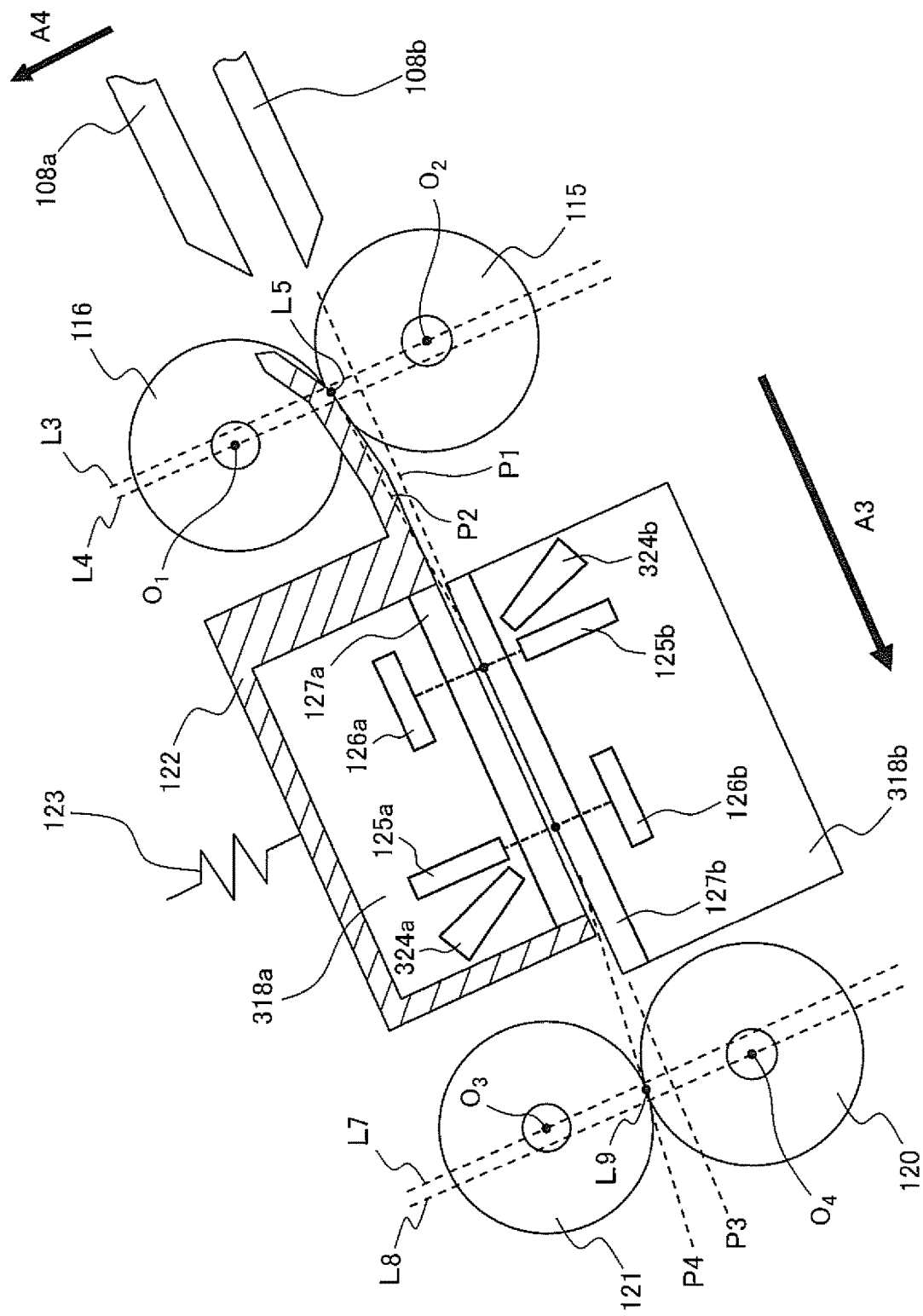
FIG. 25 is a view depicting schematic components of an imaging unit according to another embodiment.

FIG. 25 is a view depicting schematic components of an imaging unit 318 according to another embodiment.

A first imaging unit 318*a* and a second imaging unit 318*b* depicted in FIG. 25 are used instead of the first imaging unit 118*a* and the second imaging unit 118*b* in the image reading apparatus 100. In the first imaging unit 318*a*, a first light source 324*a* is provided on the downstream side of the first imaging sensor 125*a* in a document conveyance direction A3. In the second imaging unit 318*b*, a second light source 324*b* is provided on the upstream side of the second imaging sensor 125*b* in the document conveyance direction A3. Note that the first light source 324*a* and the second light source 324*b* may be provided on the upstream side of the first imaging sensor 125*a*. Alternatively, the first light source 324*a* and the second light source 324*b* may be provided on the downstream side of the first imaging sensor 125*a*. The arrangement of each imaging sensor 125 and light source 324 is indicated in the device information, and the information processing apparatus 200 can acquire the arrangement of each imaging sensor 125 and light source 324 from the device information.

The image processing system according to this embodiment can also provide the same effects as those described above.

Figure 26:
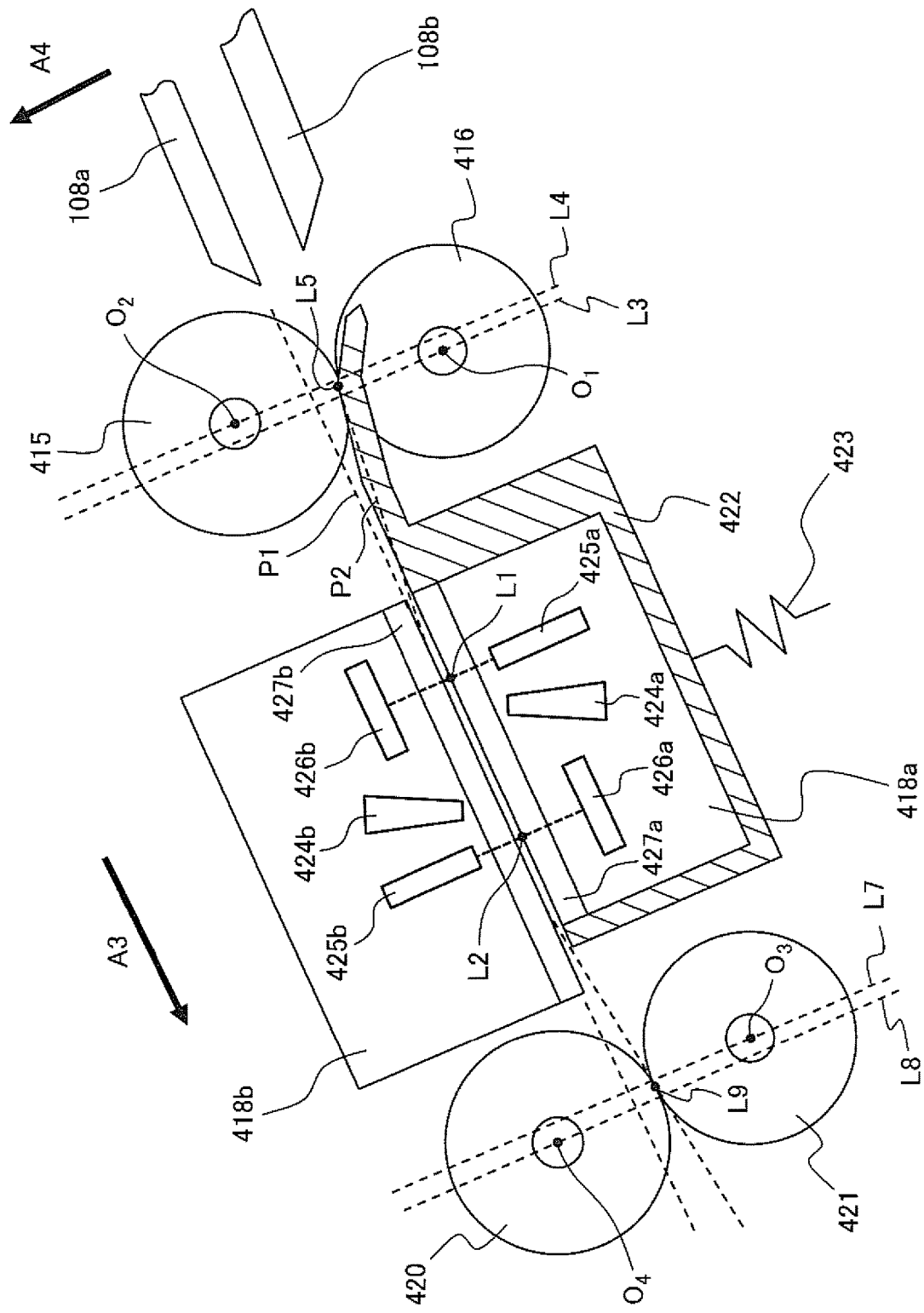
FIG. 26 is a view depicting schematic components of an imaging unit according to still another embodiment.

FIG. 26 depicts schematic components of the imaging unit 418 and a conveyance mechanism of the upstream and downstream sides of the imaging unit 418 according to still another embodiment.

In this embodiment, an imaging unit 418, a first conveyance roller 415, a first driven roller 416, a second conveyance roller 420, and a second driven roller 421 are arranged upside down in a direction A4 perpendicular to the document conveyance path in contrast to the arrangement state depicted in FIG. 4.

That is, the first imaging unit 418*a* is arranged below the second imaging unit 418*b*. The first imaging unit 418*a* is provided with an imaging unit guide 422. The second imaging unit 418*b* is fixed to the upper housing 102 and the first imaging unit 418*a* is supported by the lower housing 101 so that the first imaging unit 418*a* can move in a direction perpendicular to the document conveyance path and is energized in a direction toward the side of the second imaging unit 418*b* by an energizing spring 423. The first white reference member 426*a* is provided below the first transparent member 427*a*, and the second light source 424*b* and the second imaging sensor 425*b* are provided on the opposite side of the first white reference member 426*a* across the first transparent member 427*a* and the second transparent member 427*b*. Likewise, the second white reference member 426*b* is provided above the second transparent member 427*b*, and the first light source 424*a* and the first imaging sensor 425*a* are provided on the opposite side of the second white reference member 426*b* across the first transparent member 427*a* and the second transparent member 427*b*.

Further, the first driven roller 416 and the second driven roller 421 are arranged below the first conveyance roller 415 and the second conveyance roller 420 respectively. The first conveyance roller 415 and the first driven roller 416 convey a document such that the document is conveyed along the second transparent member 427*b* at the imaging positions L1 and L2.

The image processing system according to this embodiment can also provide the same effects as those described above.

Figure 27:
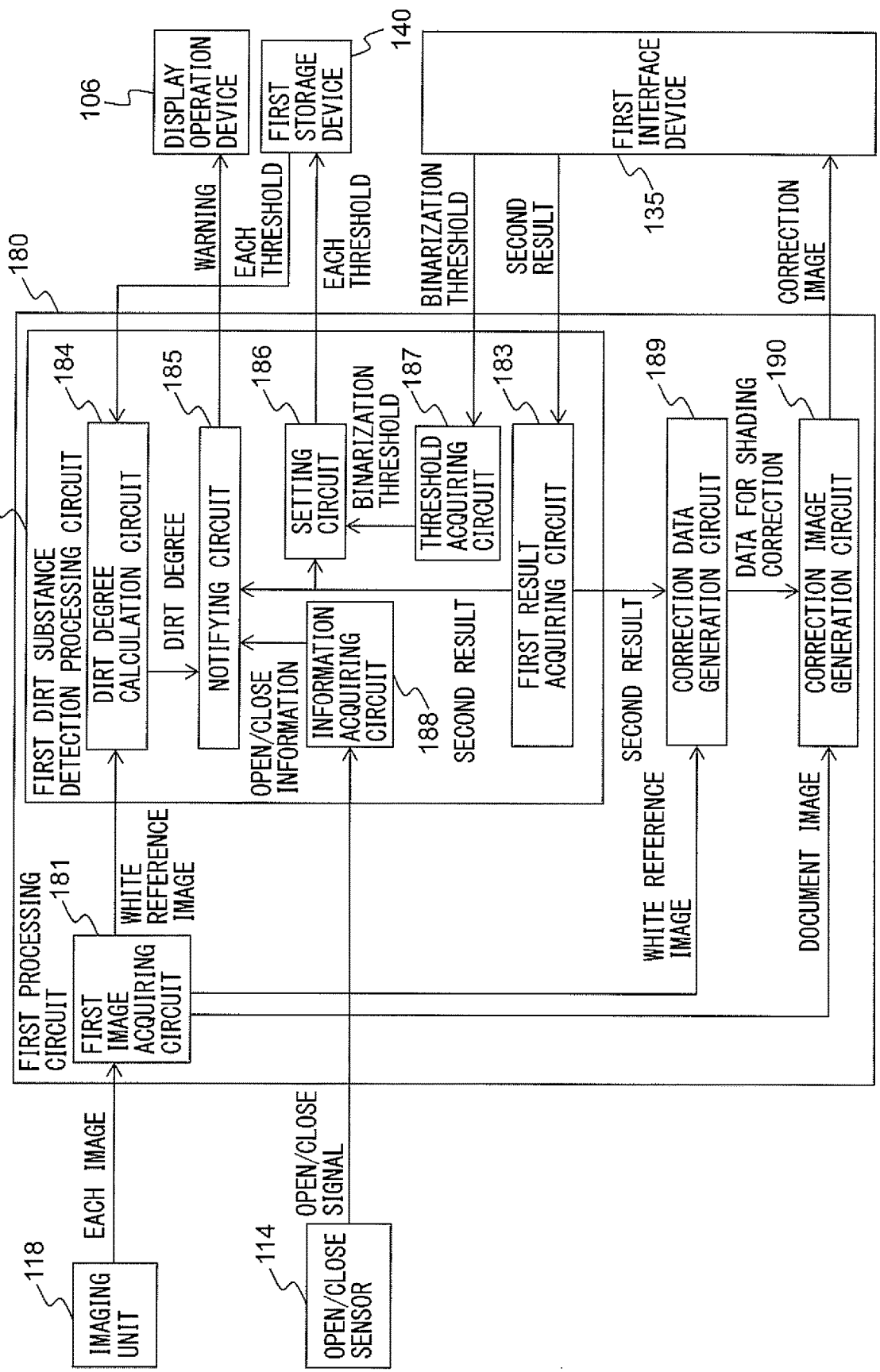
FIG. 27 is a block diagram depicting schematic components of a first processing circuit according to another embodiment.

FIG. 27 is a block diagram depicting schematic components of a first processing circuit 180 according to another embodiment.

In place of the first CPU 160, the first processing circuit 180 performs the overall processing, first processing, confirmation processing, threshold setting processing etc. The first processing circuit 180 includes a first image acquiring circuit 181, a first dirt substance detection processing circuit 182, a correction data generation circuit 189, a correction image generation circuit 190 etc. The first dirt substance detection processing circuit 182 includes a first result acquiring circuit 183, a dirt degree calculation circuit 184, a notifying circuit 185, a setting circuit 186, a threshold acquiring circuit 187, an information acquiring circuit 188, etc.

The first image acquiring circuit 181 is an example of the first image acquiring module and has the same function as the first image acquiring module 161. The first image acquiring circuit 181 acquires a white reference image and a document image from the imaging unit 118, outputs the acquired white reference image to the dirt degree calculation circuit 184 and the correction data generation circuit 189 and outputs the acquired document image to the correction image generation circuit 190.

The first dirt substance detection processing circuit 182 is an example of the first dirt substance detection processing module and has the same function as the first dirt substance detection processing module 162. The first dirt substance detection processing circuit 182 performs the first processing for detecting a dirt substance from a white reference image.

The first result acquiring circuit 183 is an example of the first result acquiring module and has the same function as the first result acquiring module 163. The first result acquiring circuit 183 acquires a second result from the information processing apparatus 200 via the first interface device 135, and outputs the second result to the notifying circuit 185, the setting circuit 186, and the correction data generation circuit 189.

The dirt degree calculation circuit 184 is an example of the dirt degree calculation module and has the same function as the dirt degree calculation module 164. The dirt degree calculation circuit 184 acquires a white reference image from the first image acquiring circuit 181 and each threshold from the first storage device 140, calculates a dirt degree at the imaging position from the white reference image, and outputs the dirt degree to the notifying circuit 185.

The notifying circuit 185 is an example of the notifying module and has the same function as the notifying module 165. The notifying circuit 185 acquires a dirt degree from the dirt degree calculation circuit 184, a second result from the first result acquiring circuit 183, and open/close information from the information acquiring circuit 188, and generates and provides the warning on the display operation device 106 according to the dirt degree.

The setting circuit 186 is an example of the setting module and has the same function as the setting module 166. The setting circuit 186 acquires a binarization threshold from the threshold acquiring circuit 187 and a second result from the first result acquiring circuit 183 and sets each threshold in the first storage device 140.

The threshold acquiring circuit 187 is an example of the threshold acquiring module and has the same function as the threshold acquiring module 167. The threshold acquiring circuit 187 acquires a binarization threshold from the information processing apparatus 200 via the first interface device 135 and outputs the binarization threshold to the setting circuit 186.

The information acquiring circuit 188 is an example of the information acquiring module and has the same function as the information acquiring module 168. The information acquiring circuit 188 acquires an open/close signal from the open/close sensor 114 and outputs the open/close information to the notifying circuit 185.

The correction data generation circuit 189 is an example of the correction data generation module and has the same function as the correction data generation module 169. The correction data generation circuit 189 acquires a white reference image from the first image acquiring circuit 181 and a second result from the first result acquiring circuit 183, generates data for shading correction from the white reference image, and outputs the data for shading correction to the correction image generation circuit 190.

The correction image generation circuit 190 is an example of the correction image generation module and has the same function as the correction image generation module 170. The correction image generation circuit 190 acquires a document image from the first image acquiring circuit 181 and data for shading correction from the correction data generation circuit 189, and generates a correction image by correcting the document image using the data for shading correction. The correction image generation circuit 190 outputs the correction image to the information processing apparatus 200 via the first interface device 135.

The image processing system according to this embodiment can also provide the same effects as those described above.

Figure 28:
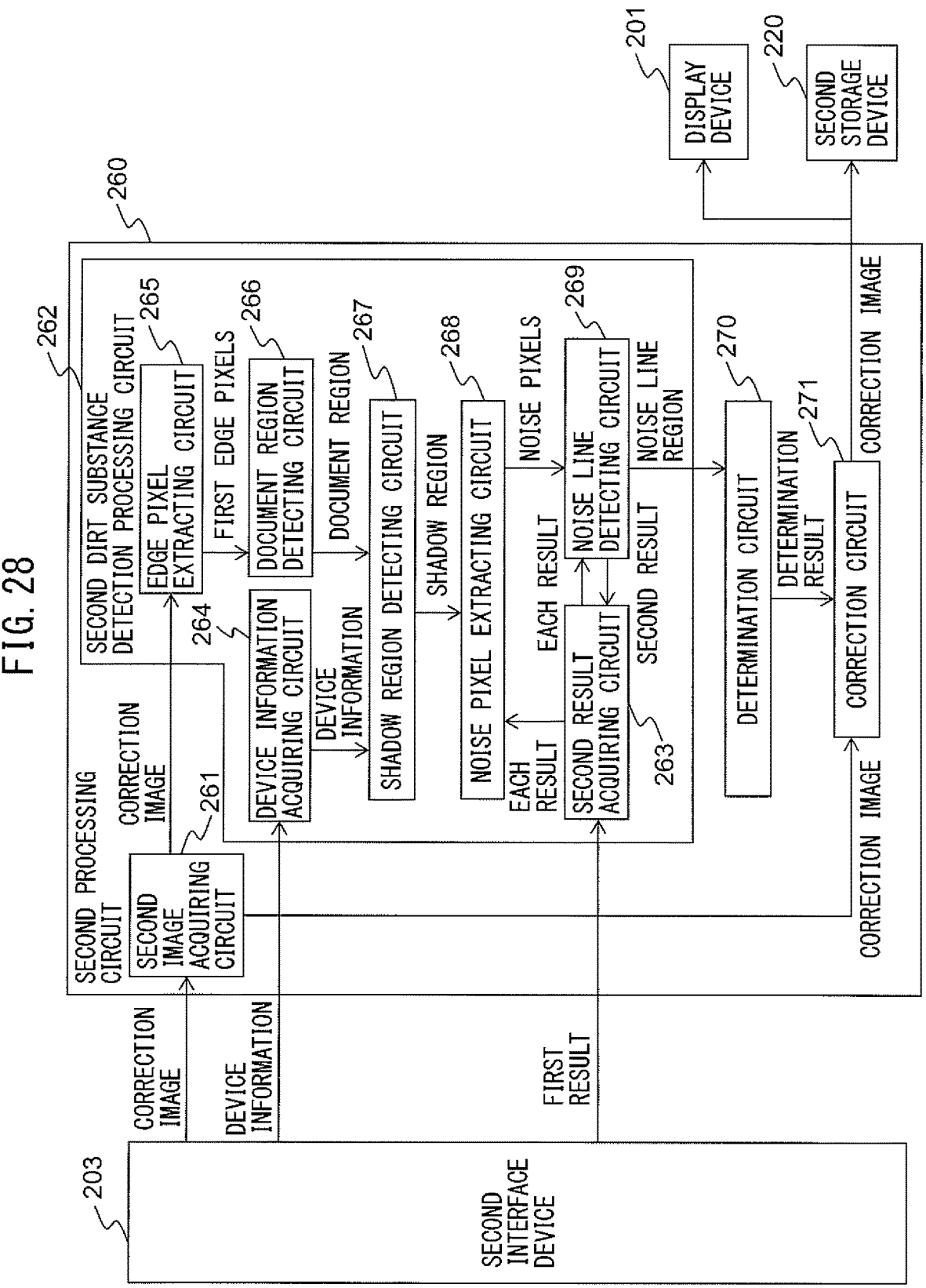
FIG. 28 is a block diagram depicting schematic components of a second processing circuit according to still another embodiment.

FIG. 28 is a block diagram depicting schematic components of a second processing circuit 260 according to another embodiment.

In place of the second CPU 240, the second processing circuit 260 preforms the overall processing, second processing, correction processing etc. The second processing circuit 260 includes a second image acquiring circuit 261, a second dirt substance detection processing circuit 262, a determination circuit 270, a correction circuit 271 etc. The second dirt substance detection processing circuit 262 includes a second result acquiring circuit 263, a device information acquiring circuit 264, an edge pixel extracting circuit 265, a document region detecting circuit 266, a shadow region detecting circuit 267, a noise pixel extracting circuit 268, a noise line detecting circuit 269 etc.

The second image acquiring circuit 261 is an example of the second image acquiring module and has the same function as the second image acquiring module 241. The second image acquiring circuit 261 acquires a correction image from the image reading apparatus 100 via the second interface device 203, and outputs the acquired correction image to the edge pixel extracting circuit 265 and the correction circuit 271.

The second dirt substance detection processing circuit 262 is an example of the second dirt substance detection processing module and has the same function as the second dirt substance detection processing module 242. The second dirt substance detection processing circuit 262 performs the second processing for detecting a dirt substance from a correction image.

The second result acquiring circuit 263 is an example of the second result acquiring module and has the same function as the second result acquiring module 243. The second result acquiring circuit 263 acquires the first result from the image reading apparatus 100 via the second interface device 203 and the second result from the noise line detecting circuit 269, and outputs the acquired first result and second result to the noise pixel extracting circuit 268 and the noise line detecting circuit 269.

The device information acquiring circuit 264 is an example of the device information acquiring module and has the same function as the device information acquiring module 244. The device information acquiring circuit 264 acquires device information from the image reading apparatus 100 via the second interface device 203 and outputs the acquired device information to the shadow region detecting circuit 267.

The edge pixel extracting circuit 265 is an example of the edge pixel extracting module and has the same function as the edge pixel extracting module 245. The edge pixel extracting circuit 265 acquires a correction image from the second image acquiring circuit 261, extracts first edge pixels from the correction image, and outputs the extracted first edge pixel information to the document region detecting circuit 266.

The document region detecting circuit 266 is an example of the document region detecting module and has the same function as the document region detecting module 246. The document region detecting circuit 266 acquires the first edge pixel information from the edge pixel extracting circuit 265, detects a document region based on the first edge pixels, and outputs the detected document region information to the shadow region detecting circuit 267.

The shadow region detecting circuit 267 is an example of the shadow region detecting module and has the same function as the shadow region detecting module 247. The shadow region detecting circuit 267 acquires document region information from the document region detecting circuit 266, detects a shadow region from within a predetermined range outside the document region, and outputs the detected shadow region information to the noise pixel extracting circuit 268.

The noise pixel extracting circuit 268 is an example of the noise pixel extracting module and has the same function as the noise pixel extracting module 248. The noise pixel extracting circuit 268 acquires the shadow region information from the shadow region detecting circuit 267 and the first result and the second result from the second result acquiring circuit 263, extracts noise pixels from the shadow region, and outputs the extracted noise pixel information to the noise line detecting circuit 269.

The noise line detecting circuit 269 is an example of the noise line detecting module and has the same function as the noise line detecting module 249. The noise line detecting circuit 269 acquires the noise pixel information from the noise pixel extracting circuit 268 and the first result and the second result from the second result acquiring circuit 263, detects a noise line based on the noise pixels, and outputs the noise line region information to the determination circuit 270.

The determination circuit 270 is an example of the determination module and has the same function as the determination module 250. The determination circuit 270 acquires the noise line region information from the noise line detecting circuit 269, determines whether the noise line region overlaps a content, and outputs the determination result to the correction circuit 271.

The correction circuit 271 is an example of the correction module and has the same function as the correction module 251. The correction circuit 271 acquires a correction image from the second image acquiring circuit 261 and a determination result from the determination circuit 270, corrects the correction image based on the determination result, stores the corrected correction image in the second storage device 220, and displays it on the display device 201.

The image processing system according to this embodiment can also provide the same effects as those described above.

According to the image processing system, the control method, and the computer-readable, non-transitory medium storing a computer program, it is possible to better detect a dirt substance from an image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
    an imaging sensor for generating a white reference image of a white reference member and a document image of a document and a periphery of the document; and
    a processor for
        detecting a first dirt substance from the white reference image,
        generating data for shading correction based on the white reference image,
        correcting the document image using the data for shading correction to generate a correction image, and
        detecting a second dirt substance from the correction image, wherein
    the processor detects the second dirt substance from pixels apart from one another by a first distance, in a first range outside a predetermined distance from a first position corresponding to a second position where the first dirt substance is detected in the white reference image in the correction image, and detects the second dirt substance from pixels apart from one another by a second distance that is shorter than the first distance, in a second range within the predetermined distance from the first position in the correction image.

2. The image reading apparatus according to claim 1, wherein the processor performs detecting the second dirt substance after specifying a range for preferentially detecting the dirt substance using a position of the first dirt substance detected.

3. The image reading apparatus according to claim 1, wherein the processor changes a timing for providing a warning when the dirt substance was detected, using a second dirt substance detection result.

4. The image reading apparatus according to claim 1, wherein the processor performs detecting the second dirt substance after specifying a range for preferentially detecting the dirt substance using a previous second dirt substance detection result.

5. The image reading apparatus according to claim 1, further comprising:
    a storage device; wherein
        when the processor detects the first dirt substance, the processor stores a first position where the first dirt substance is detected from within the white reference image, in the storage device, and generates a first warning, wherein
        when the processor detects the second dirt substance, the processor stores a second position where the second dirt substance is detected from within the correction image in the storage device, and generates a second warning, and wherein
    the processor changes timing of generating the first or the second warning, or does not generate the first or the second warning, when the processor receives a confirmation after the processor generates the first or the second warning, and when the first position and the second position correspond to each other.

6. An image processing system comprising:
    an image reading apparatus including:
        an imaging sensor for generating a white reference image of a white reference member and a document image of a document and a periphery of the document; and
        a first processor for
            detecting a first dirt substance from the white reference image,
            generating data for shading correction based on the white reference image, and
            correcting the document image using the data for shading correction to generate a correction image, and
    an information processing apparatus including:
        a second processor for detecting a second dirt substance from the correction image,
        wherein the second processor detects the second dirt substance from pixels apart from one another by a first distance, in a first range outside a predetermined distance from a first position corresponding to a second position where the first dirt substance is detected in the white reference image in the correction image, and detects the second dirt substance from pixels apart from one another by a second distance that is shorter than the first distance, in a second range within the predetermined distance from the first position in the correction image.

7. A control method of an image processing system, the method comprising:
    acquiring a white reference image of a white reference member and a document image of a document and a periphery of the document;
    detecting a first dirt substance from the white reference image;
    generating data for shading correction based on the white reference image;

correcting the document image using the data for shading correction to generate a correction image;

detecting a second dirt substance from the correction image;

wherein the second dirt substance is detected from pixels apart from one another by a first distance, in a first range outside a predetermined distance from a first position corresponding to a second position where the first dirt substance is detected in the white reference image in the correction image, and the second dirt substance is detected from pixels apart from one another by a second distance that is shorter than the first distance, in a second range within the predetermined distance from the first position in the correction image.

* * * * *